United States Patent
Calilung et al.

(10) Patent No.: US 10,359,642 B2
(45) Date of Patent: Jul. 23, 2019

(54) MOUNTING MECHANISM FOR EYEWEAR

(71) Applicant: Oakley, Inc., Foothill Ranch, CA (US)

(72) Inventors: Ryan Anthony Calilung, Irvine, CA (US); Sean Michael Cole, Foothill Ranch, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 15/481,850

(22) Filed: Apr. 7, 2017

(65) Prior Publication Data

US 2017/0307903 A1 Oct. 26, 2017

Related U.S. Application Data

(60) Provisional application No. 62/326,460, filed on Apr. 22, 2016.

(51) Int. Cl.
| | |
|---|---|
| *G02C 1/02* | (2006.01) |
| *G02C 5/14* | (2006.01) |
| *G02C 5/10* | (2006.01) |
| *G02C 5/22* | (2006.01) |

(52) U.S. Cl.
CPC ............ *G02C 1/02* (2013.01); *G02C 5/10* (2013.01); *G02C 5/143* (2013.01); *G02C 5/146* (2013.01); *G02C 5/22* (2013.01); *G02C 2200/04* (2013.01); *G02C 2200/08* (2013.01)

(58) Field of Classification Search
CPC ....... G02C 1/10; G02C 5/008; G02C 2200/06
USPC ................. 351/41, 90, 96, 106, 110
See application file for complete search history.

(56) References Cited

U.S. PATENT DOCUMENTS

| | | | |
|---|---|---|---|
| 245,268 | A | 8/1881 | Andross |
| 1,206,457 | A | 11/1916 | Mills |
| 1,308,477 | A | 7/1919 | Blanchard |
| 1,588,775 | A | 6/1926 | Schumacher |
| 1,839,386 | A | 1/1932 | Fischer |
| 1,910,456 | A | 5/1933 | Baker |
| 1,918,954 | A | 7/1933 | Baker |
| 1,942,393 | A | 1/1934 | Baker |
| 1,943,910 | A | 1/1934 | Baker |
| 2,042,400 | A | 5/1936 | Hon |
| 2,098,512 | A | 11/1937 | Nerney |
| 2,391,361 | A | 12/1945 | Stevenson |

(Continued)

FOREIGN PATENT DOCUMENTS

| | | |
|---|---|---|
| CN | 201780416 | 3/2011 |
| DE | 102004058631 | 6/2006 |

(Continued)

OTHER PUBLICATIONS

Oakley Wind Jacket, released at least as early as Aug. 30, 2011.
PIVLOCK V2—Smith Optics Elite, dated Nov. 7, 2013, available at: https://www.youtube.com/watch?v=WIVQVmO1x0g.

*Primary Examiner* — Darryl J Collins
(74) *Attorney, Agent, or Firm* — Sterne, Kessler, Goldstein & Fox P.L.L.C.

(57) ABSTRACT

Eyewear can be provided that comprises at least one lens, at least one earstem, and a frame with components that interconnect two or more components of the eyewear. The components can include an engagement structure of the lens and a coupling mechanism attached to the frame. The coupling mechanism can include a housing configured to receive the engagement protrusion and a lever mechanism being operative to move between open and closed positions for disengaging or engaging with the engagement protrusion.

22 Claims, 46 Drawing Sheets

(56) References Cited

U.S. PATENT DOCUMENTS

| | | |
|---|---|---|
| 2,443,422 A | 6/1948 | Hansen |
| 2,504,157 A | 4/1950 | Rosenheim |
| 2,652,746 A | 12/1950 | Shanks |
| 2,556,847 A | 6/1951 | MacLean |
| 2,610,323 A | 9/1952 | Johnson |
| 2,671,379 A | 3/1954 | Eloranta |
| 2,799,862 A | 7/1957 | Rowe |
| 2,571,704 A | 10/1961 | Gilden |
| 3,084,595 A | 4/1963 | Watts et al. |
| 3,214,767 A | 11/1965 | Weber |
| 3,229,303 A | 1/1966 | Jonassen |
| 3,233,250 A | 2/1966 | Jonaseen |
| 3,383,707 A | 5/1968 | McNeill |
| 3,395,964 A | 8/1968 | Chartrice |
| 3,552,840 A | 1/1971 | Braget |
| 3,659,931 A | 5/1972 | Allen |
| 3,691,565 A | 9/1972 | Galonek |
| 3,826,564 A | 7/1974 | Werling, Sr. |
| 3,829,201 A | 8/1974 | Whiting |
| 3,901,589 A | 8/1975 | Bienenfeld |
| 3,931,646 A | 1/1976 | Loughner |
| 4,023,214 A | 5/1977 | Waldherr |
| 4,056,853 A | 11/1977 | Bottazzini et al. |
| 4,153,347 A | 5/1979 | Myer |
| 4,176,921 A | 12/1979 | Matthias |
| 4,178,080 A | 12/1979 | Elder |
| 4,264,987 A | 5/1981 | Runckel |
| 4,304,469 A | 12/1981 | Solomon |
| 4,314,814 A | 2/1982 | Deroode |
| 4,331,393 A | 5/1982 | Bradly, Jr. |
| 4,340,282 A | 7/1982 | Murakami |
| 4,357,080 A | 11/1982 | Solomon |
| 4,471,496 A | 9/1984 | Gardner, Jr. et al. |
| 4,515,448 A | 5/1985 | Tackles |
| 4,527,291 A | 7/1985 | Nussbickl |
| 4,616,367 A | 10/1986 | Jean et al. |
| 4,632,526 A | 12/1986 | Lhospice |
| 4,662,966 A | 5/1987 | Sumi et al. |
| 4,670,084 A | 6/1987 | Durand |
| 4,674,851 A | 6/1987 | Jannard |
| 4,686,712 A | 8/1987 | Spiva |
| 4,715,702 A | 12/1987 | Dillon |
| 4,730,915 A | 3/1988 | Jannard |
| 4,747,681 A | 5/1988 | Brower |
| 4,759,622 A | 7/1988 | Schmidthaler |
| 4,813,775 A | 3/1989 | Kaksonen |
| 4,822,158 A | 4/1989 | Porsche |
| 4,843,655 A | 7/1989 | Hegendorfer |
| 4,859,048 A | 8/1989 | Jannard |
| 4,867,550 A | 9/1989 | Jannard |
| 4,878,749 A | 11/1989 | McGee |
| 4,901,374 A | 2/1990 | Van der Woude |
| 4,951,322 A | 8/1990 | Lin |
| 4,978,209 A | 12/1990 | Ohba |
| 4,983,030 A | 1/1991 | Chandler |
| 5,007,727 A | 4/1991 | Kahaney et al. |
| 5,016,293 A | 5/1991 | Lickle |
| 5,048,944 A | 9/1991 | Porsche |
| 5,056,163 A | 10/1991 | Chou |
| 5,069,541 A | 12/1991 | Holmes et al. |
| 5,144,344 A | 9/1992 | Takahashi et al. |
| 5,170,502 A | 12/1992 | Hegendorfer et al. |
| 5,182,586 A | 1/1993 | Bennato |
| 5,182,587 A | 1/1993 | Hyoi |
| 5,191,364 A | 3/1993 | Kopfer |
| 5,208,614 A | 5/1993 | Jannard |
| 5,257,050 A | 10/1993 | Wiedner |
| 5,270,743 A | 12/1993 | Hofmair et al. |
| 5,291,230 A | 3/1994 | Bradley |
| 5,308,426 A | 5/1994 | Claveau |
| 5,357,292 A | 10/1994 | Wiedner |
| 5,359,370 A | 10/1994 | Mugnier |
| 5,373,331 A | 12/1994 | Vallalla et al. |
| 5,379,463 A | 1/1995 | Schleger et al. |
| 5,387,949 A | 2/1995 | Tackles |
| 5,390,369 A | 2/1995 | Tubin |
| 5,400,089 A | 3/1995 | Danloup et al. |
| 5,410,763 A | 5/1995 | Bolle |
| 5,412,438 A | 5/1995 | Bolle |
| 5,418,580 A | 5/1995 | Sondrol |
| 5,418,581 A | 5/1995 | Conway |
| 5,423,092 A | 6/1995 | Kawai |
| 5,428,407 A | 6/1995 | Sheffield |
| 5,455,639 A | 10/1995 | Magdelaine et al. |
| 5,467,148 A | 11/1995 | Conway |
| 5,493,348 A | 2/1996 | Harald, Jr. et al. |
| 5,536,828 A | 7/1996 | Deluca et al. |
| 5,541,674 A | 7/1996 | Jannard |
| 5,550,599 A | 8/1996 | Jannard |
| 5,576,775 A | 11/1996 | Bolle |
| 5,583,583 A | 12/1996 | Wilson |
| 5,587,747 A | 12/1996 | Bernheiser |
| 5,602,603 A | 2/1997 | Bondet |
| 5,608,470 A | 3/1997 | Sheffield |
| 5,610,668 A | 3/1997 | Mage |
| 5,617,588 A | 4/1997 | Canavan et al. |
| 5,619,287 A | 4/1997 | Tseng |
| 5,638,145 A | 6/1997 | Jannard et al. |
| 5,641,372 A | 6/1997 | Okuno |
| 5,648,832 A | 7/1997 | Houston et al. |
| 5,652,954 A | 8/1997 | Paiement et al. |
| 5,657,106 A | 8/1997 | Herald et al. |
| 5,685,022 A | 11/1997 | Essman et al. |
| 5,689,323 A | 11/1997 | Houston et al. |
| 5,708,489 A | 1/1998 | Jannard |
| 5,727,251 A | 3/1998 | Sherlock et al. |
| 5,752,280 A | 5/1998 | Hill |
| 5,760,866 A | 6/1998 | Wedeck et al. |
| 5,765,223 A | 6/1998 | McCausland |
| 5,768,716 A | 6/1998 | Porsche |
| 5,790,230 A | 8/1998 | Sved |
| 5,793,463 A | 8/1998 | Hirschman et al. |
| 5,796,461 A | 8/1998 | Stepan |
| 5,798,017 A | 8/1998 | Claveau |
| 5,802,622 A | 9/1998 | Baharad et al. |
| 5,805,261 A | 9/1998 | Houston et al. |
| 5,809,580 A | 9/1998 | Arnette |
| 5,815,235 A | 9/1998 | Runckel |
| 5,841,506 A | 11/1998 | Karasawa et al. |
| 5,862,529 A | 1/1999 | Moodie |
| 5,898,468 A | 4/1999 | Mage |
| 5,898,469 A | 4/1999 | Wang |
| 5,903,331 A | 5/1999 | Lin |
| 5,914,767 A | 6/1999 | Wedeck et al. |
| 5,929,963 A | 7/1999 | McNeal |
| 5,956,116 A | 9/1999 | Lshiyama |
| 5,963,293 A | 10/1999 | Jannard |
| 5,969,789 A | 10/1999 | Houston et al. |
| 5,971,536 A | 10/1999 | Chiu |
| 5,971,538 A | 10/1999 | Heffner |
| 5,987,702 A | 11/1999 | Simioni |
| 6,007,199 A | 12/1999 | Yang |
| 6,009,564 A | 1/2000 | Tackles et al. |
| 6,010,217 A | 1/2000 | Houston et al. |
| 6,010,218 A | 1/2000 | Houston et al. |
| 6,047,410 A | 4/2000 | Dondero |
| 6,056,399 A | 5/2000 | Jannard et al. |
| 6,062,688 A | 5/2000 | Vinas |
| D428,620 S | 7/2000 | Maturaporn |
| 6,086,199 A | 7/2000 | Holland et al. |
| 6,094,751 A | 8/2000 | Parks |
| 6,098,204 A | 8/2000 | Arnette |
| 6,102,033 A | 8/2000 | Baribeau |
| 6,105,177 A | 8/2000 | Paulson et al. |
| 6,106,116 A | 8/2000 | Houston et al. |
| 6,119,279 A | 9/2000 | Haslbeck |
| 6,131,246 A | 10/2000 | Paulson et al. |
| 6,168,271 B1 | 1/2001 | Houston et al. |
| 6,193,367 B1 | 2/2001 | Lee |
| 6,206,519 B1 | 3/2001 | Lin |
| 6,233,342 B1 | 3/2001 | Fernandez |
| 6,224,209 B1 | 5/2001 | Chen |
| 6,231,179 B1 | 5/2001 | Lee |
| 6,231,181 B1 | 5/2001 | Swab |

(56) References Cited

U.S. PATENT DOCUMENTS

| | | |
|---|---|---|
| 6,244,705 B1 | 6/2001 | Ledbetter et al. |
| 6,250,756 B1 | 6/2001 | Jannard |
| 6,260,964 B1 | 7/2001 | Kroman |
| 6,273,564 B1 | 8/2001 | Wedeck et al. |
| 6,276,794 B1 | 8/2001 | Chiang |
| 6,282,727 B1 | 9/2001 | Lindahl |
| 6,290,354 B1 | 9/2001 | Safran |
| 6,296,357 B1 | 10/2001 | Bof |
| D452,522 S | 12/2001 | Chiou |
| 6,349,422 B1 | 2/2002 | Schleger et al. |
| 6,357,873 B1 | 3/2002 | Spindelbalker |
| 6,375,321 B1 | 4/2002 | Lee et al. |
| 6,386,703 B1 | 5/2002 | Huang |
| 6,386,704 B1 | 5/2002 | Wu |
| 6,428,165 B1 | 8/2002 | Rivera |
| 6,464,353 B1 | 10/2002 | Spindelbalker |
| 6,474,812 B1 | 11/2002 | Moon |
| 6,477,717 B1 | 11/2002 | Winefordner et al. |
| 6,502,937 B2 | 1/2003 | Yang |
| 6,533,412 B1 | 3/2003 | Wang et al. |
| 6,540,351 B1 | 4/2003 | Meiler |
| 6,543,895 B2 | 4/2003 | Fukai |
| 6,550,912 B2 | 4/2003 | Vitaloni |
| 6,550,914 B1 | 4/2003 | Kopfer |
| 6,561,647 B1 | 5/2003 | Chen |
| 6,564,804 B2 | 5/2003 | Salatka et al. |
| 6,575,570 B2 | 6/2003 | Mauri |
| 6,637,877 B1 | 10/2003 | Hartley et al. |
| 6,641,263 B2 | 11/2003 | Olney |
| D485,570 S | 1/2004 | Teng |
| 6,702,439 B1 | 3/2004 | Lee |
| 6,712,465 B1 | 3/2004 | Teng |
| 6,715,157 B2 | 4/2004 | Mage |
| 6,718,561 B2 | 4/2004 | Dondero |
| 6,732,383 B2 | 5/2004 | Cleary et al. |
| 6,742,890 B1 | 6/2004 | Teng |
| 6,742,891 B2 | 6/2004 | Chen |
| 6,749,299 B1 | 6/2004 | Hsu |
| 6,783,235 B1 | 8/2004 | Lin |
| 6,786,592 B2 | 9/2004 | Rivera |
| 6,793,336 B2 | 9/2004 | Min |
| 6,804,835 B2 | 10/2004 | Chou |
| 6,817,709 B2 | 11/2004 | Min |
| 6,834,951 B2 | 12/2004 | Xie |
| 6,854,845 B1 | 2/2005 | Goldman et al. |
| 6,857,738 B1 | 2/2005 | Bove et al. |
| 6,863,394 B1 | 3/2005 | Nelson et al. |
| 6,863,395 B1 | 3/2005 | Teng |
| 6,877,169 B2 | 4/2005 | Acquaviva |
| 6,908,193 B2 | 6/2005 | Cyr |
| D508,255 S | 8/2005 | Wu |
| 6,923,537 B2 | 8/2005 | Hartley et al. |
| 6,926,403 B2 | 8/2005 | Yi et al. |
| 6,926,404 B2 | 8/2005 | Bassahon et al. |
| 6,928,663 B1 | 8/2005 | Tappeiner |
| 6,929,364 B1 | 8/2005 | Jannard |
| 6,938,277 B2 | 9/2005 | Lindahl |
| 6,942,338 B2 | 9/2005 | Ku |
| 6,948,813 B2 | 9/2005 | Parks |
| 6,953,247 B1 | 10/2005 | Duffy et al. |
| D511,540 S | 11/2005 | Hsu |
| 6,959,988 B1 | 11/2005 | Sheldon |
| 6,964,067 B1 | 11/2005 | Hartman |
| 6,964,477 B1 | 11/2005 | Teng |
| 6,969,170 B1 | 11/2005 | Smith |
| 6,969,171 B2 | 11/2005 | Lane et al. |
| D513,033 S | 12/2005 | Hsu |
| 6,994,434 B2 | 2/2006 | Blanchette et al. |
| 7,000,263 B2 | 2/2006 | McNeal |
| 7,003,802 B2 | 2/2006 | Broersma |
| 7,029,114 B2 | 4/2006 | Smith |
| 7,036,152 B2 | 5/2006 | Gafforio et al. |
| 7,036,927 B2 | 5/2006 | Kopfer |
| 7,039,959 B2 | 5/2006 | Dondero |
| 7,058,991 B2 | 6/2006 | Hartman |
| 7,083,276 B2 | 8/2006 | Olney |
| 7,090,346 B2 | 8/2006 | Tsai |
| 7,091,634 B2 | 8/2006 | Yi et al. |
| 7,100,215 B2 | 9/2006 | Shiue |
| 7,137,426 B2 | 11/2006 | Neri et al. |
| 7,137,700 B2 | 11/2006 | DiChiara et al. |
| 7,150,525 B2 | 12/2006 | Yang |
| 7,163,289 B2 | 1/2007 | Wedeck et al. |
| D537,097 S | 2/2007 | Freeman |
| D537,860 S | 3/2007 | Freeman |
| 7,192,134 B2 | 3/2007 | Teng |
| 7,200,875 B2 | 4/2007 | Dondero |
| 7,204,589 B2 | 4/2007 | Pieterman |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,237,891 B2 | 7/2007 | Min |
| 7,241,007 B2 | 7/2007 | Cody |
| 7,244,022 B2 | 7/2007 | Lee |
| 7,261,410 B1 | 8/2007 | Chen |
| 7,267,434 B2 | 9/2007 | Lane et al. |
| 7,267,737 B2 | 9/2007 | Neri et al. |
| 7,278,733 B2 | 10/2007 | Olney |
| 7,296,887 B1 | 11/2007 | Hsiung |
| 7,328,999 B2 | 2/2008 | Zelman |
| 7,343,631 B2 | 3/2008 | Lin |
| 7,347,545 B1 | 3/2008 | Jannard et al. |
| 7,364,287 B2 | 4/2008 | Lee et al. |
| 7,370,961 B2 | 5/2008 | Lerner et al. |
| 7,384,141 B2 | 6/2008 | Zelman |
| 7,390,086 B2 | 6/2008 | Lee |
| 7,396,124 B1 | 7/2008 | Wang |
| 7,407,281 B2 | 8/2008 | Tagawa |
| 7,425,065 B2 | 9/2008 | Wang |
| 7,431,453 B2 | 10/2008 | Hogan |
| 7,434,929 B2 | 10/2008 | Jackson |
| 7,441,889 B2 | 10/2008 | Zelman |
| 7,452,068 B2 | 11/2008 | Collier et al. |
| 7,452,069 B2 | 11/2008 | Lipawsky |
| 7,478,906 B2 | 1/2009 | Fielding |
| 7,481,529 B1 | 1/2009 | Chen |
| 7,497,569 B2 | 3/2009 | Webb |
| 7,520,217 B2 | 4/2009 | Roberts et al. |
| 7,520,604 B2 | 4/2009 | Choi |
| 7,520,605 B1 | 4/2009 | Chen |
| 7,526,813 B2 | 5/2009 | Tominaga et al. |
| 7,553,013 B2 | 6/2009 | Tsai |
| 7,556,373 B2 | 7/2009 | VanAtta et al. |
| 7,563,341 B2 | 7/2009 | Ferguson et al. |
| 7,585,072 B1 | 9/2009 | Wang-Lee |
| 7,585,073 B2 | 9/2009 | Paolino |
| 7,594,280 B2 | 9/2009 | Lindahl |
| 7,594,723 B2 | 9/2009 | Jannard et al. |
| 7,604,346 B2 | 10/2009 | Wang |
| 7,648,233 B2 | 1/2010 | Blanshay et al. |
| 7,658,492 B2 | 2/2010 | Siu |
| 7,681,257 B1 | 3/2010 | Broersma |
| 7,686,449 B2 | 3/2010 | Jannard et al. |
| 7,703,913 B2 | 4/2010 | Huang |
| D615,580 S | 5/2010 | Baden et al. |
| D616,485 S | 5/2010 | Thixton |
| 7,712,894 B2 | 5/2010 | Tsai |
| 7,712,896 B1 | 5/2010 | Lee |
| 7,725,959 B2 | 6/2010 | Wang-Lee |
| D622,303 S | 8/2010 | Thixton |
| D622,304 S | 8/2010 | Baden et al. |
| 7,771,043 B2 | 8/2010 | Welchel et al. |
| 7,780,810 B2 | 8/2010 | Hamano |
| 7,810,174 B2 | 10/2010 | Matera |
| D629,035 S | 12/2010 | Moritz |
| 7,850,301 B2 | 12/2010 | DiChiara |
| 7,856,673 B2 | 12/2010 | Reed |
| 7,887,181 B1 | 2/2011 | Chen |
| 7,908,668 B2 | 3/2011 | Folkesson |
| D639,845 S | 6/2011 | Fuchs |
| D640,725 S | 6/2011 | Moritz et al. |
| D640,727 S | 6/2011 | Moritz et al. |

(56) References Cited

U.S. PATENT DOCUMENTS

| | | |
|---|---|---|
| 7,954,942 B2 | 6/2011 | Calilung et al. |
| D646,708 S | 10/2011 | Baden et al. |
| 8,028,350 B2 | 10/2011 | Hogen |
| D649,178 S | 11/2011 | Moritz |
| D653,697 S | 2/2012 | Taylor |
| D653,698 S | 2/2012 | Taylor |
| D659,180 S | 5/2012 | Moritz |
| 8,192,015 B2 | 6/2012 | Taylor et al. |
| 8,235,523 B2 | 8/2012 | Yang |
| 8,303,109 B2 | 11/2012 | Matera |
| 8,307,466 B2 | 11/2012 | Hsu |
| 8,316,470 B2 | 11/2012 | McNeal et al. |
| D675,666 S | 2/2013 | Thixton et al. |
| 8,408,695 B2 | 4/2013 | Calilung et al. |
| 8,414,119 B2 | 4/2013 | Yeh |
| 8,424,474 B2 | 4/2013 | Berns |
| 8,469,510 B2 | 6/2013 | Belbey et al. |
| 8,534,830 B2 | 9/2013 | Taylor et al. |
| 8,661,562 B2 | 3/2014 | Calilung et al. |
| 8,668,330 B2 | 3/2014 | Reyes et al. |
| 8,746,877 B2 | 6/2014 | Belbey et al. |
| 8,800,067 B2 | 8/2014 | Saylor et al. |
| 8,850,626 B2 | 10/2014 | Reyes et al. |
| 8,881,316 B2 | 11/2014 | Reyes et al. |
| 8,911,076 B2 | 12/2014 | Calilung et al. |
| 9,122,078 B2 | 9/2015 | Calilung et al. |
| 9,188,792 B2 | 11/2015 | Calilung et al. |
| 9,192,520 B2 | 11/2015 | Cater et al. |
| 9,241,833 B2 | 1/2016 | Cater et al. |
| 9,463,117 B2 | 10/2016 | Belbey et al. |
| 9,709,817 B2 | 7/2017 | Calilung et al. |
| 9,717,631 B2 | 8/2017 | Cater et al. |
| 2002/0039928 A1 | 4/2002 | Spurgeon et al. |
| 2003/0048405 A1 | 3/2003 | Rivera |
| 2003/0067584 A1 | 4/2003 | Siu |
| 2003/0188376 A1 | 10/2003 | Dondero |
| 2004/0025232 A1 | 2/2004 | Hartley et al. |
| 2004/0083540 A1 | 5/2004 | Dondero |
| 2004/0139532 A1 | 7/2004 | Parks |
| 2004/0141146 A1 | 7/2004 | Blanchette et al. |
| 2004/0141147 A1 | 7/2004 | Cyr |
| 2004/0160570 A1 | 8/2004 | Polovin |
| 2005/0070434 A1 | 3/2005 | Drake |
| 2005/0105041 A1 | 5/2005 | Lerner et al. |
| 2005/0132478 A1 | 6/2005 | Canavan |
| 2005/0160521 A1 | 7/2005 | Hussey |
| 2005/0268385 A1 | 12/2005 | Hartman et al. |
| 2005/0270477 A1 | 12/2005 | Curci et al. |
| 2005/0286013 A1 | 12/2005 | Aylor |
| 2006/0048289 A1 | 3/2006 | Shiue |
| 2006/0119790 A1 | 6/2006 | Tsai |
| 2006/0179554 A1 | 8/2006 | Barton |
| 2006/0191062 A1 | 8/2006 | Matera |
| 2006/0238700 A1 | 10/2006 | Del Vecchio |
| 2006/0250571 A1 | 11/2006 | Li |
| 2006/0256281 A1 | 11/2006 | Li |
| 2006/0283555 A1 | 12/2006 | Green |
| 2007/0006425 A1 | 1/2007 | Woodbury |
| 2007/0024806 A1 | 2/2007 | Blanshay |
| 2007/0033718 A1 | 2/2007 | Lin |
| 2007/0091253 A1 | 4/2007 | Chao |
| 2007/0109490 A1 | 5/2007 | Collier et al. |
| 2007/0121059 A1 | 5/2007 | Chiou |
| 2007/0153230 A1 | 7/2007 | Musal et al. |
| 2007/0182916 A1 | 8/2007 | Blanshay et al. |
| 2007/0240812 A1 | 10/2007 | Bortolato |
| 2007/0261782 A1 | 11/2007 | Frye et al. |
| 2008/0036961 A1 | 2/2008 | Zhou |
| 2008/0072365 A1 | 3/2008 | Alberto |
| 2008/0094567 A1 | 4/2008 | Choi |
| 2008/0137028 A1 | 6/2008 | Webb |
| 2008/0155736 A1 | 7/2008 | Paulson et al. |
| 2008/0198323 A1 | 8/2008 | Sui Yu |
| 2008/0266515 A1 | 10/2008 | Hou |
| 2008/0301858 A1 | 12/2008 | Wang-Lee |
| 2008/0304005 A1 | 12/2008 | DiChiara |
| 2009/0007388 A1 | 1/2009 | Villeneuva |
| 2009/0015784 A1 | 1/2009 | Van Atta |
| 2009/0019620 A1 | 1/2009 | Reed |
| 2009/0038057 A1 | 2/2009 | Tews |
| 2009/0038059 A1 | 2/2009 | McNeal et al. |
| 2009/0044317 A1 | 2/2009 | Tews |
| 2009/0066906 A1 | 3/2009 | Huang |
| 2009/0079931 A1 | 3/2009 | Yang |
| 2009/0122254 A1 | 5/2009 | Van Der Heijde et al. |
| 2009/0151037 A1 | 6/2009 | Hsu |
| 2009/0217444 A1 | 9/2009 | Pan |
| 2009/0225271 A1 | 9/2009 | Radmard et al. |
| 2009/0300830 A1 | 12/2009 | Mage |
| 2009/0313746 A1 | 12/2009 | Wang |
| 2009/0323015 A1 | 12/2009 | Siu |
| 2010/0186153 A1 | 7/2010 | Reyes et al. |
| 2010/0201937 A1 | 8/2010 | Gardaz |
| 2010/0231850 A1 | 9/2010 | Hones |
| 2011/0170049 A1 | 7/2011 | Chen |
| 2011/0194065 A1 | 8/2011 | Belbey et al. |
| 2011/0242479 A1 | 10/2011 | Radmard et al. |
| 2011/0258758 A1 | 10/2011 | Renaud |
| 2011/0279771 A1 | 11/2011 | Chen |
| 2012/0127421 A1 | 5/2012 | Li |
| 2012/0255104 A1 | 10/2012 | Didier |
| 2012/0257159 A1 | 10/2012 | Silver |
| 2013/0019374 A1 | 1/2013 | Schwartz |
| 2013/0083285 A1 | 4/2013 | McNeal et al. |
| 2013/0104300 A1 | 5/2013 | Park |
| 2014/0063437 A1 | 3/2014 | Cater et al. |
| 2014/0063438 A1 | 3/2014 | Cater et al. |
| 2014/0078460 A1 | 3/2014 | Chang et al. |
| 2016/0216533 A1 | 7/2016 | Calilung et al. |
| 2017/0095371 A1 | 4/2017 | Cater et al. |
| 2017/0100287 A1 | 4/2017 | Calilung et al. |
| 2017/0160562 A1 | 6/2017 | McCabe et al. |
| 2017/0160563 A1 | 6/2017 | Calilung et al. |

FOREIGN PATENT DOCUMENTS

| | | |
|---|---|---|
| EP | 0 496 292 | 1/1991 |
| EP | 0 495 767 | 7/1992 |
| EP | 1382989 | 1/2004 |
| EP | 1 810 648 | 7/2007 |
| EP | 1 830 221 | 9/2007 |
| EP | 2 042 910 | 4/2009 |
| EP | 2 090 921 | 8/2009 |
| FR | 1 126 329 | 11/1956 |
| FR | 1290346 A | 4/1962 |
| FR | 2 088 866 | 1/1972 |
| FR | 2 626 682 | 8/1989 |
| FR | 2 684 292 | 6/1993 |
| FR | 2 800 173 | 4/2001 |
| GB | 468443 | 7/1937 |
| GB | 512419 | 9/1939 |
| GB | 2055222 | 2/1981 |
| GB | 2181859 | 4/1987 |
| GB | 2199155 | 6/1988 |
| GB | 2278459 | 11/1994 |
| JP | 62-3774 Y2 | 7/1926 |
| JP | 56-126611 | 2/1955 |
| JP | 56-066915 | 6/1981 |
| JP | 57-176119 | 11/1982 |
| JP | 59-79827 | 5/1984 |
| JP | 59-104127 | 6/1984 |
| JP | 60-094624 | 6/1985 |
| JP | 60-146218 | 8/1985 |
| JP | 60-143420 | 9/1985 |
| JP | 61-160422 | 10/1986 |
| JP | 219021 | 2/1990 |
| JP | 02-240360 | 9/1990 |
| JP | 07-032628 | 2/1995 |
| JP | 07-64028 | 3/1995 |
| JP | 07-140423 | 6/1995 |
| JP | 7-234385 | 9/1995 |
| JP | 3021121 U | 2/1996 |
| JP | 08-062544 | 3/1996 |
| JP | 10-239642 | 9/1998 |

(56) References Cited

FOREIGN PATENT DOCUMENTS

| | | |
|---|---|---|
| JP | 2002-228986 | 8/2002 |
| JP | 2003-536093 | 12/2003 |
| JP | 2005-067551 | 3/2005 |
| JP | 2009-139921 | 6/2009 |
| JP | 2010-224130 | 10/2010 |
| JP | 2012-509497 | 4/2012 |
| KR | 10-2014-0027745 | 3/2014 |
| WO | WO 94/29763 | 12/1994 |
| WO | WO 97/41815 | 11/1997 |
| WO | WO 99/64918 | 12/1999 |
| WO | WO 2005/119343 | 12/2005 |
| WO | WO 2007/049070 | 5/2007 |
| WO | WO 2008/125743 | 10/2008 |
| WO | WO 2010/021419 | 2/2010 |
| WO | WO 2011/117909 | 9/2011 |
| WO | WO 2013/154582 | 10/2013 |
| WO | WO 2014/124352 | 8/2014 |
| WO | WO 2015/148770 | 10/2015 |

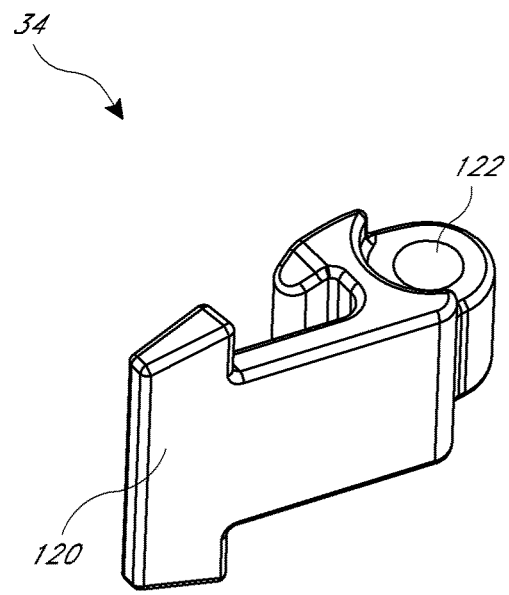
FIG. 9A
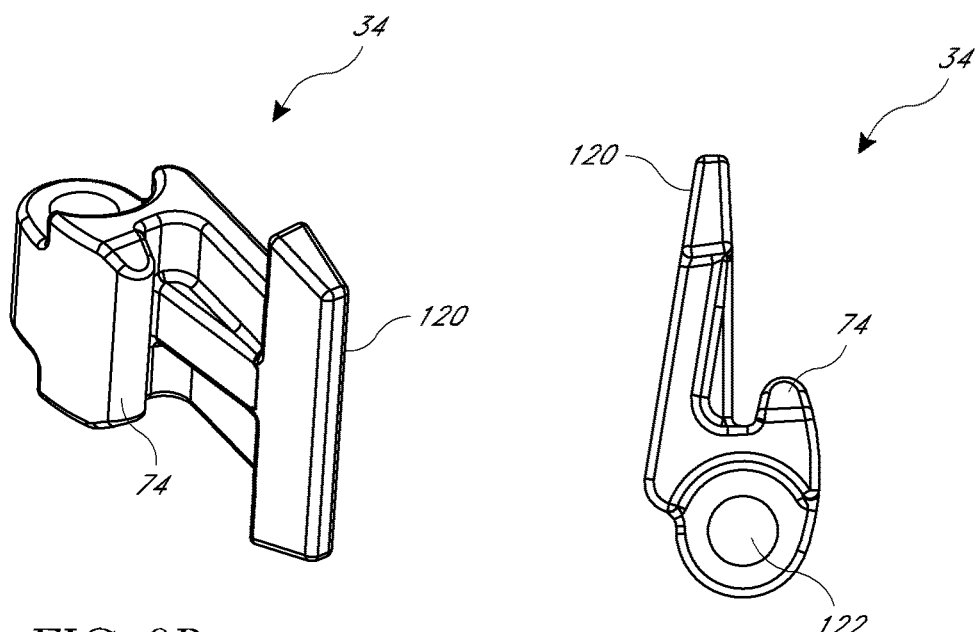
FIG. 9B
FIG. 9C

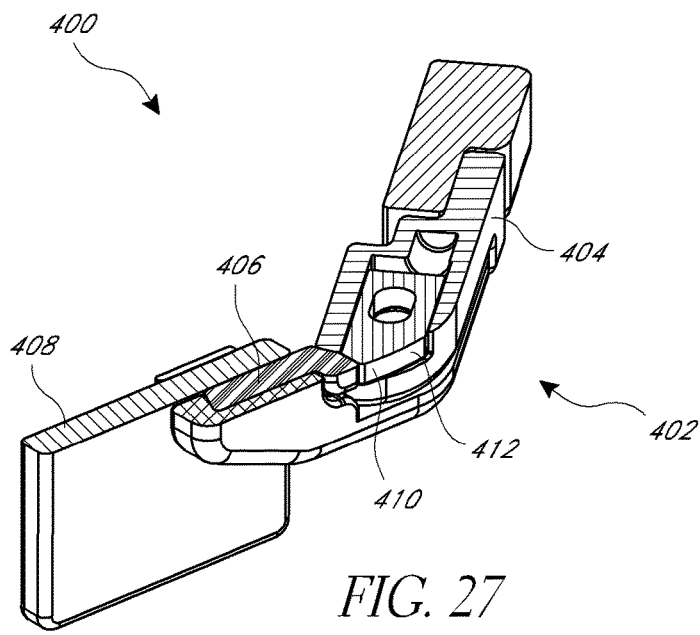
FIG. 27
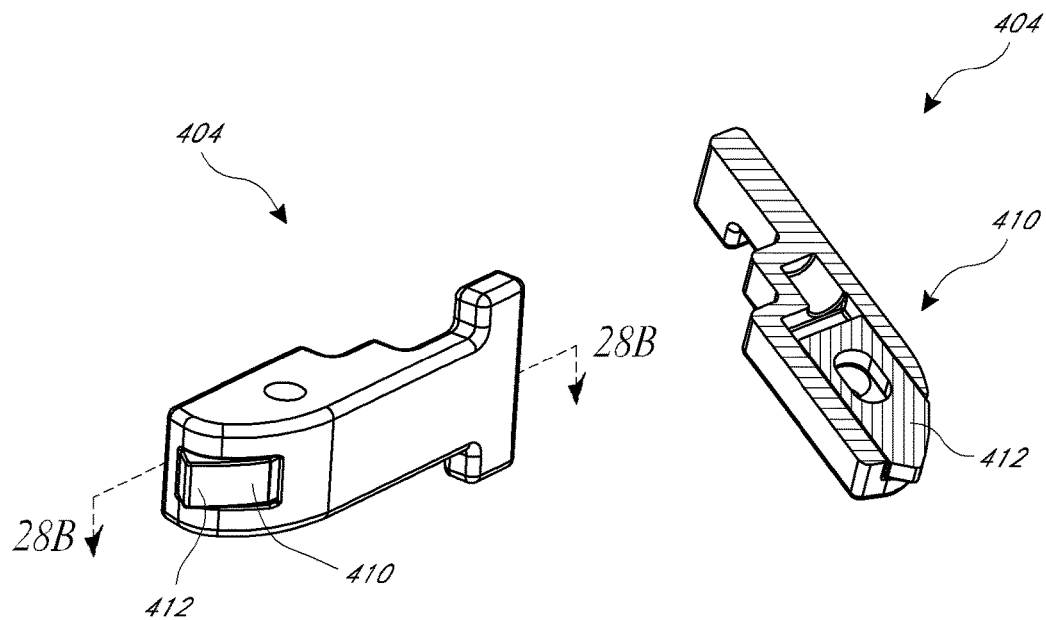
FIG. 28A
FIG. 28B

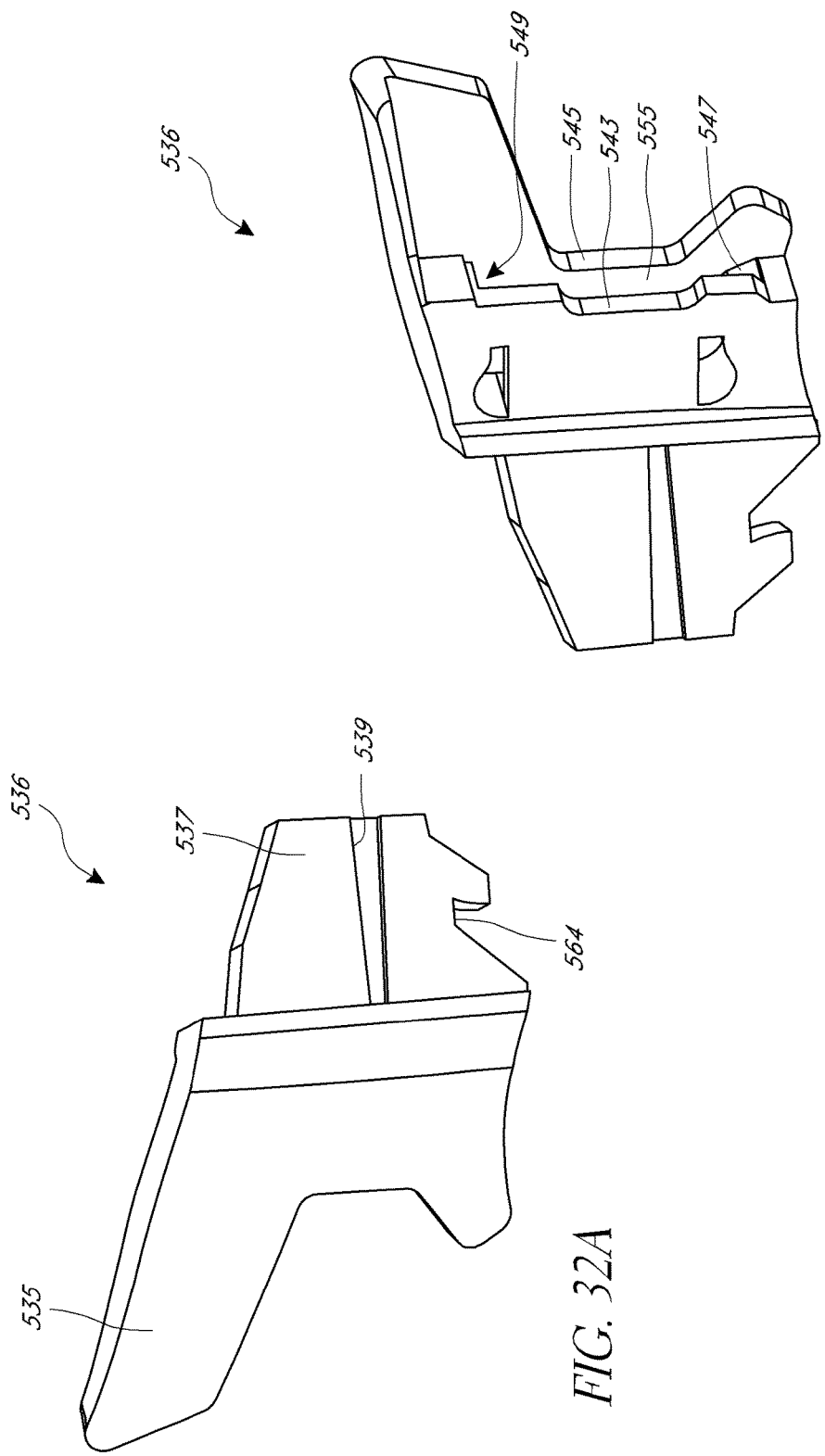

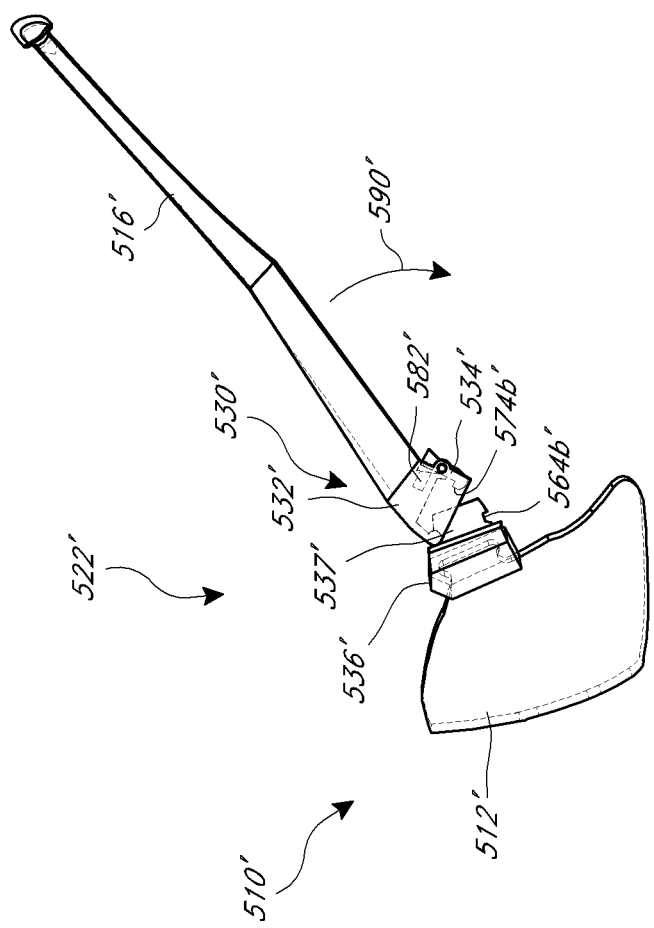

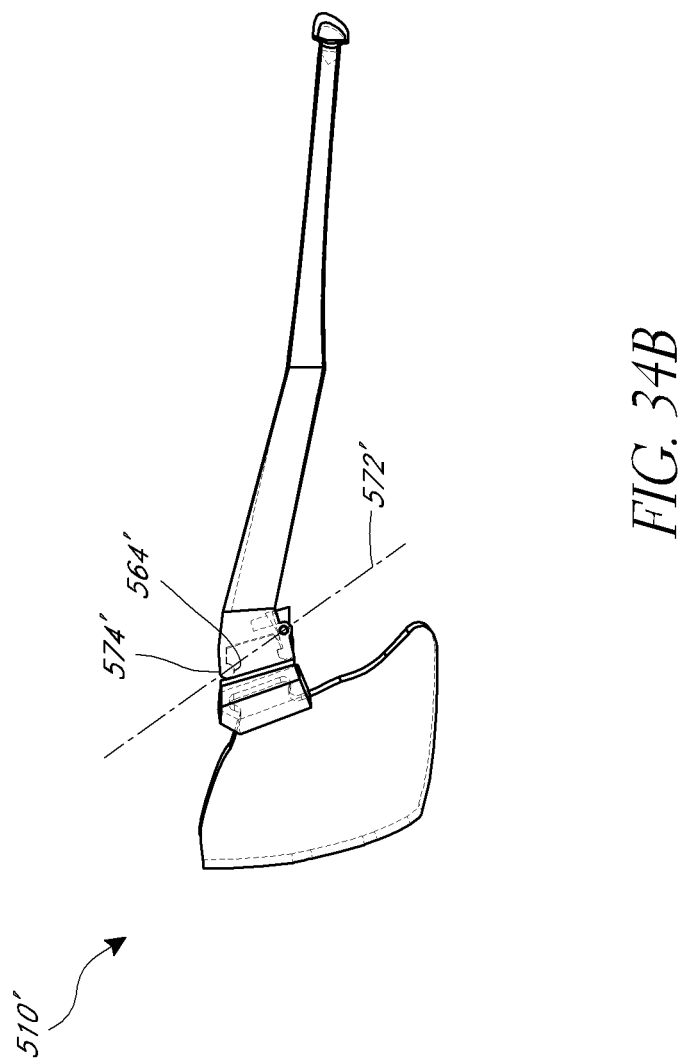

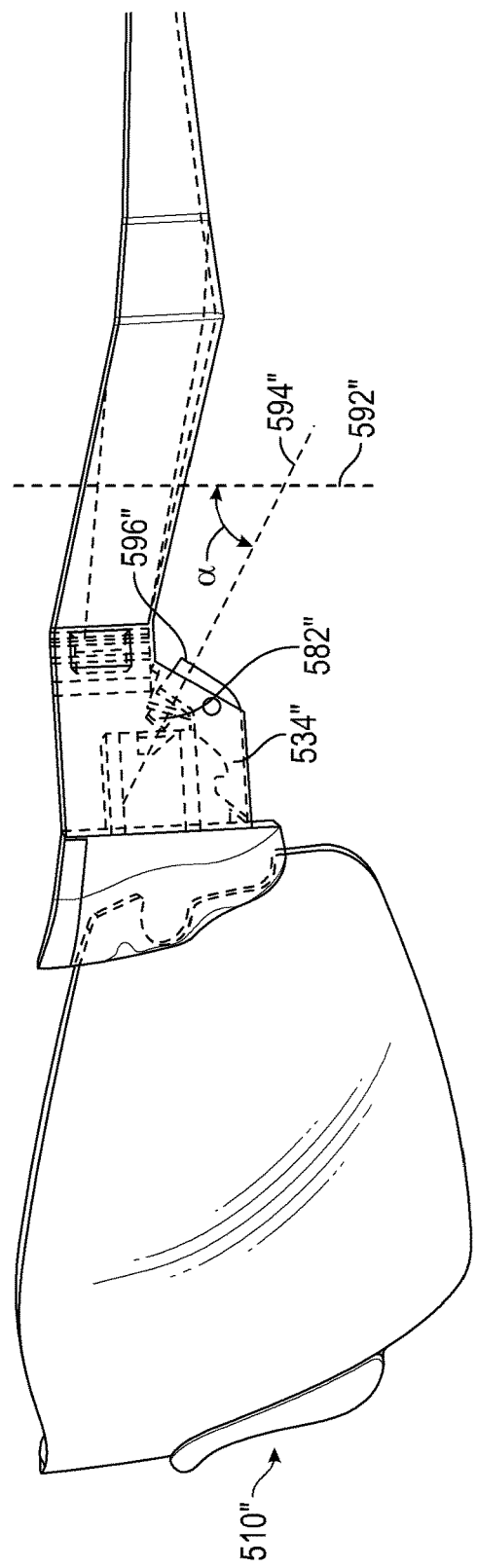

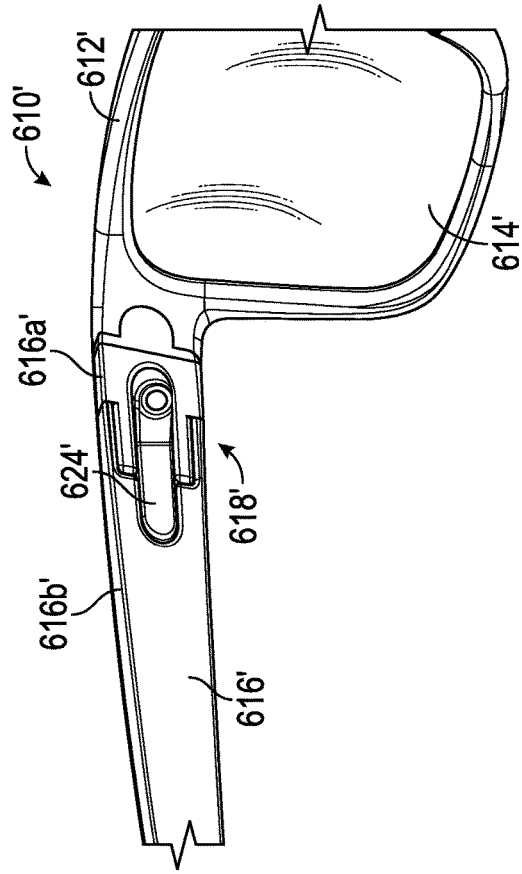
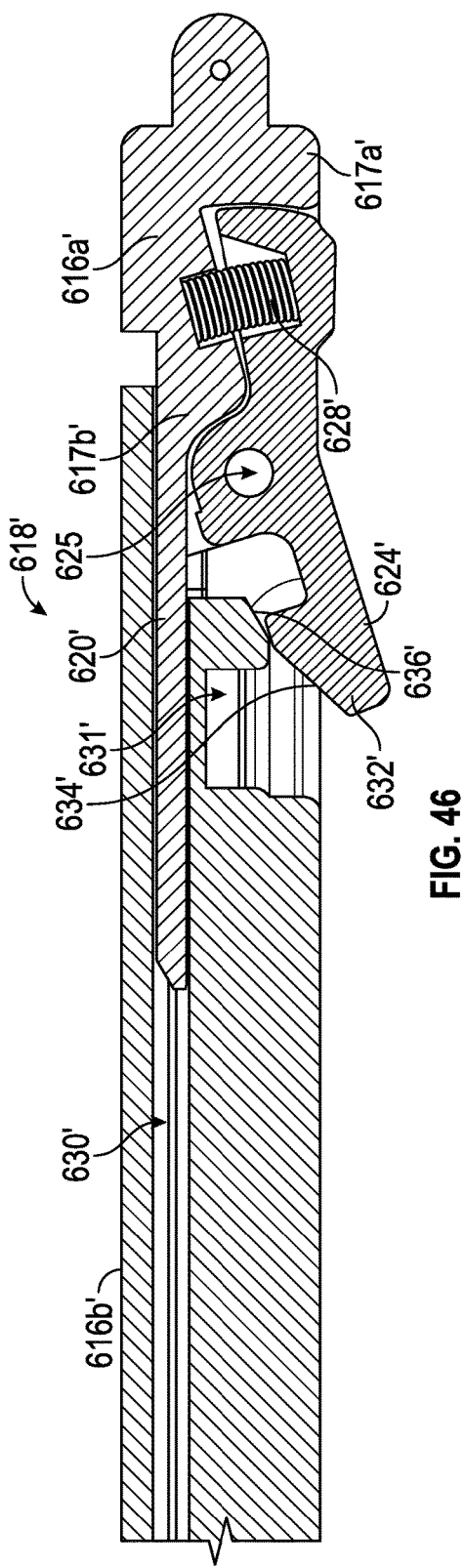

MOUNTING MECHANISM FOR EYEWEAR

RELATED APPLICATIONS

This application claims priority to U.S. Provisional Application No. 62/326,460, filed on Apr. 22, 2016. This application is related to International Application No. PCT/US2015/022674, filed on Mar. 26, 2015 and published as WO 2015/148770, which claims the benefit of U.S. Provisional Application No. 61/971,433, filed on Mar. 27, 2014. The entire contents of the applications identified above are incorporated by reference herein and made a part of this specification.

BACKGROUND

Field

The embodiments described herein relate generally to mounting systems for eyewear, and more specifically to methods and apparatuses for mounting and retaining optical lenses.

Background

A wide variety of improvements have been made in recent years in the eyewear field, particularly with respect to eyewear intended for use in active sports or as fashion sunglasses. These eyewear designs provide a variety of functional improvements, such as maximizing interception of peripheral light, reducing optical distortion and increasing the wearer's comfort level, compared to previous active sport eyewear.

A continuing objective in the field of high quality eyewear, particularly that is intended for use in high speed action sports, is minimizing distortion introduced by the eyewear. Distortion may be introduced by any of a variety of influences, such as poor construction materials for the optical portion of the lens and inferior polishing and/or molding techniques for the lens. In addition, optical distortion can result from the interaction of the lens with the frame, such as changes in the shape of the lens orbital or poor orientation of the lens with respect to the wearer's normal line of sight.

Eyeglass systems which use a polymeric or metal wire frame are especially susceptible to bending and flexing due to a variety of environmental causes such as impact, storage-induced forces, forces resulting from the assembly process of the eyewear, and exposure to sunlight and heat. Flexing of the lens or uncontrolled deviation of the orientation of one lens with respect to the other or with respect to the earstems can undesirably change the optical characteristics of the eyeglasses, whether the optical lens is corrective (prescription) or noncorrective.

Additionally, many eyewear systems are assembled in which the lens is retained using an interference fit. Dual lens eyewear comprises a frame having a pair of orbitals that support lenses of the eyeglasses, either partially or entirely around the lenses. The frame is usually formed as a single component that is later hingedly attached to left and right earstems that allow the eyeglasses to be worn by a user. In some cases, the left and right orbitals generally continuously surround the respective left and right lenses. In order to accommodate the lenses in the orbitals of the frame, the orbitals may include a groove that runs within the perimeter of the orbital. The bottom of the groove is generally formed to match the perimeter geometry of the lens. During assembly of the eyeglass, the lens is forcibly inserted into the groove of the orbital to produce a very tight interference fit, which can produce deformation. Unfortunately, such deformation can produce optical distortions or other unwanted stresses on the lenses.

A further consideration in eyeglass design is the ease of interchangeability of the lens and/or earstems. In dual lens eyeglasses having a continuous annular orbital, for example, the removal of the lens such as for replacement can be difficult and often impossible for the end user in some cases.

SUMMARY

Several advantageous features can be present in embodiments of eyewear, such as an eyeglass or goggle, that incorporates one or more of the features disclosed herein. While these features may be illustrated with regard to a unitary lens eyeglass, these features can also be incorporated into dual lens eyewear or into a goggle. Moreover, while these features may be illustrated with regard to a dual lens eyewear, these features can also be incorporated into a unitary lens eyewear or into a goggle. Accordingly, the present discussion and embodiments are intended to illustrate features that can be applied to dual or unitary lens eyeglasses or goggles. Thus, goggle embodiments can be provided which include the advantageous features disclosed herein. As used herein, in accordance with the customary understanding in this art, the term "eyeglass" and similar terms include products with glass or non-glass lens that are corrective or non-corrective.

Further, a continuing objective in the field of high performance eyewear, particularly for eyewear which is intended for use in high-speed action sports or military applications, is ballistic resistance and lens stability. Various improvements have been made that enable a wearer to quickly modify eyewear using replaceable components, earstems, and/or lenses, such by using the systems disclosed in U.S. Pat. Nos. 4,730,915, 5,387,949, 7,347,545, and 9,188,792, the entirety of the disclosure of each of which is incorporated herein by reference. In some embodiments disclosed herein, additional support can be provided to a replaceable or removable lens in order to enhance the ballistic resistance and lens stability of an eyeglass or goggle. Some examples of support features are shown in Applicants' U.S. Patent Application Publication No. 2010/0085533, published on Apr. 8, 2010, now U.S. Pat. No. 7,954,942, issued on Jun. 7, 2011, the entirety of which is incorporated herein by reference. Further examples of support features are shown in Applicants' copending U.S. Pat. Nos. 8,192,015, 8,469,510, and 8,881,316, the entirety of the disclosure of each of which are incorporated herein by reference.

In some embodiments, at least in part, a durable eyeglass or goggle design can enable the lens to be secured with an earstem of the eyeglass or goggle using one or more retention assemblies or devices. Further, a lens of the eyeglass or goggle can comprise corresponding engagement features that enable the lens to be coupled to the earstem.

Some embodiments can advantageously securely retain the lens relative to the frame while generally preserving optimal optical characteristics (e.g., without undermining, diminishing, or ruining the optical characteristics of the lens). For example, the lens can be secured to and/or supported by the frame in a manner that generally preserves the as-molded geometry of the lens. Moreover, embodiments disclosed herein can advantageously provide an eyeglass or goggle in which the lens and/or ear stems can be easily removed and replaced by the wearer while enabling the wearer to mount the lens while providing superior ballistic resistance and lens stability.

Some embodiments can advantageously provide eyewear (e.g., eyeglass or goggle) in which one or more lenses, lens-attachments, front frames, and/or earstems can be selectively removed, replaced, and/or secured or unsecured to one another by a consumer, without tools or other specialized equipment, without damaging or wearing down such components, and/or while generally preserving optimal optical characteristics (e.g., without undermining, diminishing, or ruining the optical characteristics of the lens). For example, in some embodiments, the lens or lens-attachment can be repeatedly attached and repeatedly detached from the earstems or the frame many times (e.g., at least 20 times, or at least 50 times) by a user in a manner that generally preserves the as-molded geometry of the lens (e.g., without scratching, cracking, bending, distorting, and/or deforming the lens), and/or that generally preserves the geometric shape(s) of the attaching component(s), and/or that generally preserves the interfacing connection between the attaching components, resisting the formation of a wear-down region that may otherwise disable or weaken a connection between the attaching components.

To achieve some of the above-noted benefits, some embodiments provide an eyeglass or goggle eyewear that can support at least one lens in a field of view of a wearer. The eyewear can comprise retention means for securing the lens relative to the earstems. The retention means can comprise one or more retention assemblies. The retention assembly can comprise a stationary or passive retention mechanism and/or a movable or active retention mechanism for securing the lens relative to the earstem.

Further, some embodiments of a retention assembly can comprise one or more lenses having at least one engagement portion. The engagement portion(s) of the lens can have a shape that is generally complimentary to a corresponding retention mechanism(s), engagement structure(s), or restraining portion(s) of the earstem so that the lens and the earstem can closely fit together. For example, the engagement portion(s) of the lens can comprise a recess, protrusion, aperture, detent, peripheral cutout, or other engageable structure. The retention mechanism(s), engagement structure(s), or restraining portion(s) of the earstem can engage the engagement portion(s) of the lens for securing the lens relative to the earstem.

For example, in a unitary lens embodiment, retention mechanisms can interact with opposing sides or ends of the lens(es). For example, one of the retention mechanisms of the lens can be located along a lateral side of the lens and can form a coupling between the lens and an earstem of the eyeglass. The retention mechanism of each earstem can be disposed along an anterior end of the earstem and can be configured to receive, engage with, and/or be received by a respective retention mechanism of the lens. The retention assembly can restrain one or more degrees of freedom of movement of the lens relative to the earstem.

In some embodiments, the earstem can comprise a movable or active lens retention mechanism. The active lens retention mechanism can be configured as a lever or latch device for engaging an engagement portion of the lens to secure the lens relative to the earstem. The latch device can comprise an engagement structure that is movable between a disengaged position and an engaged position for engaging with the retention mechanism or engagement portion of the lens. The engagement structure of the latch device can directly or indirectly engage with the retention mechanism or engagement portion of the lens.

In some embodiments, eyewear is provided that includes at least one lens, at least one earstem, a retention assembly comprising an engagement protrusion attached to the lens and a coupling mechanism attached to an end of the earstem, the coupling mechanism comprising, and a housing configured to receive the engagement protrusion and a lever mechanism being rotatably mounted relative to the housing to move between open and closed positions for disengaging or engaging with the engagement protrusion, wherein the lever mechanism is configured to rotate about a generally horizontal axis of rotation.

Certain embodiments of the eyewear can include any one, or any combination, of any of the following. In some embodiments, the engagement protrusion is configured to be permanently mounted to the lens. In some embodiments, a portion of a top and a lateral edge of the lens are configured to be received within an opening formed between two side walls of the engagement protrusion. In some embodiments, the lateral edge of the lens includes at least one protrusion configured to form an interference fit with a curved surface formed in the opening of the engagement protrusion. In some embodiments, the engagement protrusion is configured to be removably attachable to the lens. In some embodiments, the horizontal axis of rotation is configured to extend through first and second sides of the housing in a direction transverse to a longitudinal axis of the housing.

Some embodiments of the eyewear can include any one, or any combination, of any of the following. In some embodiments, the engagement protrusion comprises an interlocking portion configured to receive a corresponding engagement portion of the lever mechanism when the lever mechanism is in the closed position to securely mount the earstem relative to the lens. In some embodiments, the lever mechanism is rotatable from the open position towards the closed position in an anterior direction. In some embodiments, the lever mechanism is rotatable from the open position towards the closed position in the anterior direction towards a bottom portion of the housing. In some embodiments, a portion of the lever mechanism is positioned within a cavity formed in the bottom portion of the housing.

Certain embodiments of the eyewear can include any one, or any combination, of any of the following. In some embodiments, the lever mechanism comprises a biasing member configured to urge the lever mechanism to the closed position. In some embodiments, the biasing member is configured to extend and retract along a generally vertical axis. In some embodiments, the biasing member is configured to extend and retract at a non-zero angle relative to a vertical axis.

Some embodiments of the eyewear can include any one, or any combination, of any of the following. In some embodiments, the lever mechanism is rotatably and slidably mounted relative to the housing to allow the lever mechanism to move between open and closed positions for disengaging or engaging with the engagement protrusion. In some embodiments, a posterior portion of the engagement protrusion is configured to be movable in a generally anterior-posterior direction to be received within an opening of the housing. In some embodiments, the posterior portion of the engagement protrusion comprises at least one engagement structure configured to engage with at least one engagement member formed on an interior surface of the opening of the housing as the engagement protrusion is moved into the housing. In some embodiments, the engagement structure comprises at least one tapered channel formed on a lateral surface of the posterior portion.

Certain embodiments of the eyewear can include any one, or any combination, of any of the following. In some embodiments, the earstem is hingedly coupled to the housing at a posterior position relative to a posterior end of posterior portion of the engagement protrusion when the eyewear is assembled. In some embodiments, the earstem is hingedly coupled to the housing at an anterior position relative to a posterior end of posterior portion of the engagement protrusion when the eyewear is assembled. In some embodiments, an anterior portion of the housing is configured to be rotatable onto a posterior portion of the engagement protrusion.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples of embodiments in accordance with the disclosure, and are not to be considered limiting of its scope, the disclosure will be described with additional specificity and detail through the use of the accompanying drawings.

FIGS. 9A-C are front and rear perspective and top views of a lever mechanism of the retention assembly of FIG. 4A, according to an embodiment.

FIG. 27 is a cross-sectional perspective view of the retention assembly shown in FIG. 24 taken along section lines 27-27 of FIG. 24, wherein the coupling mechanism is in an engaged position, according to an embodiment.

FIG. 28A-B are a perspective and perspective cross-sectional views of the lever mechanism and biasing mechanism of the retention assembly of FIG. 24, according to an embodiment.

FIGS. 32A-32B are front and rear perspective views of an engagement protrusion according to an embodiment.

FIGS. 34A-34B are side views of an embodiment of an eyeglass.

FIG. 35 is a partial side perspective view of an eyeglass in accordance with an embodiment.

FIG. 45 is a rear perspective view of an embodiment of an eyewear with components in a coupled configuration.

FIG. 46 is a cross-sectional view of components of the eyewear of FIG. 45 in transition between a coupled and decoupled configuration.

Dash-dash broken lines in FIGS. 34A-37C illustrate structures of components which may be positioned beneath or within other components.

DETAILED DESCRIPTION

While the present description sets forth specific details of various embodiments, it will be appreciated that the description is illustrative only and should not be construed in any way as limiting. Additionally, although particular embodiments of the present inventions may be disclosed or shown in the context of unitary or dual lens eyewear systems, such embodiments can be used in both unitary and dual lens eyewear systems. Further, although embodiments disclosed herein can be used with eyeglasses, such embodiments can also be used with goggles. Embodiments are illustrated and discussed generally with respect to dual lens eyeglasses for sake of brevity, though such embodiments can be used with unitary or dual lens eyeglasses or goggles.

Further, although particular embodiments may be disclosed or shown in the context of frameless eyewear (eyeglasses or goggles) having a unitary lens, such embodiments can be used with frames having either full or partial orbitals. Further, although the mounting mechanisms or retention assemblies disclosed herein are shown as attaching an earstem to a lens, embodiments of these mechanisms or assemblies can be used to interconnect one or more components of the eyewear, such as lens(es), earstems, frames, and other components. Retention components and structures in accordance with embodiments disclosed herein can also be utilized to interconnect one or more components of the eyewear, such as earstems and/or frame components of the eyewear. The retention assemblies may be utilized either as the primary connector or as a secondary connector for cooperation with another retention assembly or system. Furthermore, various applications of such embodiments and modifications thereto are also encompassed by the general concepts described herein.

Figure 1:
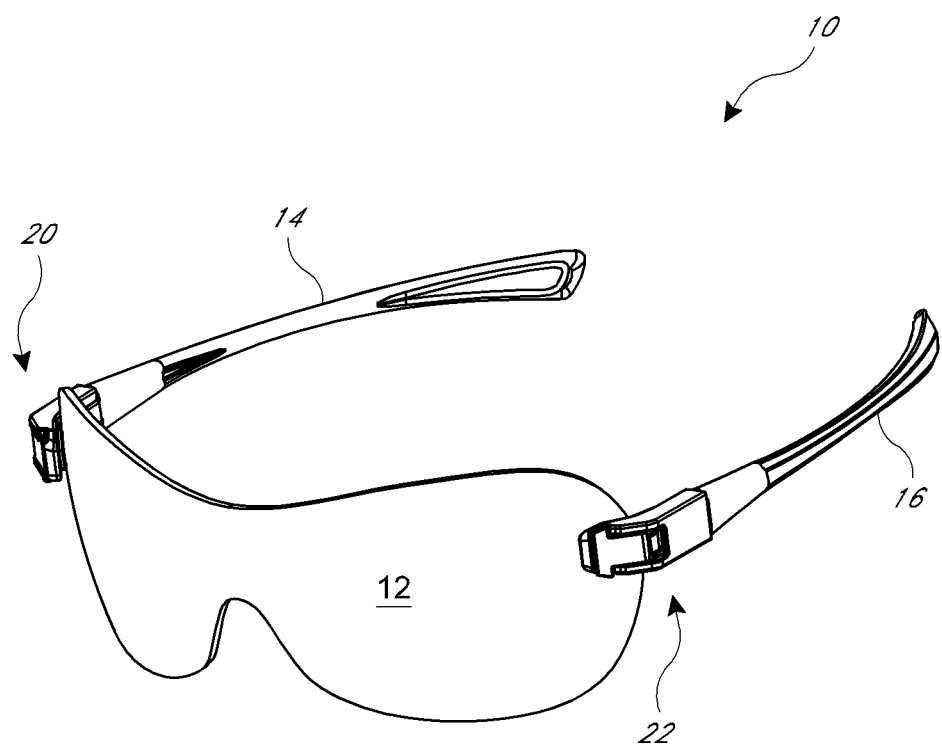
FIG. 1 is a front perspective view of an embodiment of an eyeglass.
Figure 2:
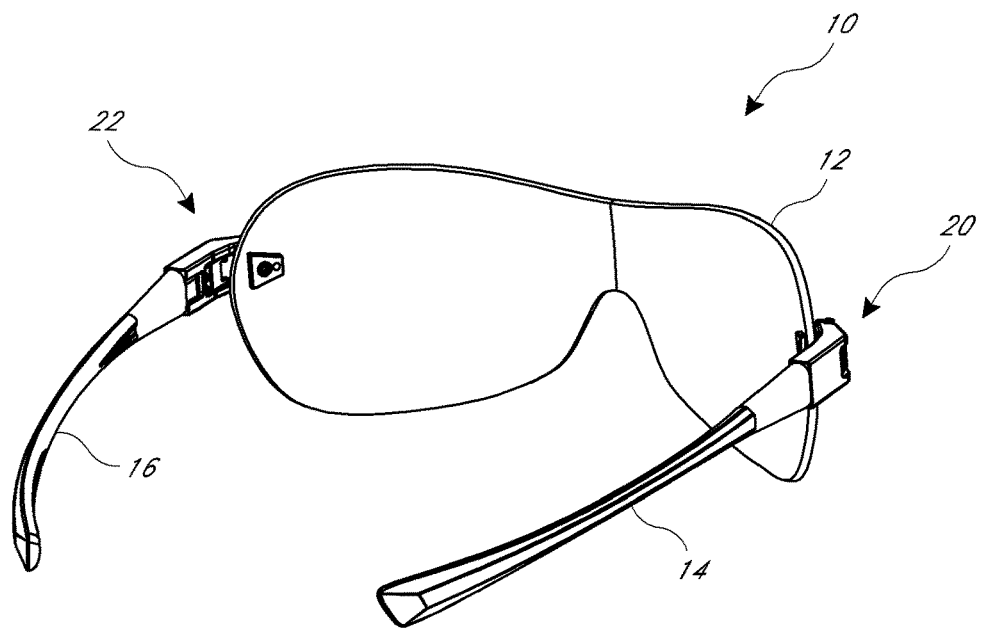
FIG. 2 is a rear perspective view of the eyeglass of FIG. 1.

FIGS. 1-28B illustrate embodiments of the present inventions. FIG. 1 is a front perspective view of an eyeglass 10 in accordance with an embodiment of the present inventions. FIG. 2 is a rear perspective view of the eyeglass 10. As illustrated, the eyeglass can have a unitary lens 12 and a pair of earstems 14, 16. The earstems 14, 16 can be removably attached to the lens 12 using respective retention mechanisms 20, 22. The retention mechanisms 20, 22 can be used to interchange one unitary lens for another unitary lens in order to allow the wearer to customize the look and feel of the eyeglass 10. Additionally, one or more different nosepieces (not shown) can be coupled to and interchanged with the nosepiece opening of the lens.

Figure 3:
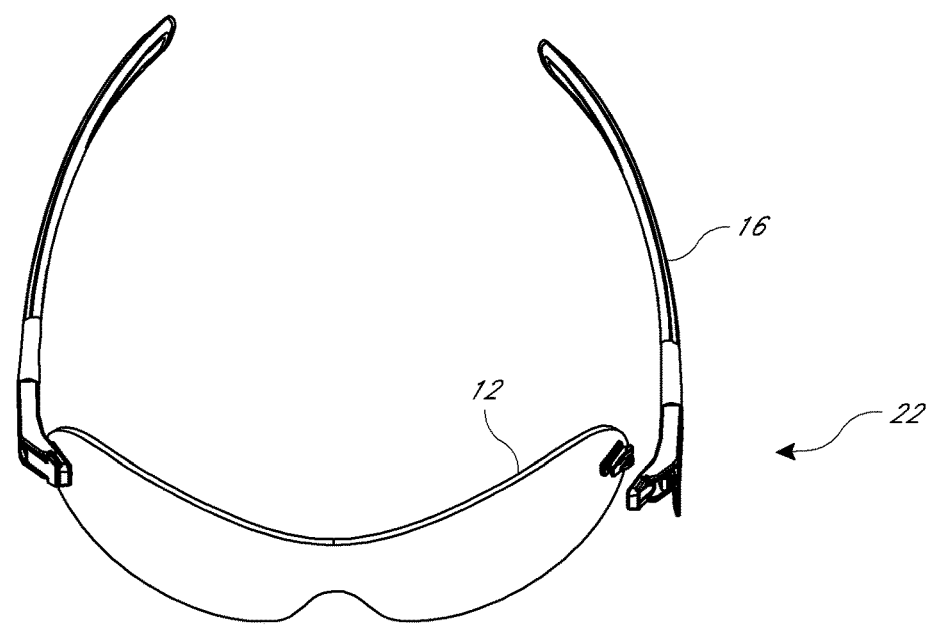
FIG. 3 is a front elevational view of the eyeglass of FIG. 1 wherein an earstem thereof is detached from the lens.
Figure 4A:
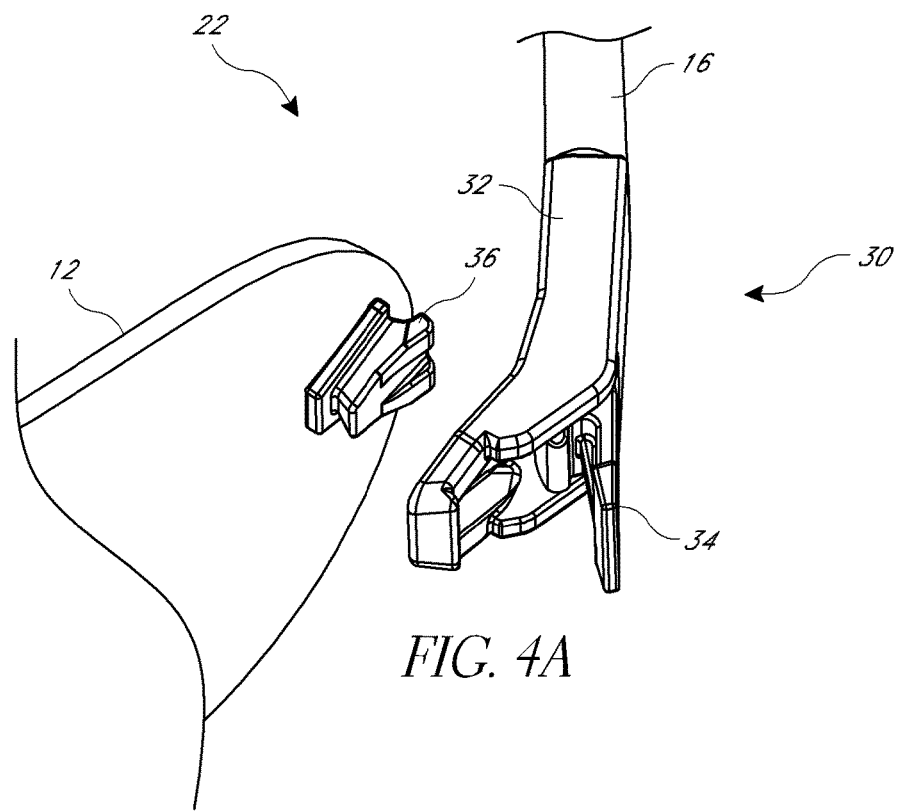
FIG. 4A is a front elevational view of a retention assembly, according to an embodiment.
Figure 4B:
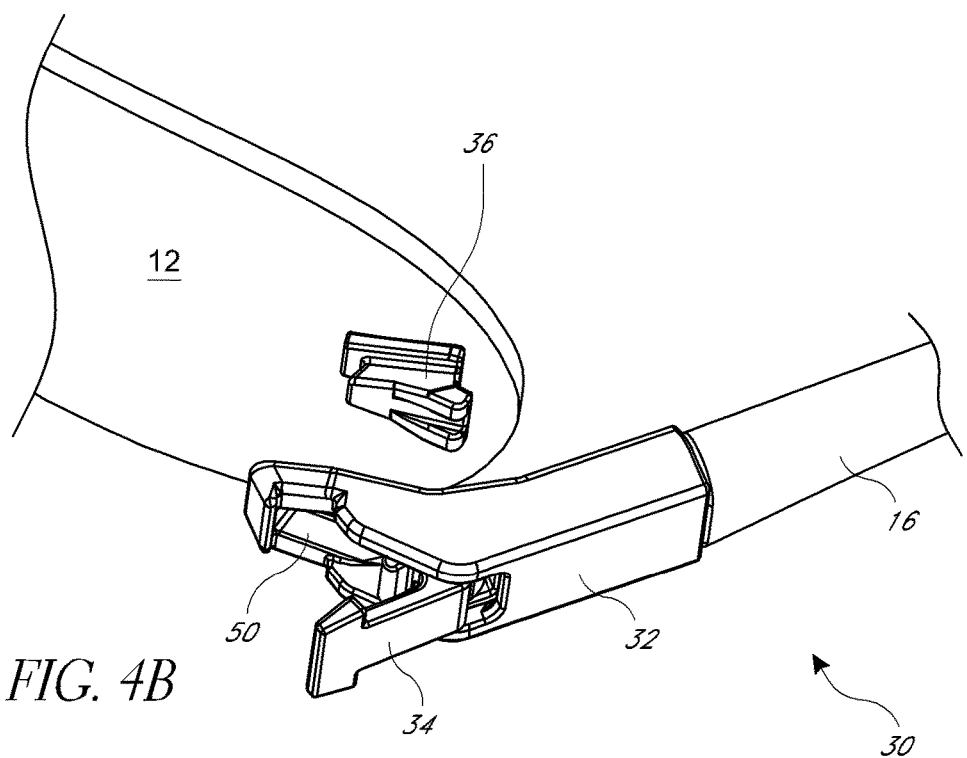
FIG. 4B is a side elevational view of the retention assembly shown in FIG. 4A.

As shown in FIG. 3, the retention assembly 22 can allow the earstem 16 to be decoupled from the lens 12. FIGS. 4A-B are enlarged elevational views of the retention assembly 22, according to an embodiment. As illustrated, the retention assembly 22 can comprise a coupling mechanism 30 that comprises a housing 32, a lever mechanism 34, an engagement protrusion 36, and in some embodiments, a biasing mechanism (not shown). The lever mechanism 34 can be rotatably mounted relative to the housing 32. The coupling mechanism 30 can be attached to an anterior end of the earstem 16. The engagement protrusion 36 can be mounted onto a lateral portion of the lens 12. The coupling mechanism 30 can be configured to receive and engage with the engagement protrusion 36. In some embodiments, the housing 32 of the coupling mechanism 30 can be configured to comprise an opening 50 that is configured to allow the engagement protrusion 36 to be removably inserted into the opening 50 and to engage with the housing 32. Features of the engagement between the engagement protrusion 36 and the coupling mechanism 30 are illustrated and discussed further herein.

Figures 5, 6A:
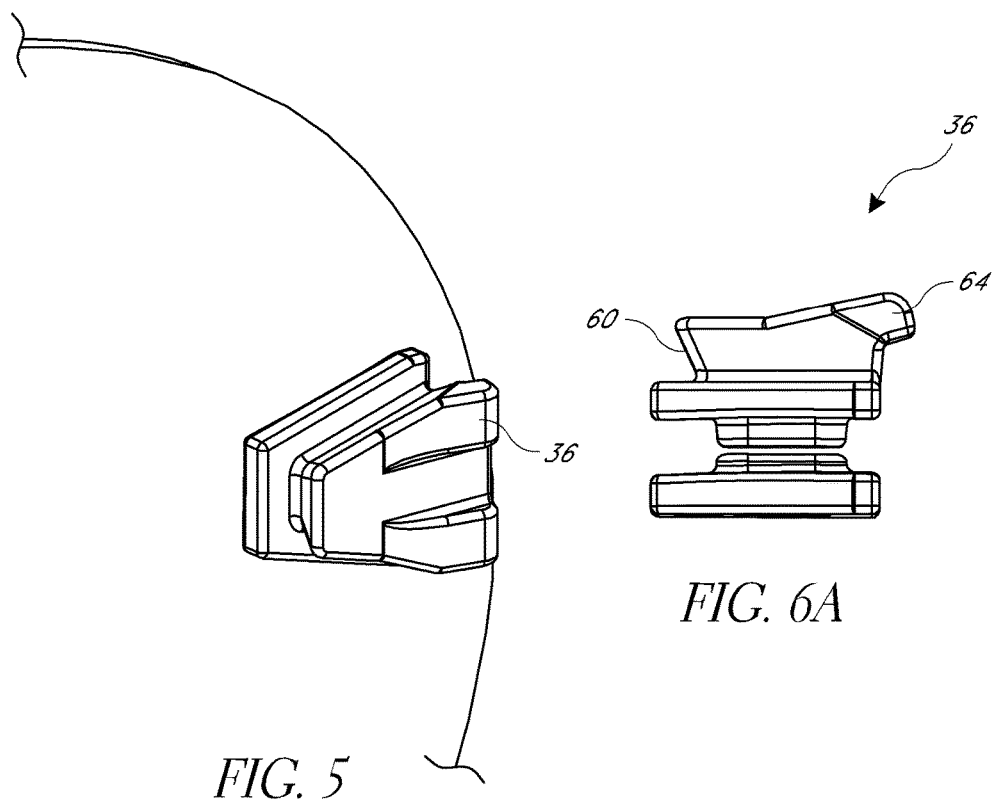
FIG. 5 is a front perspective view of an engagement protrusion attached to a lens of the retention assembly of FIG. 4A, in accordance with an embodiment.
FIG. 6A is a side view of the engagement protrusion of FIG. 5.
Figures 6B, 6C:
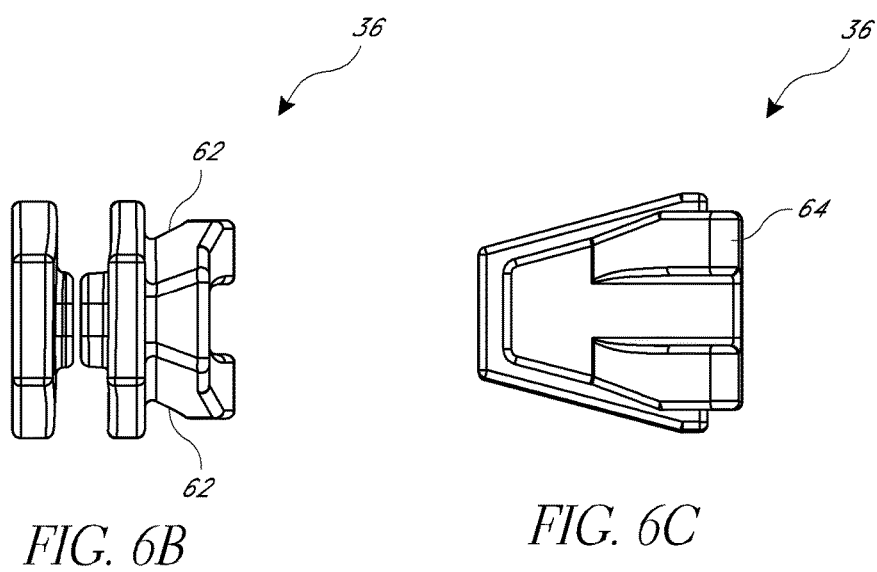
FIG. 6B is a front view of the engagement protrusion of FIG. 5.
FIG. 6C is a top view of the engagement protrusion of FIG. 5.

FIG. 5 is a front perspective view of the engagement protrusion 36 attached to the lens 12. As illustrated in FIGS. 6A-C, the engagement protrusion 36 can comprise a generally wedge-shape as seen from a top view and a generally wedge-shape as seen from a side view. FIG. 6A illustrates that a leading edge 60 can be inclined in order to provide an undercut section that can be engaged by a corresponding shape of the opening 50 of the housing 32. FIG. 6B also illustrates that lateral sides 62 of the protrusion 36 can also be inclined to provide an undercut section that can be engaged by a corresponding shape of the opening 50 of the housing 32. Some embodiments of the protrusion 36 can be configured such that the shape and configuration of the protrusion 36 need not incorporate wedge or undercut portions.

In accordance with some embodiments, such as those illustrated in FIGS. 5-6C, the shape of the engagement protrusion 36 can allow the engagement protrusion 36 to be easily inserted into a corresponding opening 50 of the housing 32. Further, in some embodiments, the engagement protrusion 36 can comprise an interlocking portion 64. The interlocking portion 64 can define an overhanging edge that can be interconnected with a corresponding hook or engagement portion of the lever mechanism, in accordance with some embodiments discussed further herein.

Figure 7A:
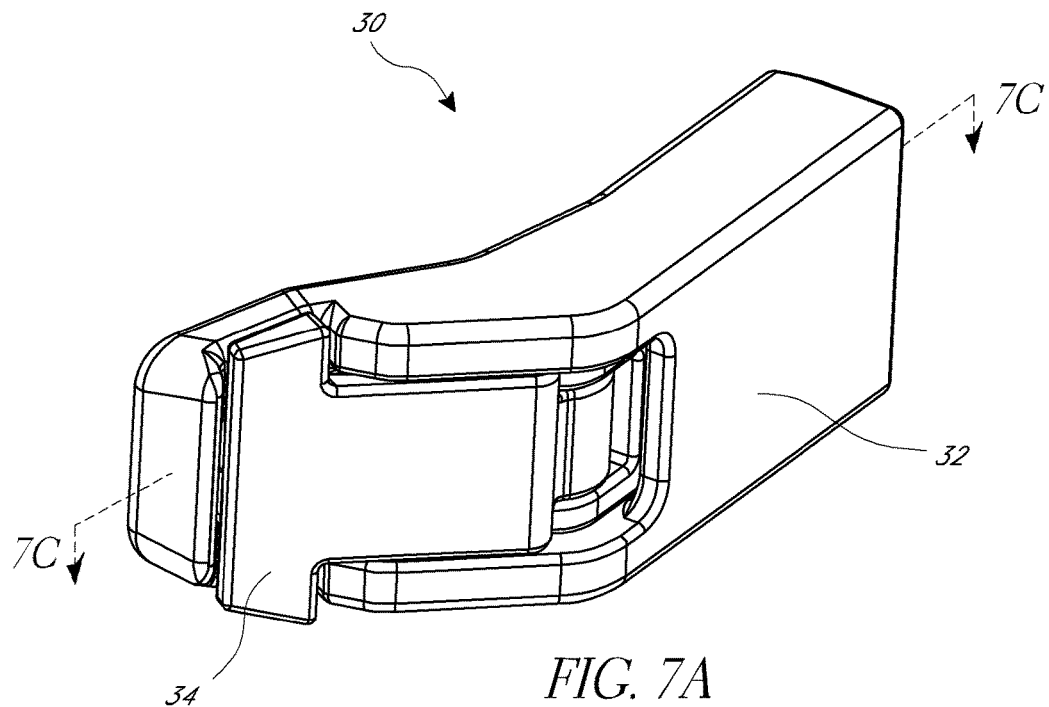
FIG. 7A is a front perspective view of a coupling mechanism of the retention assembly of FIG. 4A, in accordance with an embodiment.

FIG. 7A is a front perspective view of the coupling mechanism 30. The lever mechanism 34 can be rotatably mounted relative to the housing 32 in order to allow the lever mechanism 34 to be moved between open and closed positions. In some embodiments, the lever mechanism 34 can also be slidably mounted relative to the housing 32. Thus, rotational and sliding movements can be performed by a single mechanism of the retention assembly 22.

For example, a locking tab 74 of the lever mechanism 34 can be slidably and rotatably mounted to enable engagement or disengagement of the coupling mechanism 30 with the engagement protrusion 36. The movement of the locking tab 74 can allow the engagement protrusion 36 to be securely engaged on a plurality of edges or faces in order to securely mount the earstem 16 relative to the lens 12.

Figure 7B:
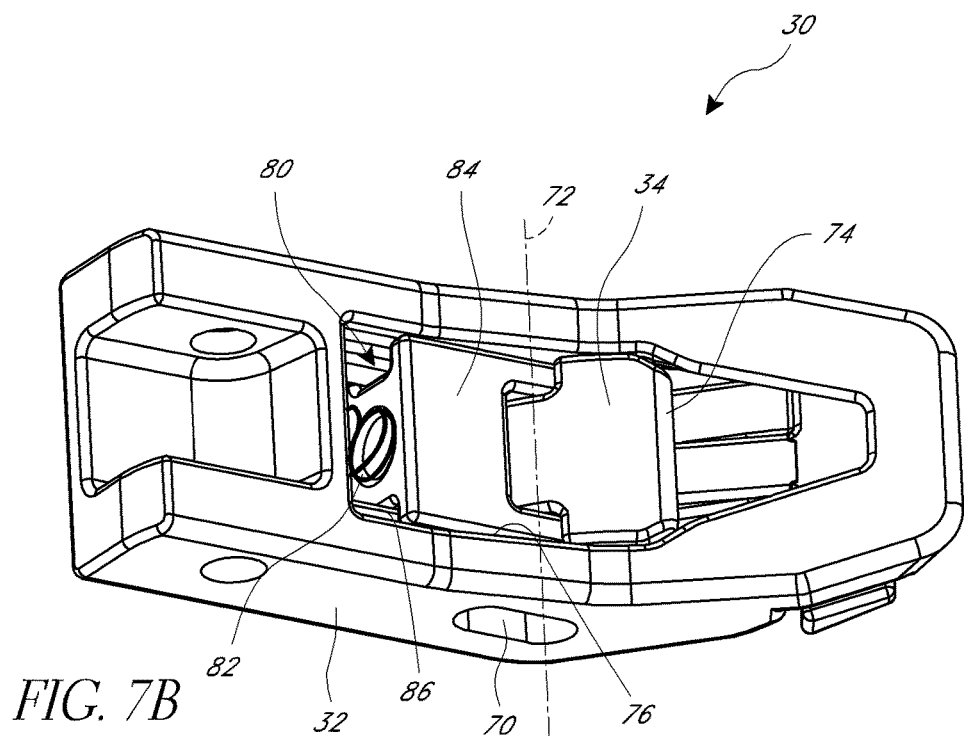
FIG. 7B is a rear perspective view of the coupling mechanism of FIG. 7A.

For example, as illustrated in FIG. 7B, the housing 32 can comprise a slot 70 and the lever mechanism 34 can be rotatably coupled relative to the housing 32 to define an axis of rotation 72. The slot 70 is not essential and can be omitted in some embodiments. The presence of the slot 70 can aid in the assembly of some embodiments that use a pin to rotatably interconnect the lever mechanism 34 relative to the housing 32.

The axis of rotation 72 (whether defined by a pin, protrusions, or other means for rotatably coupling the lever mechanism 34 relative to the housing 32) can be slidable within the housing 32 in order to allow the lever mechanism 34 to be rotatable and slidable relative to an interior or engagement cavity 76 of the housing 32.

In the illustrated embodiment, the coupling mechanism 30 can further comprise a sliding or locking mechanism 80 that can be disposed within the engagement cavity 76 of the housing 32 and can urge the lever mechanism 34 to a given position relative to the engagement cavity 76 of the housing 32. In some embodiments, the sliding or locking mechanism 80 can comprise a biasing mechanism 82, such as the spring, that urges an interconnecting block 84 toward an extended position. The interconnecting block 84 can provide a rotational coupling with the lever mechanism 34.

In some embodiments, the interconnecting block 84 can also comprise one or more of alignment grooves or structures 86 that allow the interconnecting block 84 to provide a linear sliding movement of the lever mechanism 34. In some embodiments, the interconnecting block 84 can also serve to maintain the alignment of the axis 72 with the engagement cavity 76.

In some embodiments, the coupling mechanism 30 can also comprise a pin or protrusion that rotatably couples an anterior end of the interconnecting block 84 with a posterior end of the lever mechanism 34 and with the slot 70 or a corresponding protrusion or recessed within the engagement cavity 76. In such embodiments, the alignment of the lever mechanism 34 and the sliding or locking mechanism 80 can be maintained relative to the engagement cavity 76 of the housing 32 during sliding movement thereof. For example, the pin or protrusion can comprise a separately-formed elongate pin that extends through apertures formed in the interconnecting block 84, the lever mechanism 34, and one or more slots of the housing 32. However, one or more protrusions can be formed on the interconnecting block 84, the lever mechanism 34, and/or the housing 32 that can be rotatably coupled with the interconnecting block 84, lever mechanism 34, and/or the housing 32. Various combinations and configurations can be developed using these teachings.

Figure 7C:
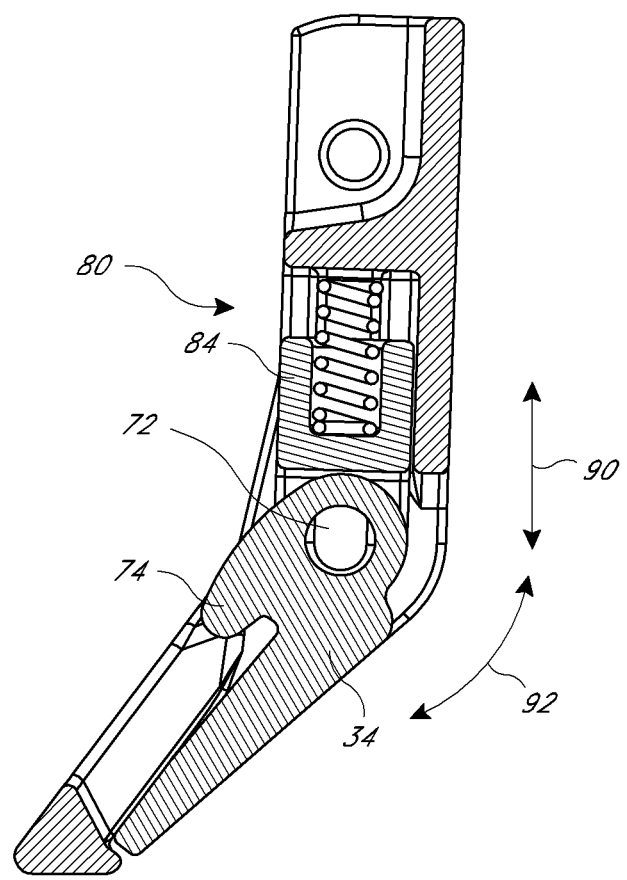
FIG. 7C is a cross-sectional top view of the coupling mechanism of FIG. 7A taken along section lines 7C-7C of FIG. 7A.
Figure 8A:
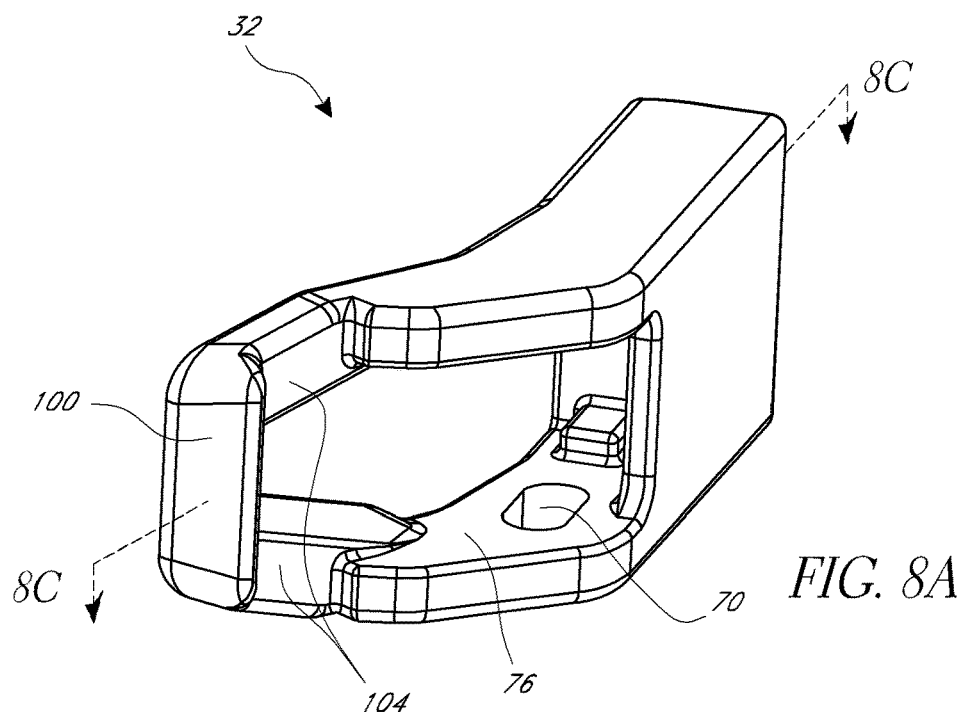
FIG. 8A is a front perspective view of a housing of the coupling mechanism of FIG. 7A, in accordance with an embodiment.
Figure 8B:
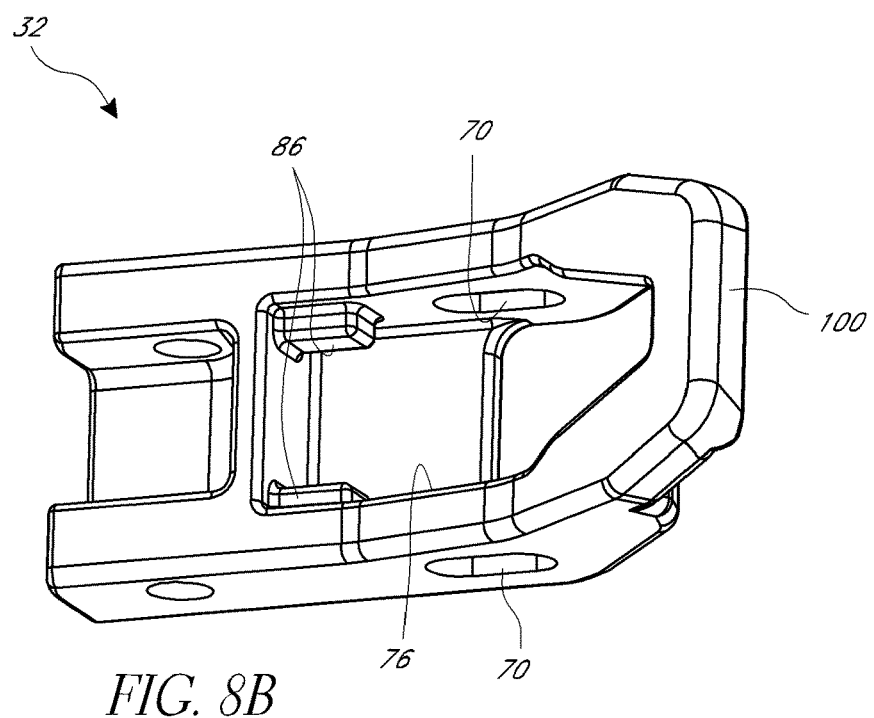
FIG. 8B is a rear perspective view of the housing of FIG. 8A.
Figure 8D:
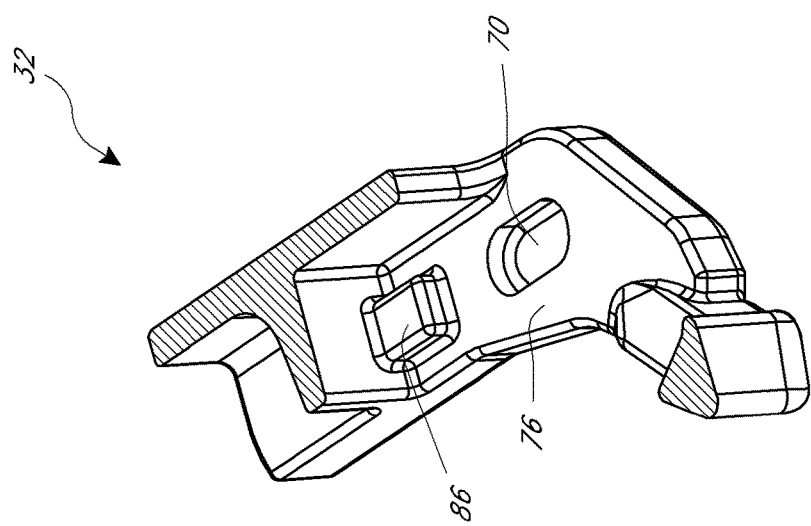
FIG. 8D is a perspective view of the cross-section of the housing shown in FIG. 8C.
Figure 8C:
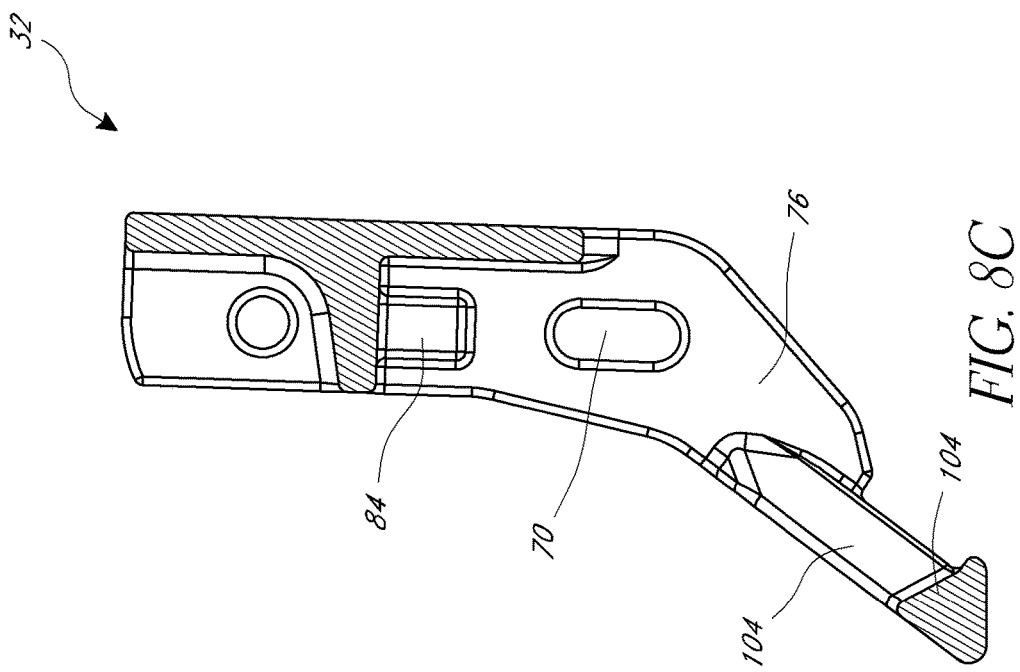
FIG. 8C is a cross-sectional top view of the housing of FIG. 8A taken along section lines 8C-8C of FIG. 8A.

FIG. 7C is a cross-sectional top view of the coupling mechanism of FIG. 7A taken along section lines 7C-7C of FIG. 7A. The embodiment of FIG. 7C can slide as shown by the arrows 90 or rotate as shown by the arrows 92. Such movement of the lever mechanism 34 can enable the locking tab 74 of the lever mechanism 34 to slide over the interlocking portion 64 of the engagement protrusion 36, rotate, and slide under the interlocking portion 64 to engage with the engagement protrusion 36. This interaction between the lever mechanism 34 and the engagement protrusion 36 can allow the earstem 16 two withstand significant forces from all directions, and especially lateral forces that would tend to dislodge or disengage the coupling mechanism 30 from the engagement protrusion 36.

FIGS. 8A-D illustrate various views of an embodiment of the housing 32. These figures illustrate an exemplary configuration of the engagement cavity 76 having a slot 70 disposed at upper and lower ends of the engagement cavity 76. Further, a pair of alignment protrusions 86 are also illustrated. In addition, an anterior end 100 of the housing 32 can define an opening 102 configured to receive the engagement protrusion 36 therein.

As illustrated, and some embodiments, the opening 102 can be wedge-shaped and comprise one or more sloped surfaces 104 that can interact with one or more sloped surfaces of the engagement protrusion 36. The wedge shape of the opening 102 can allow the engagement protrusion 36 to be easily inserted or removed from the opening 102. Further, the interaction of the sloped surfaces of the engagement protrusion 36 and the surfaces 104 can constrain the movement of the engagement protrusion 36 relative to the housing 32. Furthermore, the opening 102 and the engagement protrusion 36 can also be configured to comprise one or more straight edges, notches, or other distinctive shapes that prevent rotational movement of the engagement protrusion 36 while received within the opening 102.

Thus, in some embodiments, the interaction between the engagement protrusion 36 and the opening 102 can be sufficient to constrain all but one degree of movement of the engagement protrusion 36 relative to the housing 32. As discussed herein, various embodiments of a locking device are provided using a lever mechanism that can constrain the final degree of movement of the engagement protrusion 36 relative to the housing 32 such that an earstem can be securely mounted relative to the lens. As noted herein, embodiments of the coupling or retention mechanisms disclosed herein can be used not only between the earstem and a lens, but can also be used between other components of eyewear, such as along only a single earstem, on a frame, and relative to portions of the eyewear, such as between the lens(es), frame, earstem, or other components of an eyeglass or goggle.

FIGS. 9A-C are front and rear perspective and top views of the lever mechanism 34, according to an embodiment. As illustrated, the lever mechanism 34 can comprise a handle portion 120, an aperture 122, and a locking tab 74. The handle portion 120 can be used to rotate the lever mechanism 34 in order to adjust the position of the locking tab 74 relative to the engagement protrusion 36. In the illustrated embodiment, the aperture 122 can be configured to receive a pin their through in order to facilitate rotation and/or sliding movement of the lever mechanism 34 relative to the housing 32.

Figure 10A:
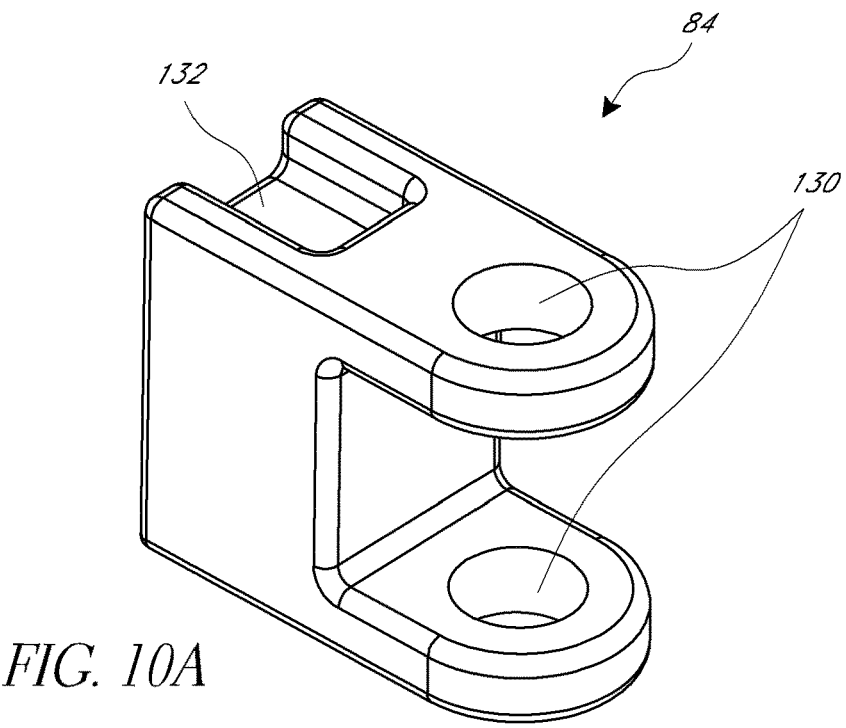
FIGS. 10A-B are front and rear perspective views of a biasing mechanism of the retention assembly of FIG. 4A, according to an embodiment.
Figure 10B:
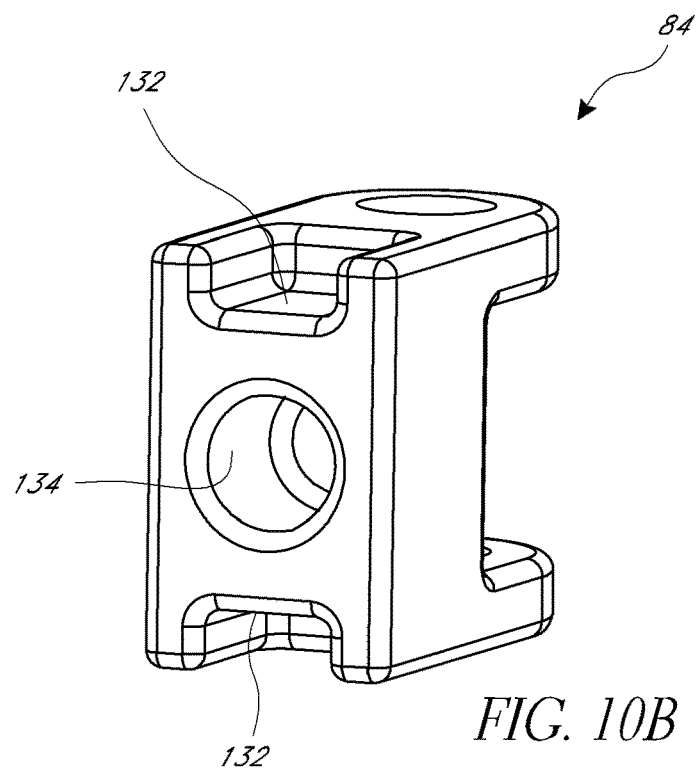

FIGS. 10A-B are front and rear perspective views of an embodiment of the interconnecting block 84 of the sliding or locking mechanism 80. As illustrated, the interconnecting block can comprise a pair of apertures 130 configured to rotationally couple the interconnecting block 84 relative to the lever mechanism 34 of the coupling mechanism 30. The interconnecting block 84 can comprise a pair of alignment recesses 132 that can interact with the alignment grooves or structures 86 of the housing 32 to facilitate sliding movement of the interconnecting block 84 relative to the housing 32. Additionally, the interconnecting block can comprise an engagement portion 134 for interconnecting with a biasing means, such as a coil spring, leaf spring, the deflectable biasing member, or other structure that can resiliently urge the interconnecting block 84 toward an extended or contracted position within the housing 32. In some embodiments, the biasing means can provide double or dual position biasing, urging the interconnecting block 84 away from an intermediate position. Thus, in some embodiments, the interconnecting block 84 can urge the lever mechanism 34 towards the open position or the closed position, but can intend to resist maintaining an intermediate closed position. In some embodiments, the interaction between the locking tab of the lever mechanism and the engagement protrusion and also tend to urge the lever mechanism towards either the open or closed position.

Figure 11A:
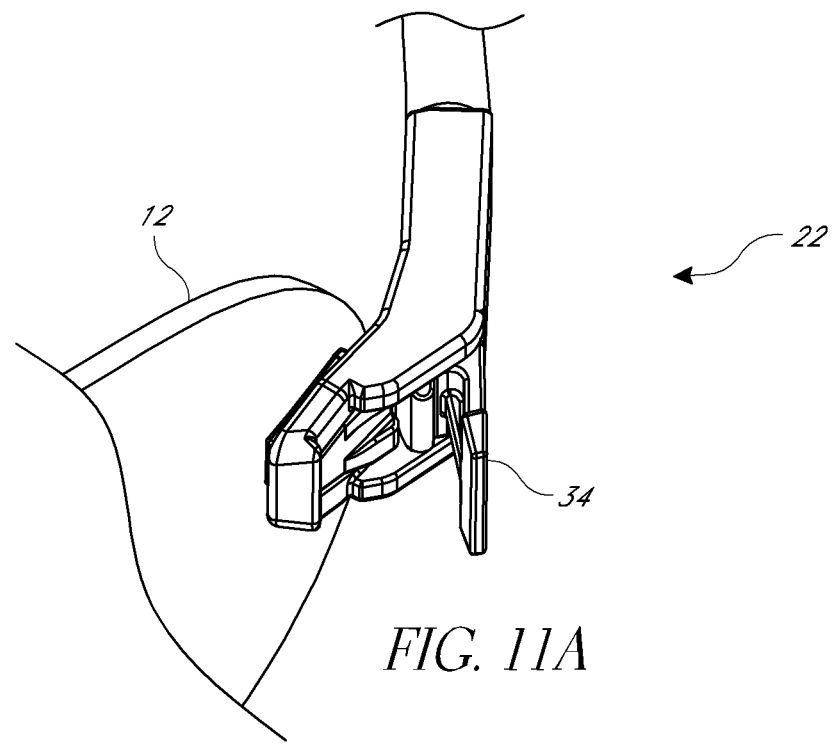
FIGS. 11A-B are perspective and cross-sectional views of the retention assembly wherein the lever mechanism is in an open position, according to an embodiment.
Figure 11B:
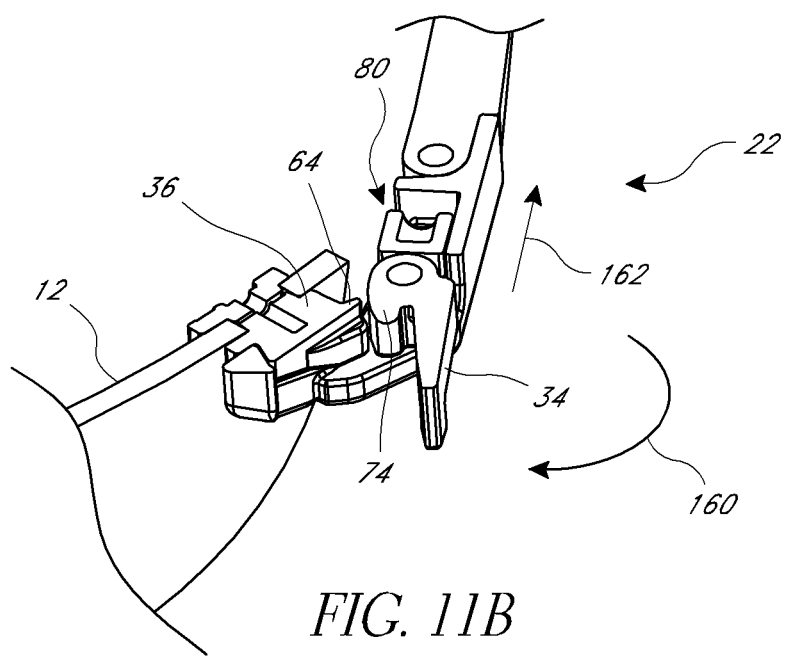
Figure 12A:
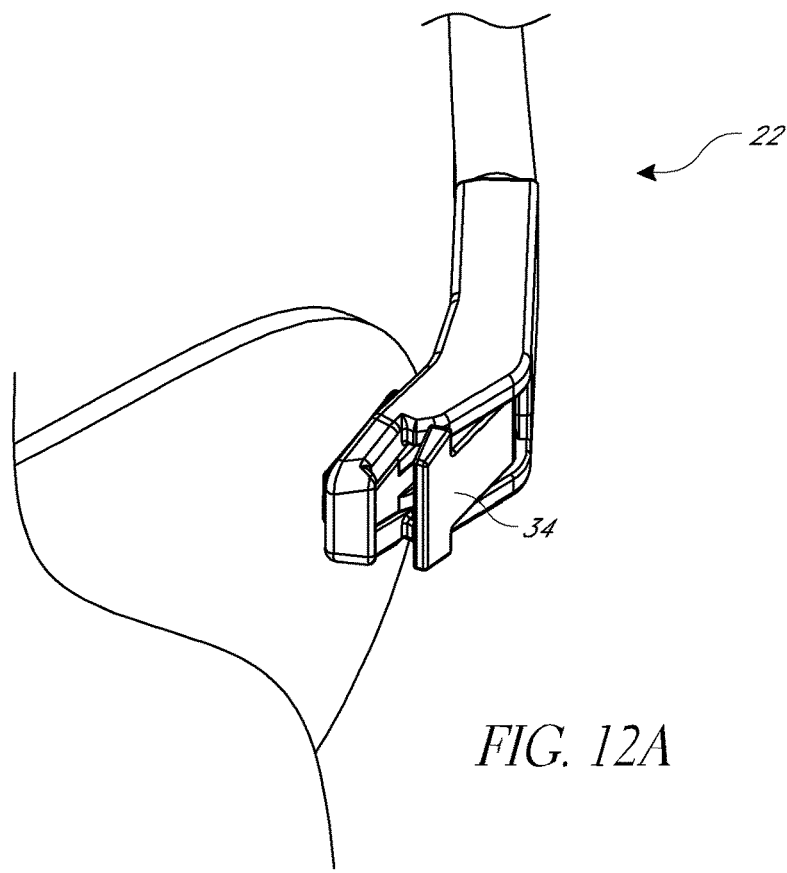
FIGS. 12A-B are perspective and cross-sectional views of the retention assembly wherein the lever mechanism is in a semi-closed position, according to an embodiment.
Figure 12B:
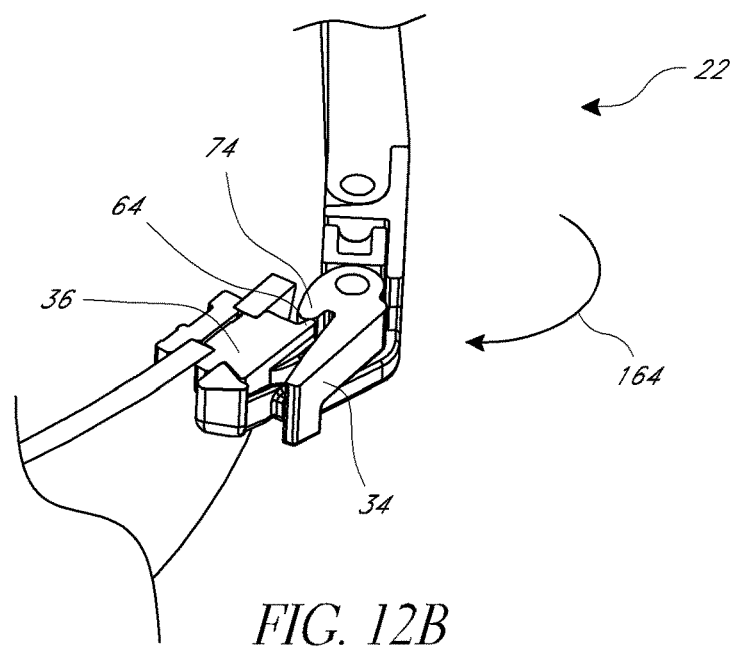
Figure 13A:
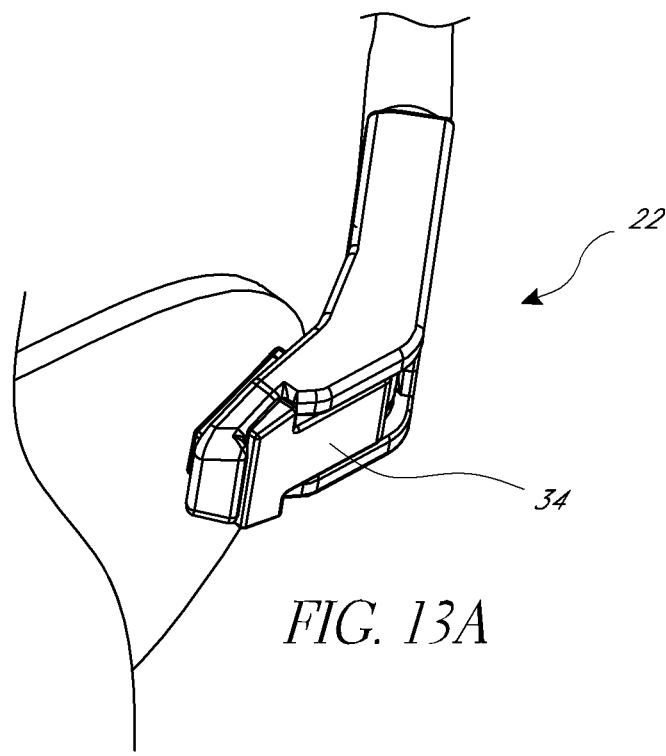
FIGS. 13A-B are perspective and cross-sectional views of the retention assembly wherein the lever mechanism is in a closed position, according to an embodiment.
Figure 13B:
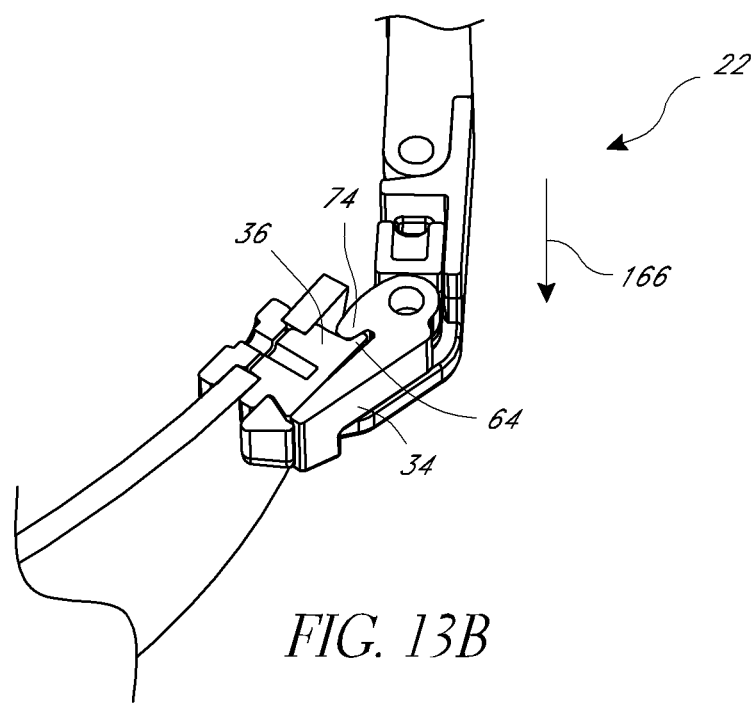

FIGS. 11A-13B illustrate various views of the retention assembly 22 during engagement and movement of the lever mechanism 34 relative to the protrusion 36. FIGS. 11A-B are perspective and cross-sectional views of the retention assembly 22 in which the lever mechanism 34 is in an open position. FIGS. 12A-B are perspective and cross-sectional views of the retention assembly 22 in which the lever mechanism 34 is in a semi-closed position. FIGS. 13A-B are perspective and cross-sectional views of the retention assembly 22 in which the lever mechanism 34 is in a closed position.

In accordance with the embodiment illustrated in these figures, the locking tab 74 of the lever mechanism 34 can engage with an interlocking portion 64 of the engagement protrusion 36 by completing a rotational and sliding movement illustrated between the open and closed positions. For example, in FIG. 11B, the locking tab 74 can initially encounter resistance to rotation as the tab is urged in the direction of arrow 160. Accordingly, the lever mechanism 34 must slide in the direction of the arrow 162, thus forcing the biasing mechanism 82 of the sliding or locking mechanism 80 into a compressed configuration. Once the lever mechanism 34 slides a sufficient amount, as shown in FIG. 12B, the locking tab 74 can rotate in the direction of arrow 164 until passing the interlocking portion 64 of the engagement protrusion 36. Once the locking tab 74 rotates a sufficient amount to pass the interlocking portion 64, the lever mechanism 34 is urged in a direction of the arrow 166 until the locking tab 74 and the interlocking portion 64 are engaged with each other.

In some embodiments, the engagement of the locking tab 74 and the interlocking portion 64 can be facilitated by cooperating or complementary recesses and protrusions, as shown in the illustrated embodiment. The locking tab 74 and the interlocking protrusion 64 can each comprise one or more interlocking structures that enable secure engagement between these components. Accordingly, the interaction between the locking tab 74 and the interlocking protrusion 64 can securely retained the engagement protrusion 36 relative to the coupling mechanism 30. In some embodiments, this engagement can restrict a final degree of movement between these components. Further, the interaction between the locking tab 74 and the interlocking protrusion 64, as shown in the illustrated embodiment, can be such that the lever mechanism 34 cannot be rotated once the locking tab 74 and the interlocking protrusion 64 are engaged with each other. For example, in order to disengage the locking tab 74 and the interlocking protrusion 64, the lever mechanism 34 would need to slide against the biasing force of the biasing mechanism 84 until sufficient clearance is provided to rotate the locking tab 74 until passing the interlocking protrusion 64. Accordingly, such embodiments can advantageously prevent unintentional rotation or disengagement of the lever mechanism 34 during casual use.

Figure 14:
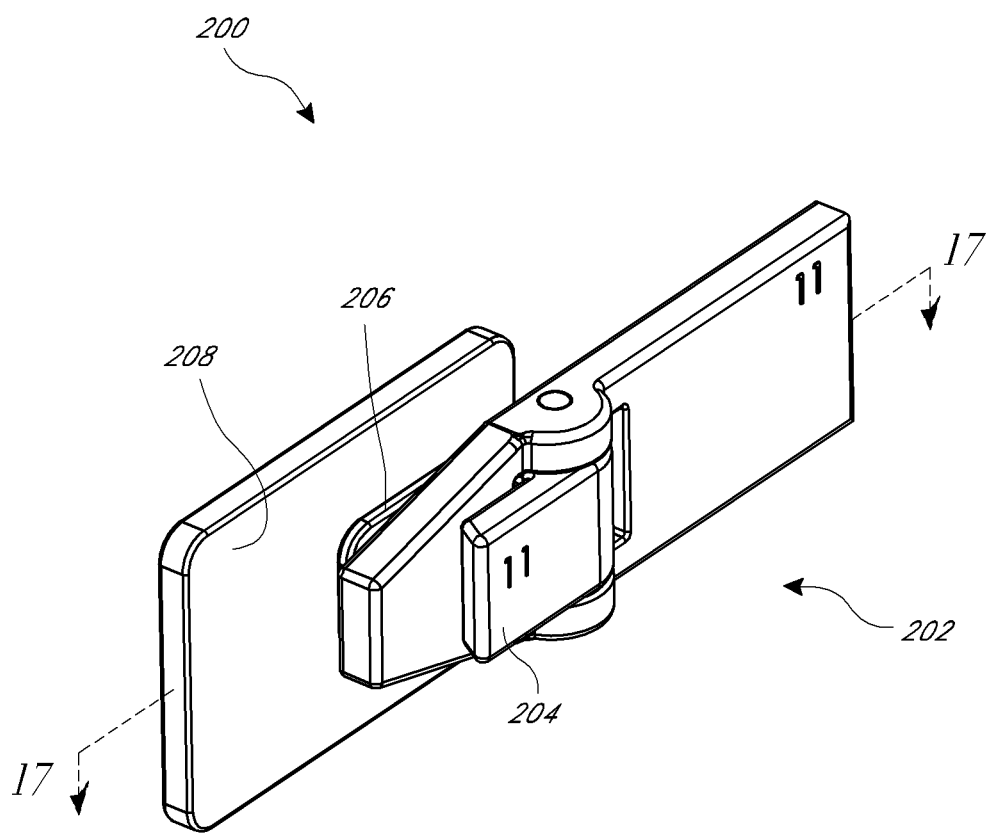
FIG. 14 is a perspective view of another embodiment of a retention assembly.

FIGS. 14-18 illustrate another embodiment of a retention assembly 200. FIG. 14 is a perspective view of the retention assembly 200. The retention assembly 200 can comprise a coupling mechanism 202, a lever mechanism 204, an engagement protrusion 206, and a sliding or locking mechanism (not shown). The engagement protrusion 206 can be attached to a lens 208 or other structure of eyewear.

Figure 15A:
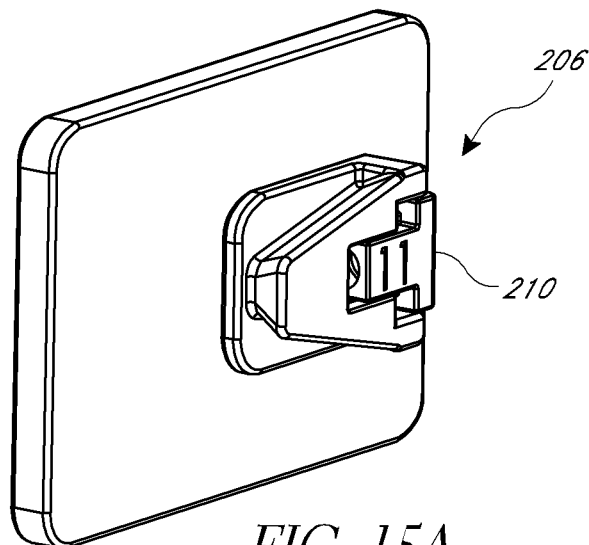
FIGS. 15A-B are perspective and side views of an engagement protrusion of the retention assembly of FIG. 14, according to an embodiment.
Figure 15B:
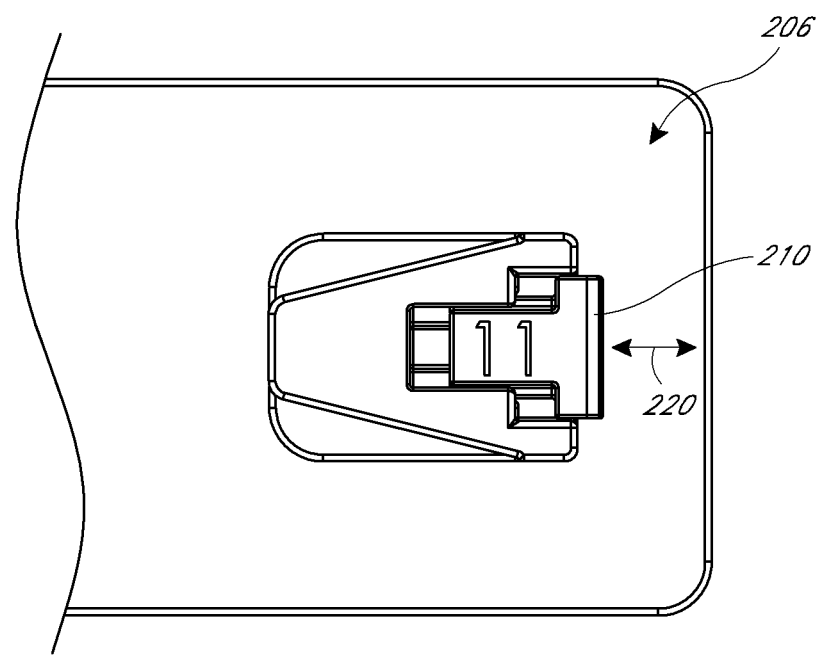
Figure 18:
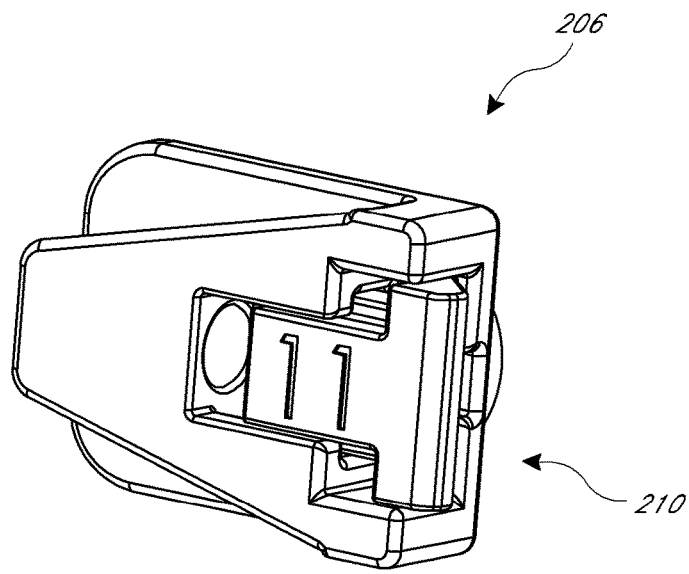
FIG. 18 is a perspective view of the engagement protrusion and biasing mechanism of the retention assembly of FIG. 14, according to an embodiment.

FIGS. 15A-B are perspective and side views of the engagement protrusion 206, and FIG. 18 is a rear perspective view of the engagement protrusion 206 illustrating a sliding or locking mechanism 210 integrated into the engagement protrusion 206 they can facilitate engagement between the engagement protrusion 206 and the lever mechanism 204. The structure and configuration of the engagement protrusion 206 can be similar to that of the engagement protrusion 36 discussed above. Accordingly, such features are incorporated herein by reference and will not be repeated for brevity. In contrast to the embodiment of the engagement protrusion 36 discussed above, the engagement protrusion 206 can be configured such that the sliding mechanism 210 is integrated into the engagement protrusion 206. As illustrated, the sliding mechanism 210 can move relative to the engagement protrusion 206 in the direction of the arrow 220.

Figure 16A:
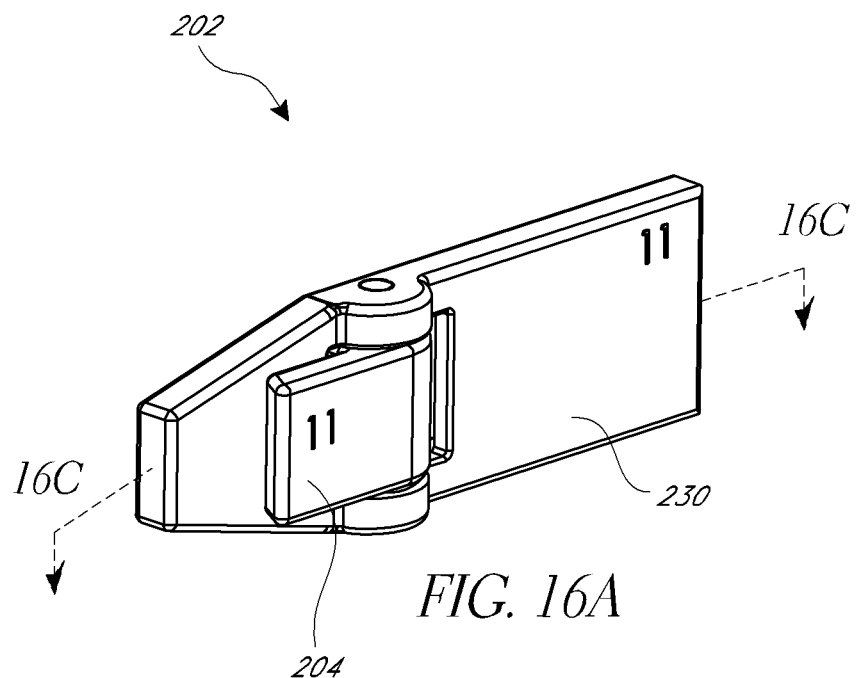
FIGS. 16A-C are front and rear perspective and cross-sectional views of a coupling mechanism of the retention assembly of FIG. 14, according to an embodiment.
Figure 16B:
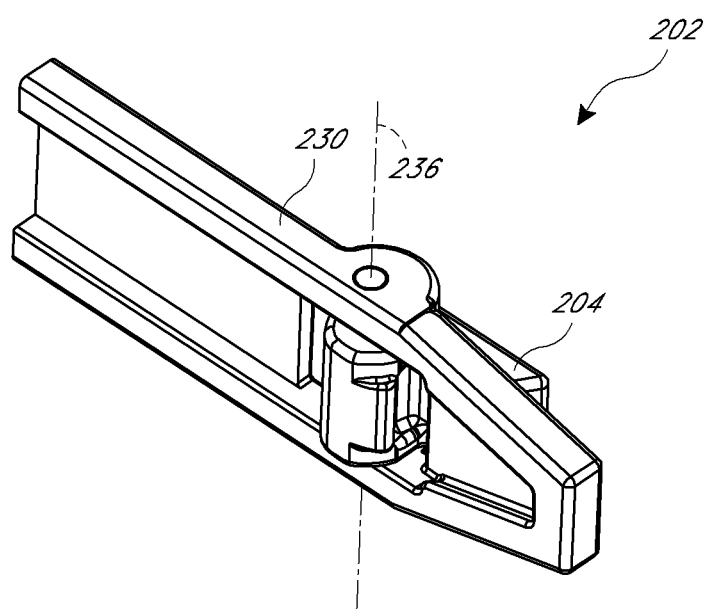
Figure 16C:
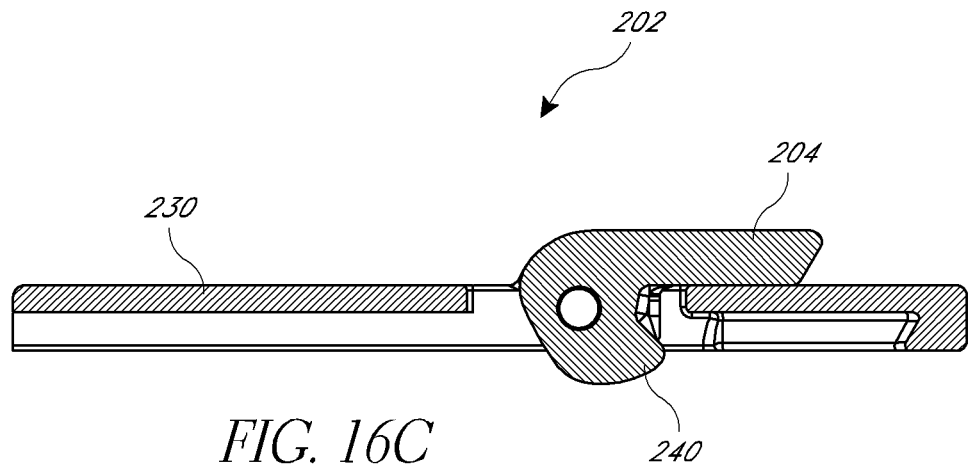

FIGS. 16A-C are front and rear perspective and cross-sectional views of an embodiment of the coupling mechanism 202. The coupling mechanism 202 can comprise a housing 230 and the lever mechanism 204. As illustrated, the lever mechanism 204 can be rotatably coupled to the housing 230. In contrast to the embodiment of the retention mechanism 22 discussed above, the lever mechanism 204 can define a fixed rotational axis 236. Thus, rotational and sliding movements can be performed by different mechanisms of the retention assembly 200.

Figure 17:
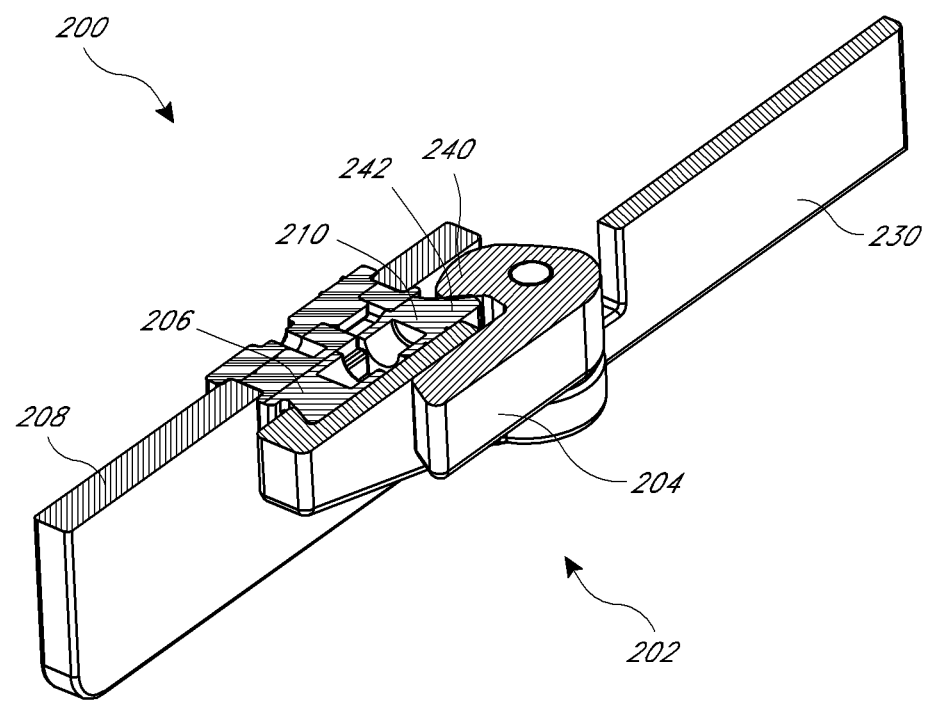
FIG. 17 is a cross-sectional perspective view of the retention assembly shown in FIG. 14 taken along section lines 17-17 of FIG. 14, wherein the coupling mechanism is in an engaged position, according to an embodiment.

For example, FIG. 17 illustrates a cross-sectional perspective view of the retention assembly 200 in which the coupling mechanism 202 is in an engaged position. Similar to the embodiment discussed above, the locking mechanism 204 can comprise a locking tab 240 configured to engage with an interlocking portion 242 of the engagement protrusion 206. In order to attach the coupling mechanism 202 onto the protrusion 206, the engagement protrusion 206 is initially inserted into an engagement cavity of the housing 230 with the lever mechanism 204 in an open position (not shown). Thereafter, the lever mechanism 204 is rotated to be closed position (as shown in FIG. 17) and the locking tab 240 contacts the interlocking portion 242 in order to urge the interlocking portion 242 into a collapsed position such that the lever mechanism 204 can rotate towards the close position.

Figure 19:
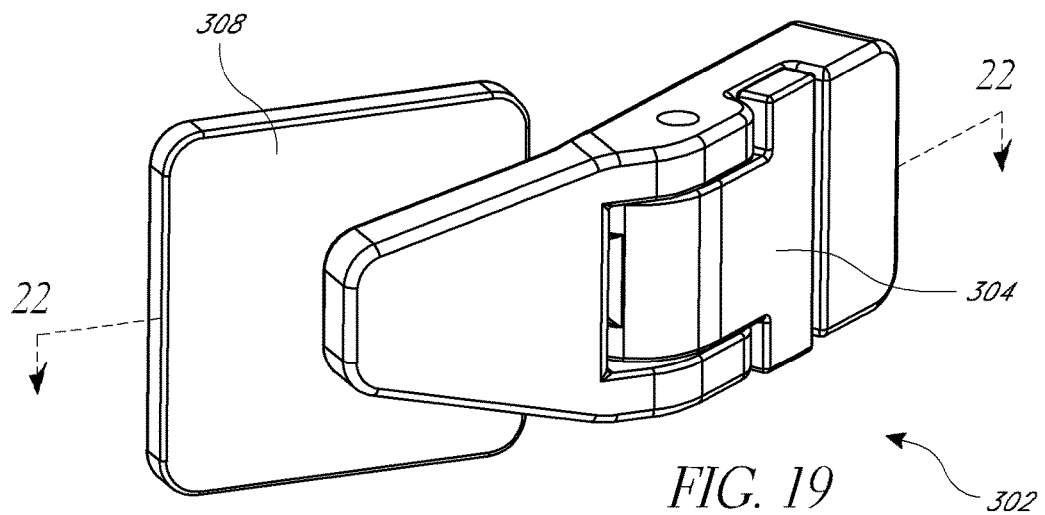
FIG. 19 is a perspective view of another embodiment of a retention assembly.
Figure 20A:
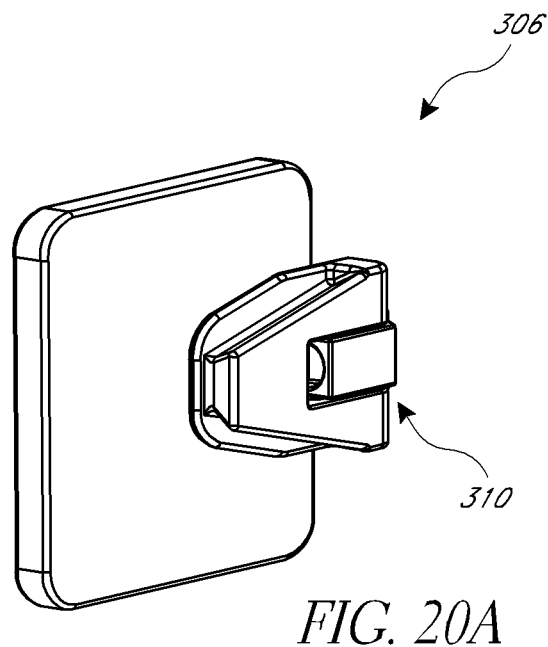
FIGS. 20A-B are perspective and side views of an engagement protrusion of the retention assembly of FIG. 19, according to an embodiment.
Figure 20B:
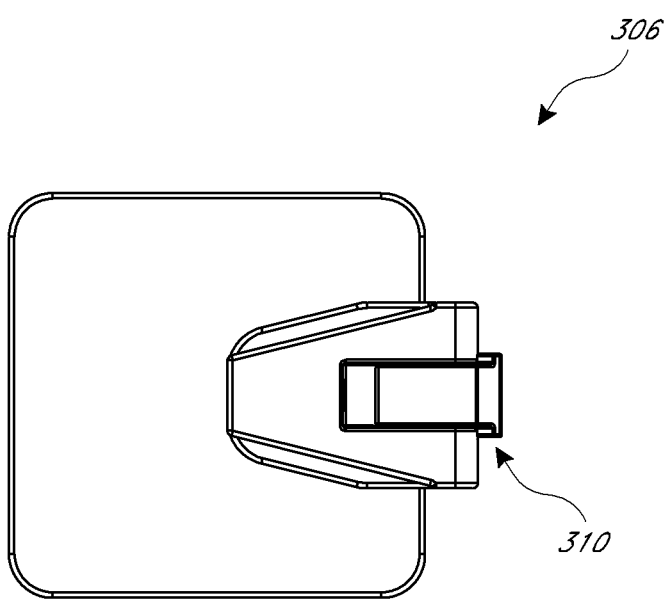
Figure 21A:
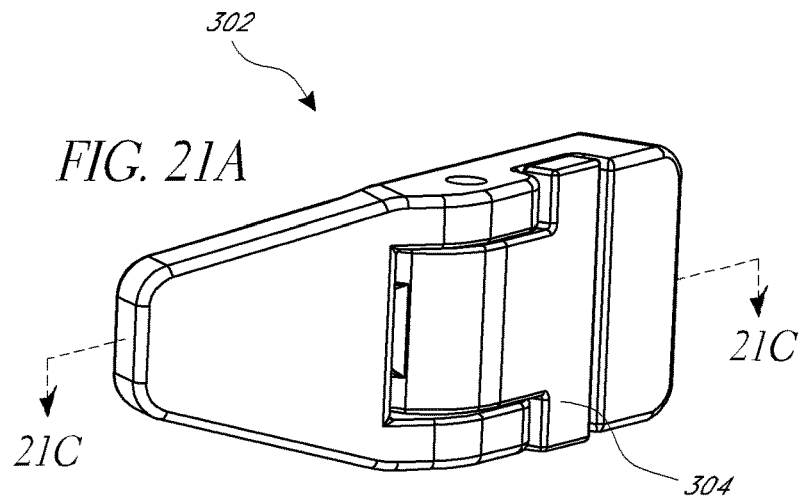
FIGS. 21A-C are front and rear perspective and cross-sectional views of a coupling mechanism of the retention assembly of FIG. 19, according to an embodiment.
Figure 21B:
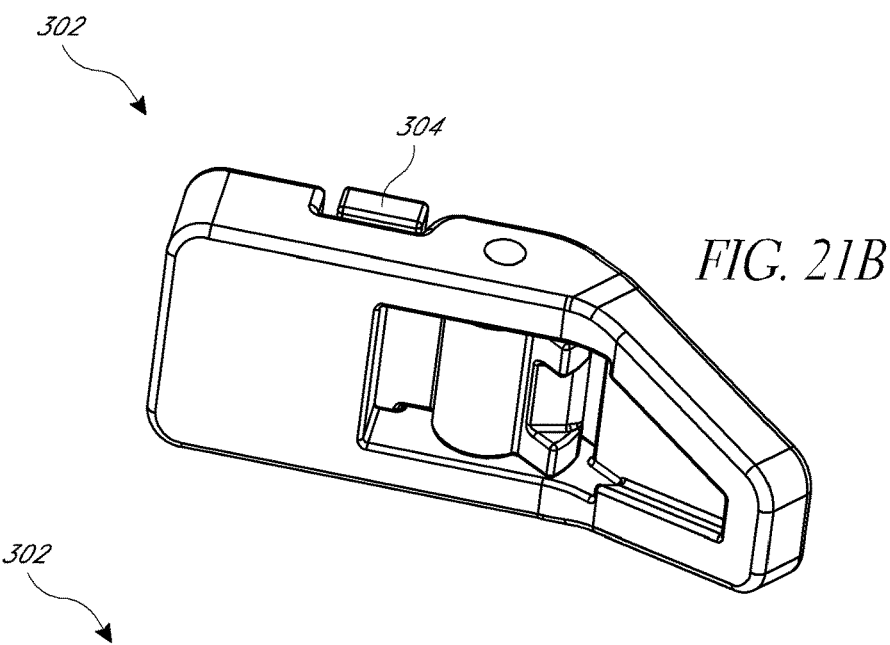
Figure 21C:
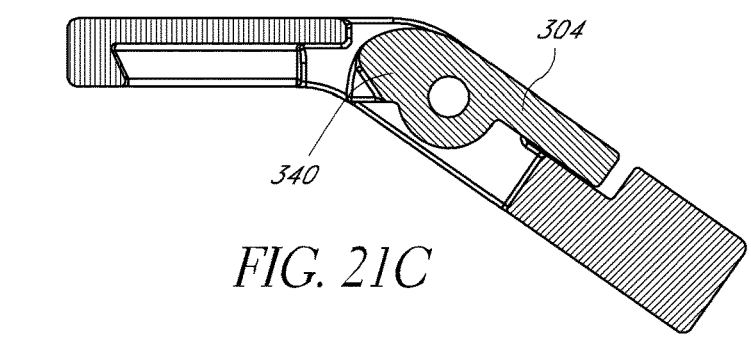
Figure 22:
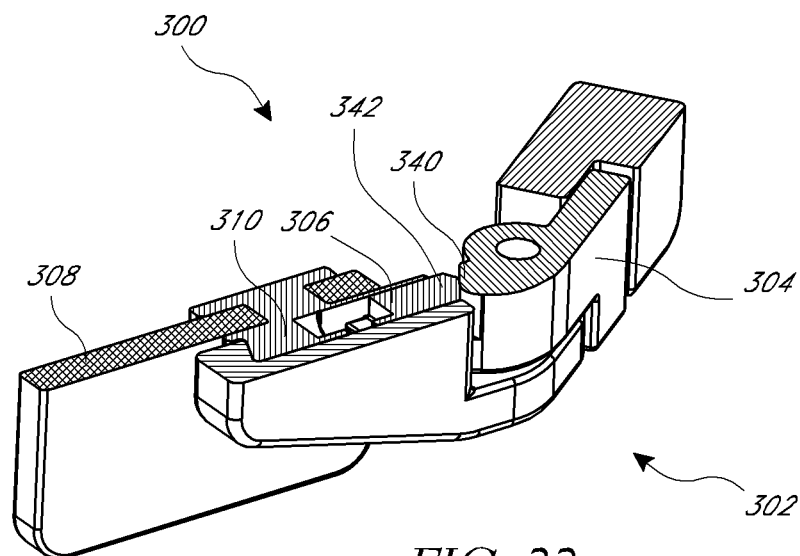
FIG. 22 is a cross-sectional perspective view of the retention assembly shown in FIG. 19 taken along section lines 22-22 of FIG. 19, wherein the coupling mechanism is in an engaged position, according to an embodiment.
Figure 23:
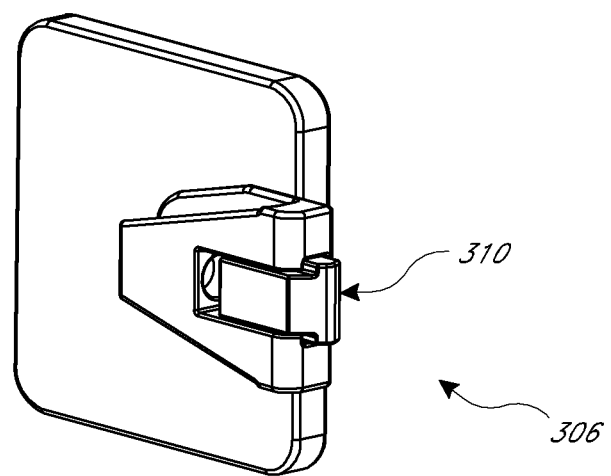
FIG. 23 is a perspective view of the engagement protrusion and biasing mechanism of the retention assembly of FIG. 19, according to an embodiment.

FIG. 19 is a perspective view of another embodiment of a retention assembly 300. FIGS. 20A-B are perspective and side views of an engagement protrusion 306 of the retention assembly 300, according to an embodiment. FIGS. 21A-C are front and rear perspective and cross-sectional views of a coupling mechanism 302 of the retention assembly 300, according to an embodiment. FIG. 22 is a cross-sectional perspective view of the retention assembly 300, which illustrates the configuration, interconnection, and movement of the components of the retention assembly 300, according to an embodiment. FIG. 23 is a perspective view of the engagement protrusion 306 and the sliding or locking mechanism 310 of the retention assembly 300, according to an embodiment.

As illustrated, the function and operation of the retention assembly 300 can provide a secure engagement between a lens 308 and the retention assembly 300 in order to securely fasten the earstem relative to the lens 308. Notably, the retention assembly 300 can be actuated by rotating the lever mechanism 304 in opposite directions than required in the retention assembly 200 and the retention assembly 22. Accordingly, in order to move the lever mechanism 304 to the closed position, the lever mechanism 304 would need to be rotated in a posterior direction instead of an anterior direction, as with the assemblies 22, 200. As such, for movement in either direction, embodiments can be provided in which the configuration of the lever mechanism 304 can be modified to allow the locking tab 340 to engage with a corresponding interlocking portion 342 of the engagement protrusion 306. Thus, the retention assembly 300 illustrates that the retention assembly 22 can be modified such that the lever mechanism can be rotated towards a close position by moving the lever mechanism in either an anterior direction or a posterior direction, as desired to be designed.

The retention assembly 300 also illustrates the concept of incorporating a sliding or locking mechanism 310 into the engagement protrusion 306, thereby separating rotational and sliding movements to separate components instead of a single component as discussed above with respect to the retention assembly 22. However, sliding and rotational movement need not be required in some embodiments. Thus, in embodiments were only rotational movement is provided, the lever mechanism can comprise a resilient material that allows the locking tab to deflect during rotation and engage with the engagement protrusion once the lever mechanism is in the closed position. Further, other embodiments can be provided in which the lever mechanism only slides in order to engage with the engagement protrusion.

Figure 24:
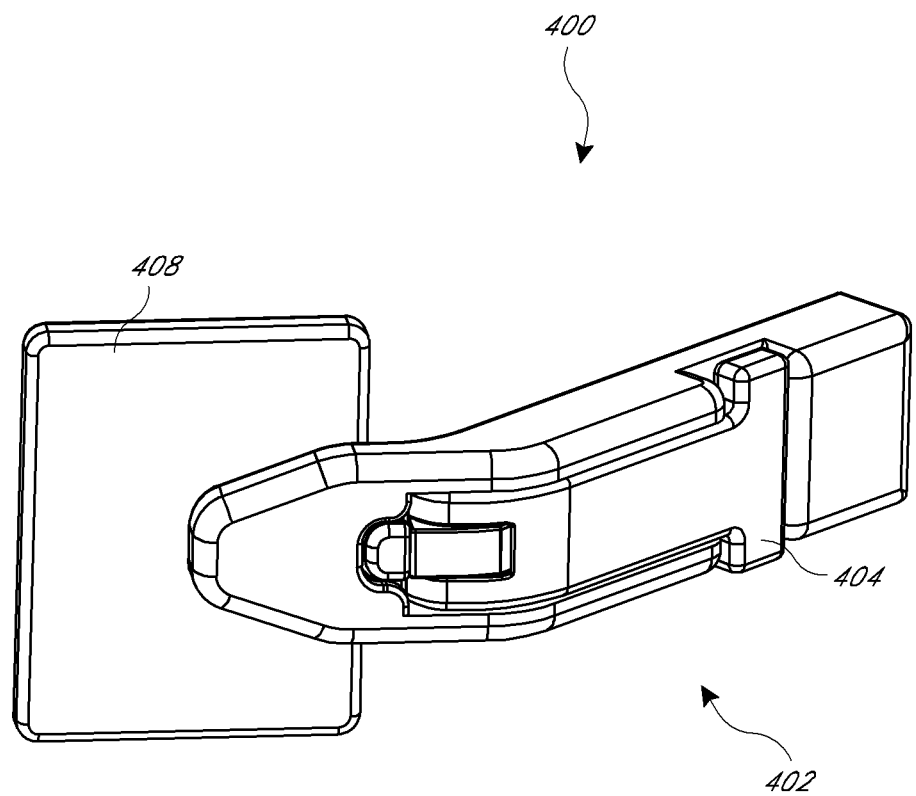
FIG. 24 is a perspective view of yet another embodiment of a retention assembly.
Figure 25A:
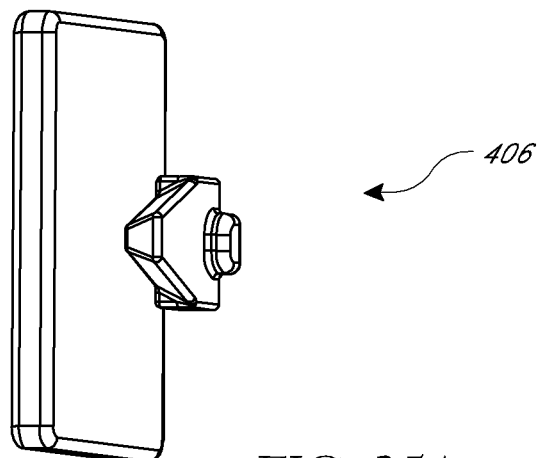
FIGS. 25A-B are perspective and side views of an engagement protrusion of the retention assembly of FIG. 24, according to an embodiment.
Figure 25B:
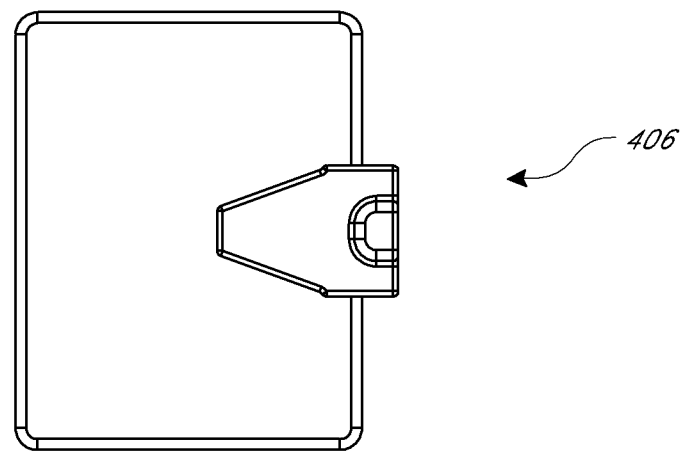
Figure 26A:
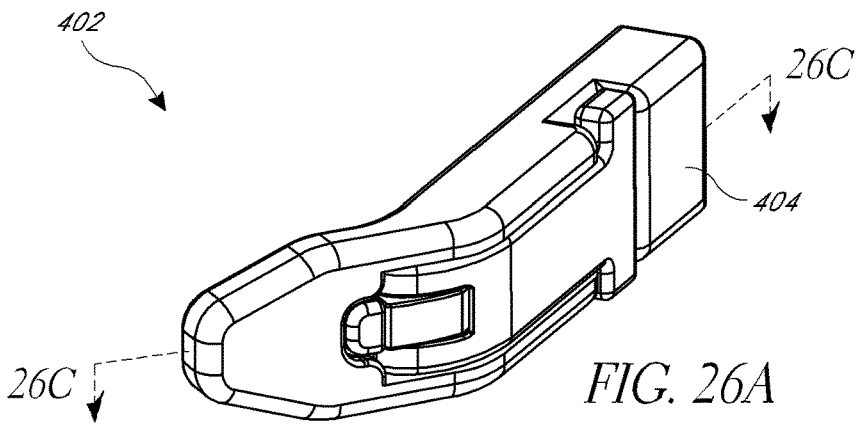
FIGS. 26A-C are front and rear perspective and cross-sectional views of a coupling mechanism of the retention assembly of FIG. 24, according to an embodiment.
Figure 26B:
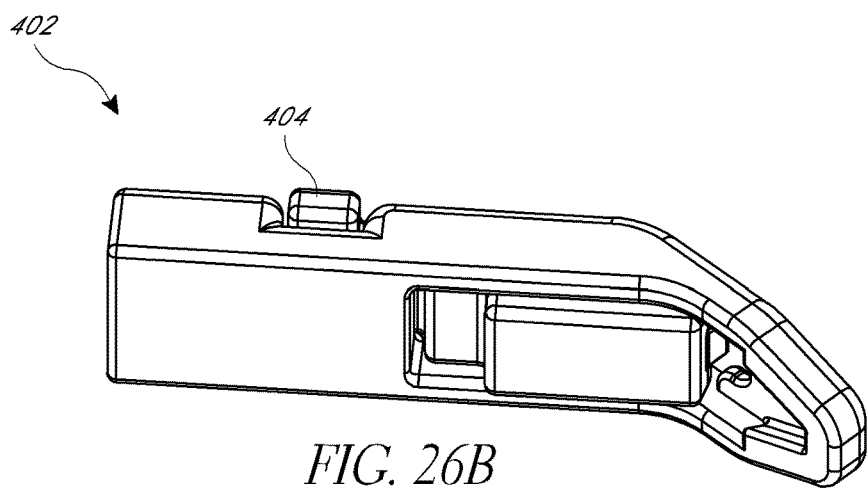
Figure 26C:
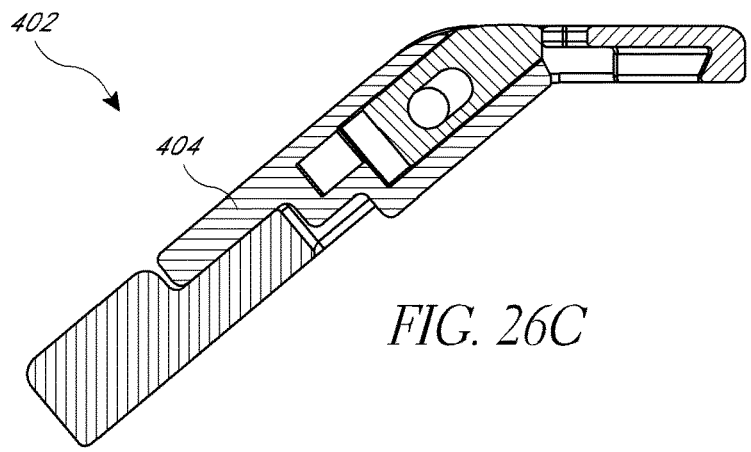

Yet another embodiment of a retention assembly is illustrated in FIGS. 24-28B. FIG. 24 is a perspective view of a retention assembly 400. FIG. 25-B are perspective and side views of an engagement protrusion 406 of the retention assembly 400, according to an embodiment. FIG. 26-C are front and rear perspective and cross-sectional views of a coupling mechanism 402 of the retention assembly 400, according to an embodiment. FIG. 27 is a cross-sectional perspective view of the retention assembly 400 in which the coupling mechanism 402 is in an engaged position, according to an embodiment. FIG. 28A-B are perspective and perspective cross-sectional views of the lever mechanism 404 and sliding mechanism 410 of the retention assembly 400, according to an embodiment.

The retention assembly 400 can be configured such that a biasing mechanism is incorporated into the lever mechanism 404. Accordingly, a locking function can be performed by a slidable and/or biased structure disposed on or inside the lever mechanism 404 which can engage or disengage with an engagement protrusion 406 of the retention assembly 400. FIGS. 28A-B illustrate a lever mechanism 404 which incorporates a sliding mechanism 410. The sliding mechanism 410 can comprise a biasing mechanism and a locking structure 412 that can be urged into engagement with the engagement protrusion 406 of the retention assembly 400.

Accordingly, the retention assembly 400 illustrates that in some embodiments, the lever mechanism 404 can be rotated between closed and open positions with a sliding mechanism 410 incorporated into the lever mechanism to facilitate engagement of the lever mechanism with the engagement protrusion.

Figure 29:
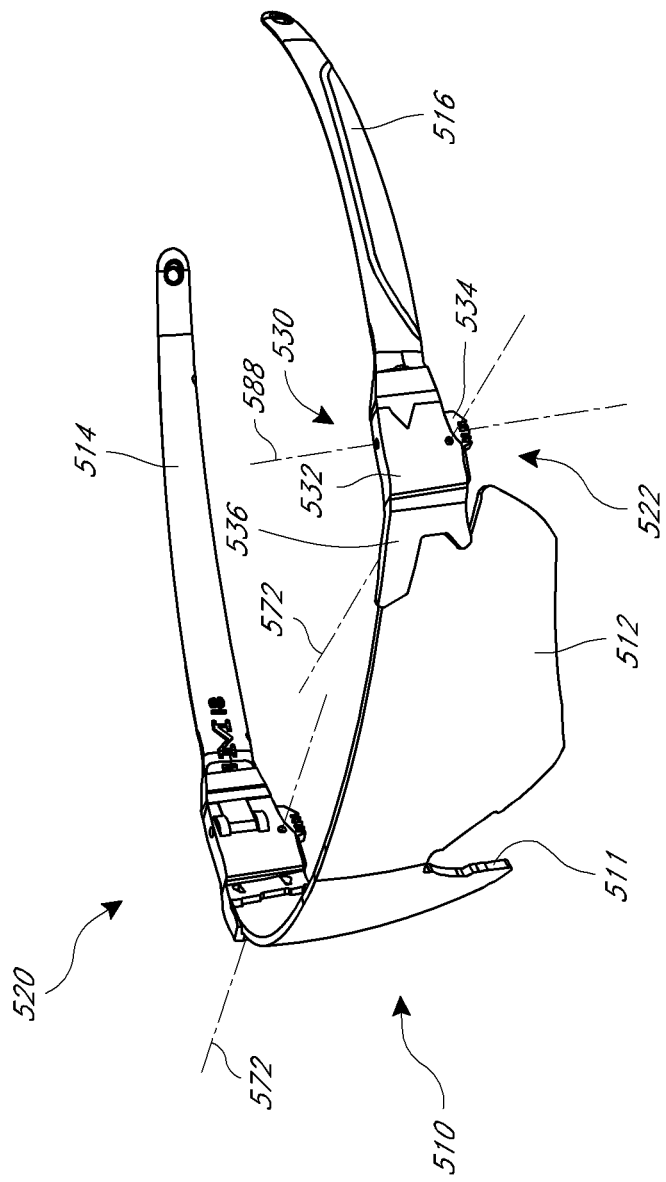
FIG. 29 is a front perspective view of an eyeglass in accordance with an embodiment.
Figure 30:
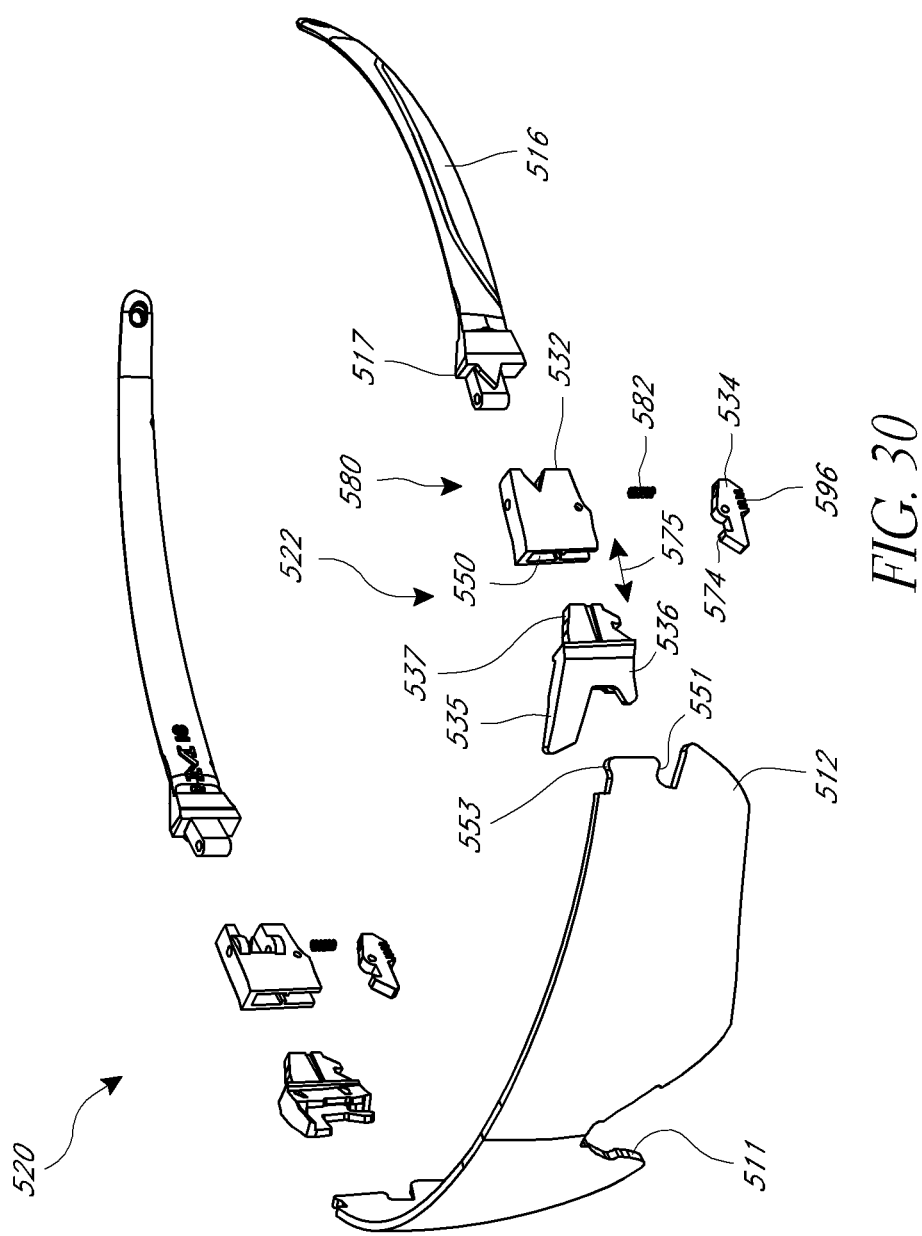
FIG. 30 is an exploded view of the eyeglass of FIG. 29.

FIGS. 29-33 illustrate other embodiments. FIG. 29 is a front perspective view of an eyeglass 510 in accordance with an embodiment. The eyeglass 510 can be the same or similar to, and/or include one or more features, structures, components, and/or mechanisms in whole or in part of, any of the eyeglasses or eyewear described elsewhere herein. FIG. 30 is an exploded view of the eyeglass 510 illustrating certain components.

As illustrated, in some embodiments, the eyeglass 510 can have a unitary lens 512 and a pair of earstems 514, 516. The earstems 514, 516 can be removably attached to the lens 12, either directly, or using respective intermediate retention mechanisms or assemblies 520, 522, as illustrated in FIG. 30. The retention assemblies 520, 522 can be used to interchange one unitary lens for another unitary lens and/or one earstem for another earstem, in order to allow the wearer to alter or customize the aesthetic appearance, performance, and/or feel of the eyeglass 510 for particular activities or personal preferences. In some embodiments, one or more different nosepieces (not shown) can be coupled to and interchanged with the nosepiece opening 511 of the lens 512. While the figures and description below specifically refer to a single retention assembly 522 for ease of description, retention assembly 520 can be identical or a mirror image of the retention assembly 522 and can be configured in the same or similar manner, as illustrated.

As shown in FIGS. 29-33, the retention assembly 522 can allow the earstem 516 to be decoupled, removably attachable, and/or releasable from the lens 512 and/or front face of the eyewear (such as when the earstem 516 is removably coupled to a frame containing or supporting the lens). FIGS. 31A-31B are enlarged side views of the retention assembly 522 with certain components removed, in broken lines, or transparent to illustrate certain features of the retention assembly 522 according to some embodiments. As illustrated, the retention assembly 522 can comprise a coupling mechanism 530 that comprises a housing 532, an actuator, such as a lever mechanism 534, a first engagement portion, such as an engagement protrusion 536, and a biasing mechanism 582 (e.g., spring, coil spring, leaf spring, compressible or resilient member, and/or a deflectable member, etc., as shown in FIG. 30). The lever mechanism 534 can be rotatably (e.g., pivotally) mounted relative to the housing 532. The coupling mechanism 530 can be attached to an anterior region or end 517 of the earstem 516. The engagement protrusion 536 can be mounted onto a lateral portion and/or edge of the lens 512. The coupling mechanism 530 can be configured to receive and/or be engaged with the engagement protrusion 536 and the ear stem 516. In some embodiments, the housing 532 of the coupling mechanism 530 can be configured to comprise an opening 550 (see FIG. 33A) into which at least a portion of the first engagement portion or engagement protrusion 536 is configured to be removably insertable in order to be engaged with the housing 532. Some features of the engagement between the engagement protrusion 536 and the coupling mechanism 530, the engagement protrusion 536 and the lens 512, and the coupling mechanism 530 and the ear stem 516 are illustrated and discussed further herein.

FIG. 29 is a front perspective view of the first engagement portion of the engagement protrusion 536 attached to the lens 512. As illustrated in FIGS. 29-33, the engagement protrusion 536 can include an anterior portion 535 configured to be engaged with, mounted on, and/or fixed to the lateral portion and/or edge of the lens 512. The first engagement portion 536 can include a posterior portion 537 (e.g., a protrusion, a recess, and/or a tab, etc.) that is configured to be engaged to, secured to, and/or received within, the housing 532 of the coupling mechanism 530. The first engagement portion 536 (e.g., anterior portion 535) as illustrated in the FIGS. 29-33 is permanently or semi-permanently fixed or mounted to the lens 512 (e.g., snap-fit, friction fit, interference fit, screw-mounted, adhesive, and/or by other engagement). However, in some embodiments, the engagement protrusion 536 is configured to be removably attachable to the lens 512.

As illustrated in FIGS. 30 and 32A-32B, at least a portion of the first engagement portion (e.g., an anterior portion 535 of the engagement protusion 536) can include one or more tapered, ramped, curved, recessed, protruding, cut-out, and/or inclined, interface surfaces 547, 549 (e.g., on inner top and/or bottom surfaces of the anterior portion 535) as shown in FIG. 32B that is or are configured to receive or otherwise interface with a correspondingly tapered, ramped, or curved, recessed, and/or protruding, interface member of the lens 512, such as a contour, top, planar and/or lateral edge of the lens 512. In some embodiments, the generally lateral, top, and/or planar edge or corner of the lens 512 comprises one or more protrusions, recesses, cut-out portions and/or correspondingly shaped surfaces 551, 553 configured to be received within the one or more ramped, curved, recessed, cut-out and/or inclined surfaces 547, 549 of the anterior portion 535, permanently or semi-permanently securing the lens 512 to the first engagement portion 536. In some embodiments, the mating of the connection portion of the lens 512 (e.g., one or more cut-out or recessed portions 551, 553, and/or protruding portions) with the connection portion of the first engagement portion 536 (e.g., one or more ramped, curved, recessed, cut-out and/or inclined surfaces 547, 549 of the first engagement portion) forms an interference, friction, and/or snap-fit securement between the lens 512 and the first engagement portion. The one or more interface surfaces 547, 549 of the anterior portion 535 can be positioned on top, bottom, upper, and/or lower portions of an opening or space 555 formed between first (e.g., inner, medial) and second (e.g., outer, lateral) flanges or walls 543, 545 of the anterior portion 535, in which a portion of the lens 512 (e.g., generally lateral, top, and/or planar edges, corners, and/or surfaces, etc.) is configured to be received and secured in position. For example, a portion of the first engagement portion 536 can extend over a portion of a top edge of the lens 512 when the engagement protrusion 536 is attached to the lens 512, as illustrated.

In some embodiments, such as when the engagement protrusion 536 is not configured to be removably attachable to the lens 512 by a consumer (e.g., a permanent or semi-permanent attachment), the lens 512 can be generally isolated from stresses created when removing, replacing, and/or securing the lens 512 and/or earstem 516 (e.g., actuating the retention assembly 522), while generally preserving optimal optical characteristics of the lens (e.g., without undermining, diminishing, or ruining the optical characteristics) and generally preserving the as-molded geometry of the lens (e.g., without scratching, cracking, bending, distorting, and/or deforming the lens). In some embodiments, a permanent or semi-permanent configuration or attachment between the engagement protrusion 536 and the lens 512 as configured and described herein in one or more embodiments can provide a secure or stable attachment. For example, a large securing contact area between the lens 512 and the engagement protrusion 536 (e.g., a large amount or area of lateral, top and/or planar edges, corners, and/or surfaces of the lens 512 received and/or secured within the engagement protrusion 536 and/or bearing surface) can be provided as illustrated in some embodiments and described herein as a result of the geometry of the attachment between the engagement protrusion 536 and the lens 512.

In some embodiments, the large contact area and/or permanent or semi-permanent attachment between generally planar, top and/or lateral portions of the lens 512 and the engagement protrusion 536 is configured to help the eyeglass 510 to withstand and/or spread a large load (e.g., force, stress) produced as a result of a moment from a portion or point of the earstem 516 positioned along the longitudinal axis of the earstem 516 away from the attachment and/or contact area between the engagement protrusion 536 and the lens 512. The moment can be distributed effectively by the geometry of the attachment, since the load produced as a result of the moment is divided over a greater or increased contact area.

As illustrated in FIGS. 30 and 32A-32B, in some embodiments, the lens 512 has a continuous surface, is non-fenestrated, and/or does not include a through-hole or aperture configured to receive another component, such as a portion of the engagement protrusion 536 (e.g., no hole or aperture extending through front and rear surfaces of the lens 512 and/or not surrounded or bordered with another portion of the lens 512). The lens 512 can be permanently or semi-permanently attached to the engagement protrusion 536 without such a through-hole or aperture. However, in some embodiments, the lens 512 can include such a through-hole or aperture.

Figure 33B:
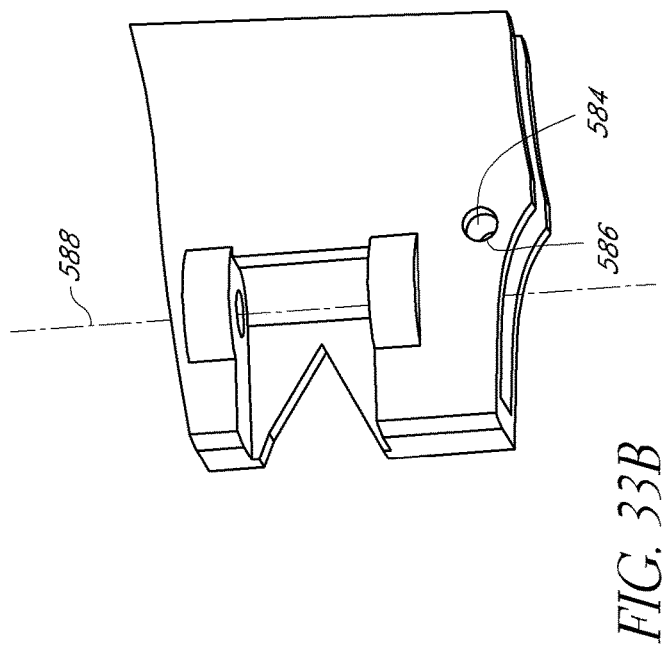
FIGS. 33A-33B are front and rear perspective views of a coupling mechanism according to an embodiment.
Figure 33A:
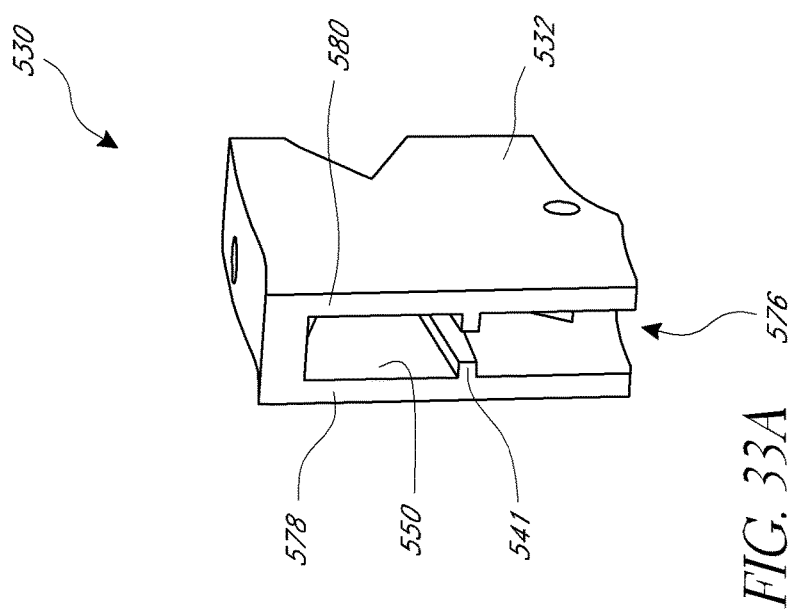

FIGS. 29-33 illustrate that in some embodiments the posterior portion 537 of the first engagement portion 536 can be configured to be movably or slidably received and/or engaged by or within a complementary-shaped opening 550 (e.g., recess, slot, hole, aperture) of a first or anterior end or region of the housing 532, as illustrated FIG. 33A. In accordance with some embodiments, such as those illustrated in FIGS. 29-33, at least a portion of the posterior shape of the first engagement portion 536 (e.g., posterior portion 537) can allow the first engagement portion 536 to be easily inserted into the corresponding opening 550 of the housing 532. As illustrated, the opening 550 and posterior portion 537 can have corresponding generally wedge-shaped or tapering configurations. However, other complementary configurations are possible including generally rectangular, etc.

In some embodiments, the posterior portion 537 of the first engagement portion 536 can include at least one first engagement structure 539 (e.g., slot, groove, channel, and/or protrusion) formed on one or more sides (e.g., opposing sides or faces) of the posterior portion 537 of the engagement protrusion 536 configured to receive and/or engage with at least one corresponding engagement member 541 (e.g., recess, aperture, rail, raised edge, surface, step, or protrusion) formed on one or more opposing inner or interior facing sides or faces of the housing 532 as the engagement protrusion 536 is moved or slid into the housing 532 and/or the housing 532 is moved or slid to receive the engagement protrusion 536. In some embodiments, the posterior portion 537 includes one or more engagement members 541 and the housing 532 includes one or more engagement structures 539. As illustrated in FIG. 30, the engagement protrusion 536 (and/or housing 532) can be slid in a generally anterior-posterior direction along a generally horizontal axis (e.g., indicated by arrow 575 in FIG. 30), generally parallel to a longitudinal axis of the ear stem 516 to be attached or removed from the housing 532 (and/or engagement protrusion 536). However, in some embodiments, the engagement protrusion 536 (and/or housing 532) can be slid in other directions, such as along a generally medial-lateral direction or along a generally vertical axis. In some embodiments, the engagement protrusion 536 and/or housing 532 are configured to be rotatably (e.g., pivotally) engaged or disengaged with one another. In such configurations, the engagement protrusion 536 and/or housing 532 can be rotated (e.g., pivoted) about a generally horizontal axis extending generally parallel to the axis 572.

In certain embodiments, the one or more engagement structures 539 and engagement members 541 can provide an alignment feature to aid or assist a user in moving or sliding the engagement protrusion 536 into the housing 532. Additionally, the one or more engagement structures 539 and engagement members 541, when engaged with one another, can be configured to assist in securing the engagement protrusion 536 to or within the housing 532 by generally or substantially preventing or restricting movement of the engagement protrusion 536 relative to the housing 532 in one or more degrees of freedom (e.g., in a rotational direction, and/or in a generally medial-lateral upward and/or downward direction). For example, the one or more engagement structures 539 and engagement members 541 can provide an interference or friction fit between the engagement protrusion 536 and the housing 532 when the one or more engagement structures 539 and engagement members 541 are engaged with one another. In, some embodiments, the engagement protrusion 536 and the housing 532 can be configured such that the shape and configuration of the engagement protrusion 536 and the housing 532 need not incorporate such engagement structures or members.

In some embodiments, as illustrated in FIGS. 32A-33B, the one or more engagement structures 539 and engagement members 541 can have a corresponding tapered or inclined configuration between respective first and second ends to provide the interference or friction fit as the engagement protrusion 536 is moved or slid into the housing 532. In such a tapered configuration, the engagement force as a result of the interference fit between one or more engagement structures 539 and engagement members 541 can increase as the engagement protrusion 536 is moved or slid farther toward the second or posterior end the housing 532 due to the increased surface area of the inclined surfaces contacting one another.

In some embodiments, the one or more engagement structures 539 and engagement members 541, when engaged with one another, can allow a plurality of walls, surfaces, portions, or faces of the engagement protrusion 536 and the coupling mechanism 530 to be in contact with one another. In some embodiments, contact of corresponding generally vertical wall portions of the engagement protrusion 536 and the housing 532 can signal to a user that the engagement protrusion 536 is generally fully or completely received within the housing 532. In some embodiments, a generally vertical wall portion at a first end (e.g., anterior) of the posterior portion 537 of the engagement protrusion 536 is configured to contact or contacts a generally vertical wall portion of the housing 532 at a first end (e.g., anterior) of the housing 532 when the engagement protrusion 536 is substantially or completely received within the housing 532.

FIGS. 29-33 also illustrate that in certain embodiments, the posterior portion 537 can comprise a second engagement structure or interlocking portion 564. In some embodiments, as illustrated, the interlocking portion 564 can comprise a removal-inhibiting structure, such as a recess, a cut-out, a slot, or an overhanging edge that can receive or be engaged, secured, or interconnected with a corresponding or complementary-shaped removal-inhibiting locking member 574 (e.g., protrusion, hook, tab, engagement portion) of the lever mechanism 534, in accordance with some embodiments discussed further herein. However, some embodiments of the engagement protrusion 536 can be configured such that the shape and configuration of the engagement protrusion 536 need not incorporate undercut portions.

FIG. 33A is a front perspective view of the coupling mechanism 530. The lever mechanism 534 (not shown in this figure) can be rotatably (e.g., pivotally) mounted relative to the housing 532 in order to allow the lever mechanism 534 to be moved between open (e.g., first, unlocked, disengaged, secured) and closed (e.g., second, locked, engaged, unsecured) positions as illustrated in FIGS. 31A-32B. In some embodiments, the lever mechanism 534 can be slidably mounted relative to the housing 532. Thus, rotational and sliding movements can be performed by a single mechanism of the retention assembly 522. However, in some embodiments, the lever mechanism 534 is rotatably (e.g., pivotally) mounted relative to the housing 532 about a fixed axis of rotation.

For example, the locking tab 574 of the lever mechanism 534 (see FIG. 31B) can be generally hook-shaped and can be rotatably (e.g., pivotally) mounted to enable engagement (e.g., in the closed position) or disengagement (e.g., in the open position) of the coupling mechanism 530 with the engagement protrusion 536. The movement of the locking tab 574 can allow the engagement protrusion 536 to be securely engaged to the coupling mechanism 530 in order to securely mount or attach the earstem 516 relative to the lens 512. In the closed position, the locking tab 574 of the lever mechanism is engaged with the interlocking portion 564 of the engagement protrusion 536 to secure the coupling mechanism 530 to the engagement protrusion 536 and/or mount the earstem 516 relative to the lens 512, and to resist disengagement and/or relative horizontal anterior or posterior movement between the earstem 516 and the front face and/or lens of the eyewear. In the open position, the locking tab 574 is pivotally disengaged from the interlocking portion 564 by rotating (e.g., pivoting) the locking tab 574 around a generally horizontal axis, and the engagement protrusion 536 can be removed from the coupling mechanism 530, allowing the earstem 516 to be detached from the lens 512.

In the locked position, the potential for accidental or unintentional removal or detachment of the engagement protrusion 536 from the coupling mechanism 530 may be resisted, substantially lowered, decreased, minimized or eliminated. For example, when the locking tab 574 is in engagement with the interlocking portion 564, the first engagement portion 536 can be securely engaged to the coupling mechanism 530 such that movement between the engagement protrusion 536 and the coupling mechanism is substantially constrained, prevented, or minimized in at least one degree of freedom (e.g., in an anterior-posterior direction generally parallel to a longitudinal axis of the ear stem 516). In some embodiments, the engagement between the locking tab 574 and the interlocking portion 564 in combination with the engagement protrusion 536 being completely or substantially received within the housing 532 can generally or substantially constrain or prevent movement of the engagement protrusion 536 relative to the coupling mechanism 530 in all directions.

In some embodiments, the lever mechanism 534 can be rotatably (e.g., pivotally) coupled relative to the housing 532 to define an axis of rotation 572 (see FIG. 29). The axis of rotation 572 (whether defined by one or more pins, protrusions, posts, screws, or other rotator bases, for rotatably (e.g., pivotally) coupling the lever mechanism 534 relative to the housing 532) can allow the lever mechanism 534 to be rotatable (e.g., pivotable) relative to an interior or engagement cavity 576 of the housing 532 between the open and closed positions. The rotator base(s) that define the axis of rotation 572 can be integrally or unitarily formed as part of the connector or can extend through corresponding apertures 584, 586 in the housing 532 and the lever mechanism 534 to rotatably (e.g., pivotally) couple the lever mechanism 534 to the housing 532. The axis of rotation 572 can extend through these corresponding apertures and/or pins or protrusions. The interior or engagement cavity 576 (see FIG. 33a) can be formed between first and second generally lateral side walls or flanges 578, 580. As illustrated in FIG. 33A, the interior or engagement cavity 576 is in a bottom portion of the housing 532. However, the engagement cavity 576 can be positioned in a top or upper portion of the housing 532 or other location in some embodiments.

As illustrated in FIG. 29, the axis of rotation 572 can extend generally parallel to a generally horizontal plane extending between or through the first and second lateral walls or sides 578, 580 of the housing 532 (e.g., generally transverse to a longitudinal axis of the earstem 516 and/or a vertical axis 588 extending between the top and bottom of the housing 532). In some embodiments, the lever mechanism 534 is rotatable (e.g., pivotable) about the generally horizontal axis of rotation 572 in a manner that permits upward and downward motion of one or more portions of the level mechanism along a generally anterior-posterior direction, as the lever moves between the closed and open positions to securely engage the engagement protrusion 536 to the coupling mechanism 530. However, as discussed above and further below, the lever mechanism 534 can be rotatable (e.g., pivotable) in other directions, angles or about other axes.

Figure 31A:
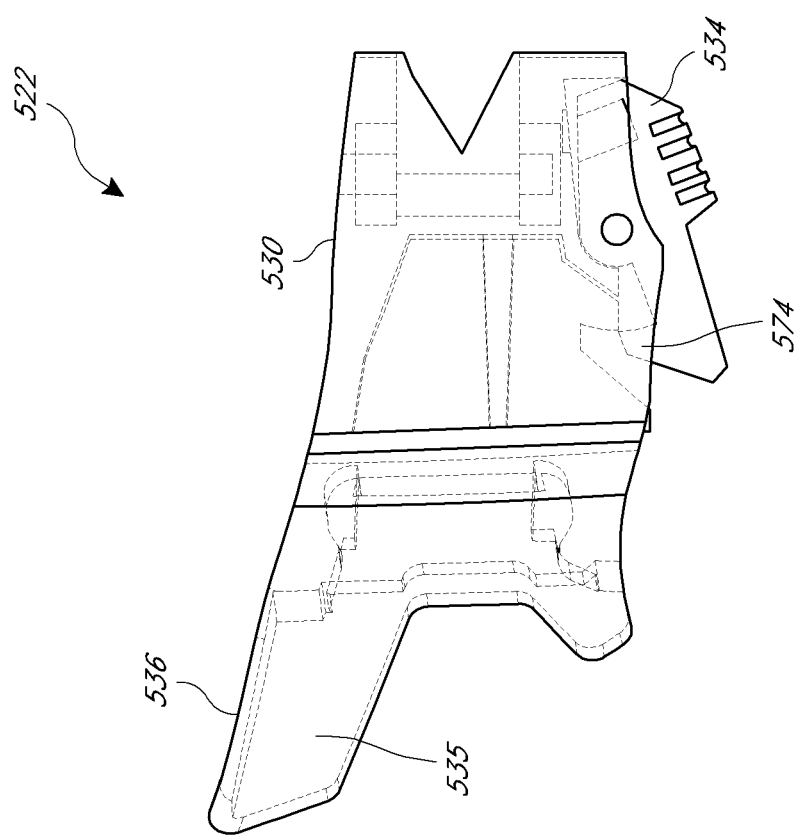
FIGS. 31A-31B are partial side perspective views of a retention assembly wherein a lever mechanism of the retention assembly is in an open or closed position according to an embodiment.
Figure 31B:
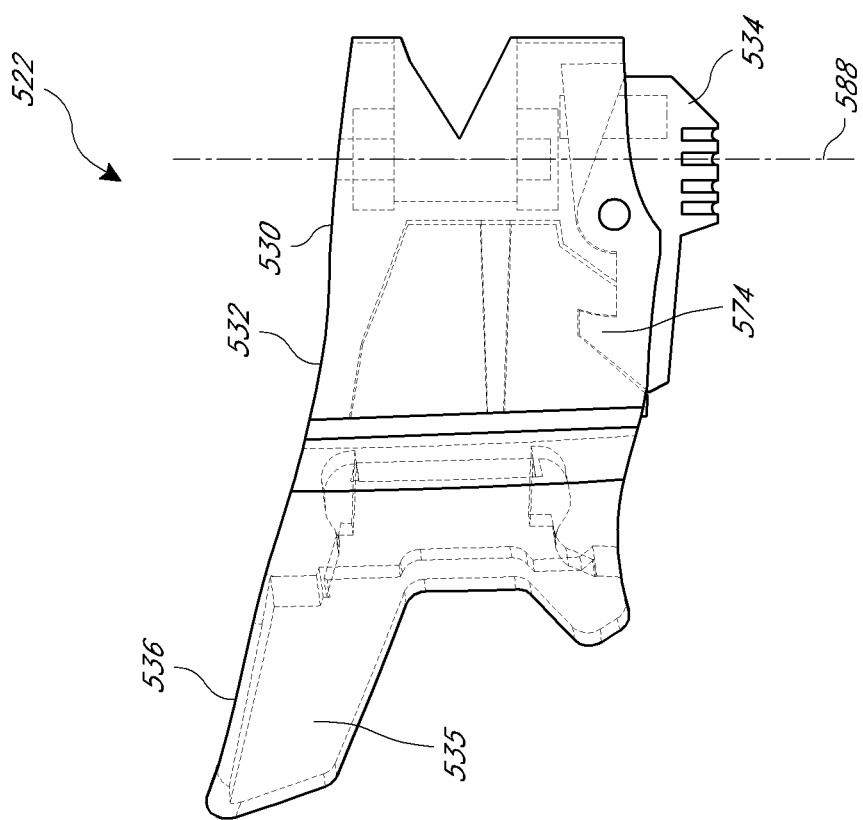

The biasing member 582 (see FIG. 30) can be configured to bias or urge the lever mechanism 534 toward either the closed or open positions. For example, as illustrated in FIGS. 31A-31B, when a user applies a force to the lever mechanism 534 toward the open position, the biasing member 582 will tend to bias or urge the lever mechanism 534 toward the closed position. In some embodiments, the biasing member 582 is oriented in a generally vertical direction (e.g., extending generally parallel to the vertical axis 588 and/or generally transverse to a longitudinal or horizontal axis of the earstem 516, as illustrated). However, in some embodiments, the biasing member 582 can be oriented at various angles relative to a generally vertical axis.

In some embodiments, the lever mechanism 534 includes an actuatable portion, grip, and/or handle 596 configured to be pushed or pressed by the user to move the lever mechanism 534 from the closed to the open position. In some embodiments, as illustrated, the handle 596 can extend generally parallel to the longitudinal axis of the earstem 516 and generally transverse to the vertical axis 588, and can protrude from the housing 532 and/or can be exposed along a bottom portion of the housing 532. In some embodiments, the positioning and/or shape of the handle 596, and/or the orientation of the generally horizontal axis of rotation 572, can provide a gripping feature and can provide ease of use as compared to other positions and axes of rotation.

In some embodiments, the housing 532 includes a second or posterior end generally opposite from the first or anterior end and can be configured to be attached with the first or anterior end 517 of the earstem 516. As illustrated in FIGS. 29-30 and 33A-33B, the earstem 516 and the coupling mechanism 530 can be separate components rotatably (e.g., pivotally) coupled relative to one another. However, in some embodiments, the earstem 516 and the coupling mechanism 530 are monolithic components (e.g., made of a deformable material).

As illustrated, the anterior end 517 of the earstem 516 can be rotatably (e.g., pivotally) or hingedly coupled relative to the housing 532 to provide a generally vertical axis of rotation 588. The generally vertical axis of rotation 588 can extend through a center portion of the corresponding apertures or holes and/or pin or protrusions that are aligned and engaged to rotatably (e.g., pivotally) couple the earstem 516 relative to the housing 532. As illustrated, in some embodiments, the axis of rotation 588 of the earstem 516 can be positioned at the posterior end of the housing 532 (e.g., rearward of the axis 572 and/or a posterior end of the engagement protrusion 536 completely or substantially received within the housing 532). In some embodiments, the axis of rotation 588 and/or rotatable (e.g., pivotable) coupling of the housing 532 and the earstem 516 can be at different positions (e.g., at the anterior end of the housing 532 and/or positioned in front or anteriorly of the axis 572).

FIGS. 34-40 illustrate additional embodiments and/or modifications of the eyewear or eyeglass illustrated in FIGS. 29-33, identified generally by the reference numerals 510', 510'', 510''', and 510''''. Components of the eyeglasses 510', 510'', 510''', 510'''', and/or 510''''' that are the same or similar to the corresponding components of the eyeglass 510 are identified below and in the FIGS. 34-40 with the same reference numerals except that additional reference indicators in the form of tick marks (e.g., ', '', ''', '''', ''''') have been added thereto. Any features, structures, materials, and/or steps illustrated and/or described in connection with any of the eyewear 510, 510', 510'', 510''', 510'''', and/or 510''''', can be the same or similar to, and/or can be combined with and/or interchanged with or include one or more features, structures, materials, and/or steps, in whole or in part, of each other or of any of the eyeglasses or eyewear described herein.

For example, with reference to FIGS. 34A-34B, the eyeglass 510' can include a unitary lens 512' and a pair of earstems 514', 516'. The earstems 514', 516' can be removably attached to the lens 512' using respective retention mechanisms or assemblies 520', 522'. The retention assemblies 520, 522' can be used to interchange one unitary lens for another unitary lens and/or one ear stem for another ear stem in order to allow the wearer to customize the look and feel of the eyeglass 510'. The retention assembly 522' can comprise a coupling mechanism 530' that comprises a housing 532', a lever mechanism 534', an engagement protrusion 536', and a biasing mechanism or member 582' (e.g., spring, coil spring, leaf spring, deflectable or resilient member).

As illustrated in FIGS. 34A-34B, in some embodiments, the housing 532' of the eyeglass 510' can be rotated (e.g., pivoted) about a generally horizontal axis (e.g., extending generally parallel to the axis 572' that the lever mechanism 534' is configured to rotate (e.g., pivot) about) in order to couple, install, or engage the coupling mechanism 530' to the engagement structure 536' (e.g., to engage or receive the engagement structure 536'). As illustrated in FIG. 34A, the housing 532' can be rotated (e.g., pivoted) in a generally clockwise or downward direction about the generally horizontal axis as indicated by arrow 590' to engage with the engagement structure 536'. However, in some embodiments, the housing 532' can be rotated (e.g., pivoted) in a generally counter-clockwise or upward direction about the generally horizontal axis to engage with the engagement structure 536'

The engagement structure 536' can include one or more engagement portions, such as cut-outs, recesses and/or interlocking portions 564a', 564b', or protrusions, on one or both upper and lower portions of the posterior portion 537' that are configured to be engaged and/or secured by one or more engagement portions, such as tabs, protrusions, or hooks 574a', 574b', or recesses or openings, of the housing 532' and lever mechanism 534' respectively. As illustrated in FIG. 34B, once the upper tab 574a' is coupled with or positioned within the upper recess 564a' of the engagement protrusion 536', the coupling mechanism 530' can be configured to be rotate (e.g., pivot) downwardly to engage the lower tab 574b' of the lever mechanism 534' with the lower recess 564b' to securely engage the coupling mechanism 530' to the engagement protrusion 536' (and the earstem 516' to the lens 512'). As illustrated, the rotatable (e.g., pivotable) lever mechanism 534' with the tab 574b' is positioned on a lower portion of the housing 532' and the fixed or monolithically formed tab 574a' is positioned on an upper portion of the housing 532'. However, in some embodiments, the rotatable (e.g., pivotable) lever mechanism 534' with the tab 574b' is positioned on an upper portion of the housing 532' and the fixed or monolithically formed tab 574a' is positioned on a lower portion of the housing 532'.

As discussed elsewhere herein, the biasing member 582 can be configured to extend generally parallel to a generally vertical axis. However, in some embodiments, as illustrated in an example in FIG. 35, the biasing member 582" can be oriented or extend at various angles α relative to a vertical axis 592" and the top or bottom of the eyeglass 510". An oblique axis 594" (e.g., not generally vertical or generally horizontal) extends through the biasing member 582" at the angle α relative to the vertical axis 592" indicating the orientation of the biasing member 582". In some embodiments, the angle α can be equal to or less than about: 20 degrees and/or 45 degrees, and/or any value therebetween. As illustrated in FIG. 35, when the biasing member 582" is oriented, extends or positioned at an angle α relative to the vertical axis 592", an actuatable portion, grip, and/or handle 596" of the lever mechanism 534" (e.g., configured to be pressed or pushed to move the lever mechanism 534" between the open and closed positions) can extend in a generally oblique direction (e.g., generally perpendicular or transverse to the axis 594" in some embodiments), such that the user can push the actuatable portion 596" in a generally anterior direction rather than a generally upward direction as with the lever mechanism 534 of the eyewear 510.

Figure 36A:
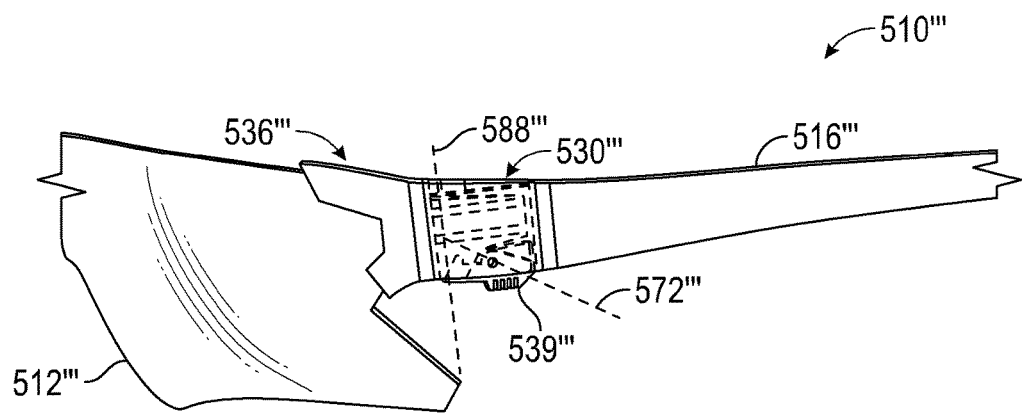
FIGS. 36A-36B are partial side and rear perspective views, respectively, of an eyeglass in accordance with an embodiment.
Figure 36B:
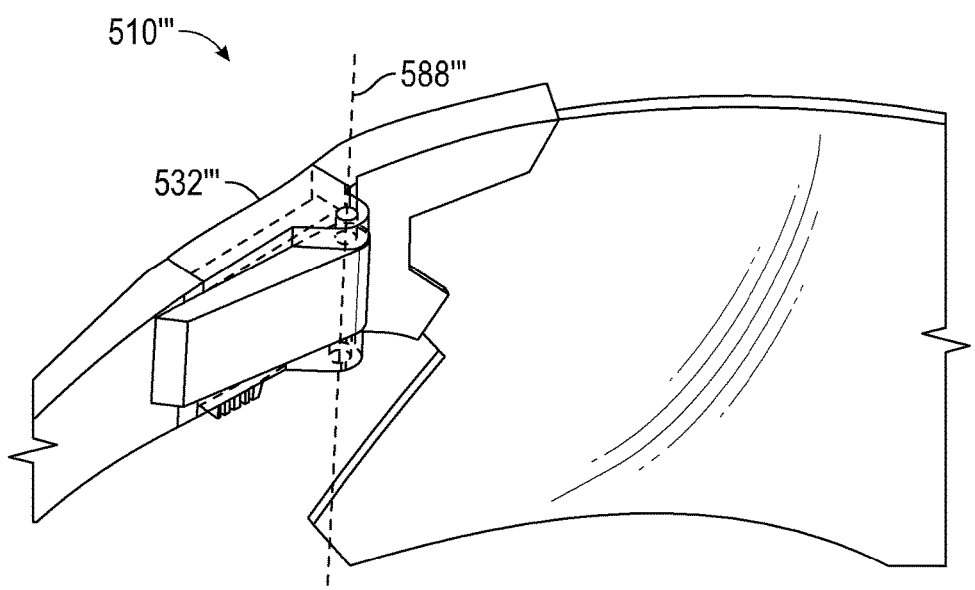
Figure 36C:
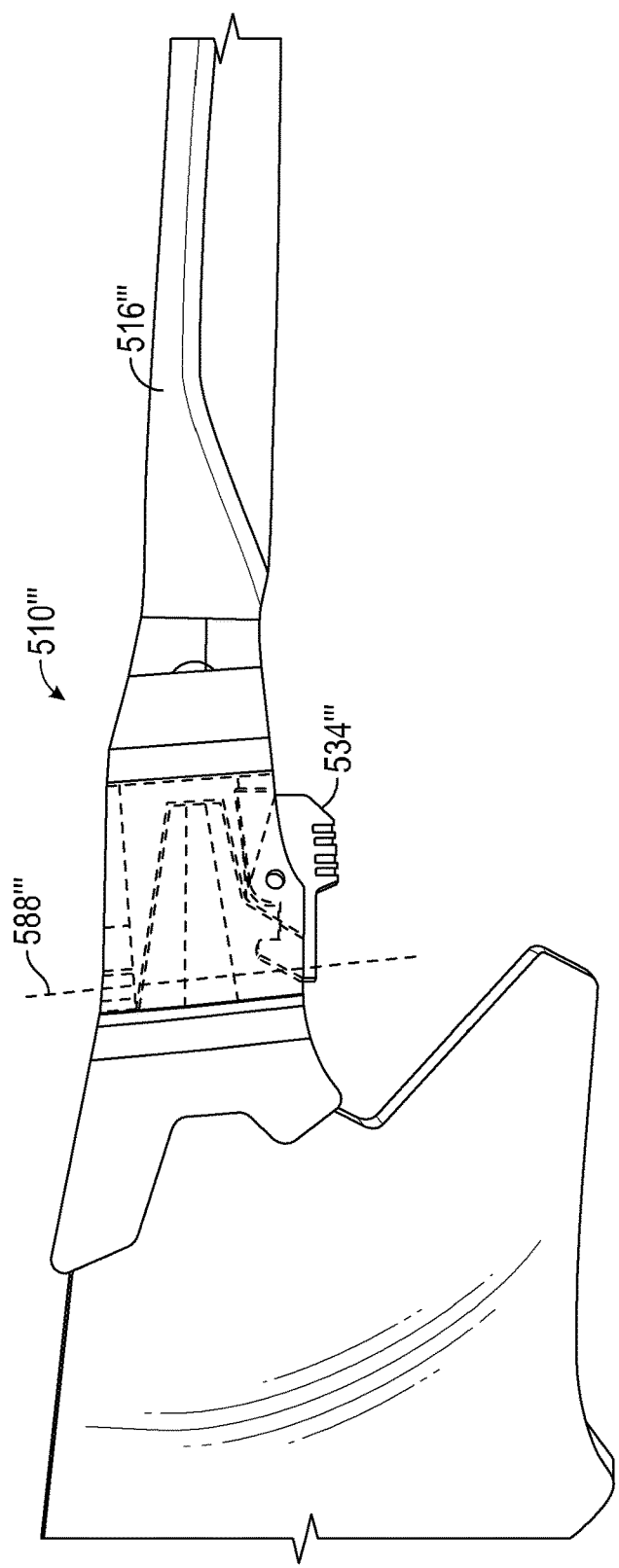
FIG. 36C is a side view of the eyeglass of FIGS. 36A-36B.

As illustrated in FIGS. 36A-36C, in some embodiments, the earstem 516''' of the eyeglass 510''' is configured to rotate (e.g., pivot) about the generally vertical axis 588'''. The generally vertical axis 588''' (e.g., hinge) can be positioned in various locations relative to the housing 532''' (e.g., near an anterior end of the housing 532'''). In some embodiments, the vertical axis of rotation 588''' of the hinge can be positioned forward of or anterior to the generally horizontal of rotation of the lever mechanism 534'''. The vertical axis of rotation 588''' can form an oblique angle with a longitudinal axis 572''' of the level mechanism 539'''. The vertical axis of rotation 588''' can be configured to rotate (e.g., pivot) relative to a posterior end of the engagement protrusion 536''' received within the housing 532'''. In some embodiments, the housing 532''' can be longer in length than configurations having the vertical axis of rotation of the earstem being positioned near the posterior end of the housing 532'''.

Figure 37A:
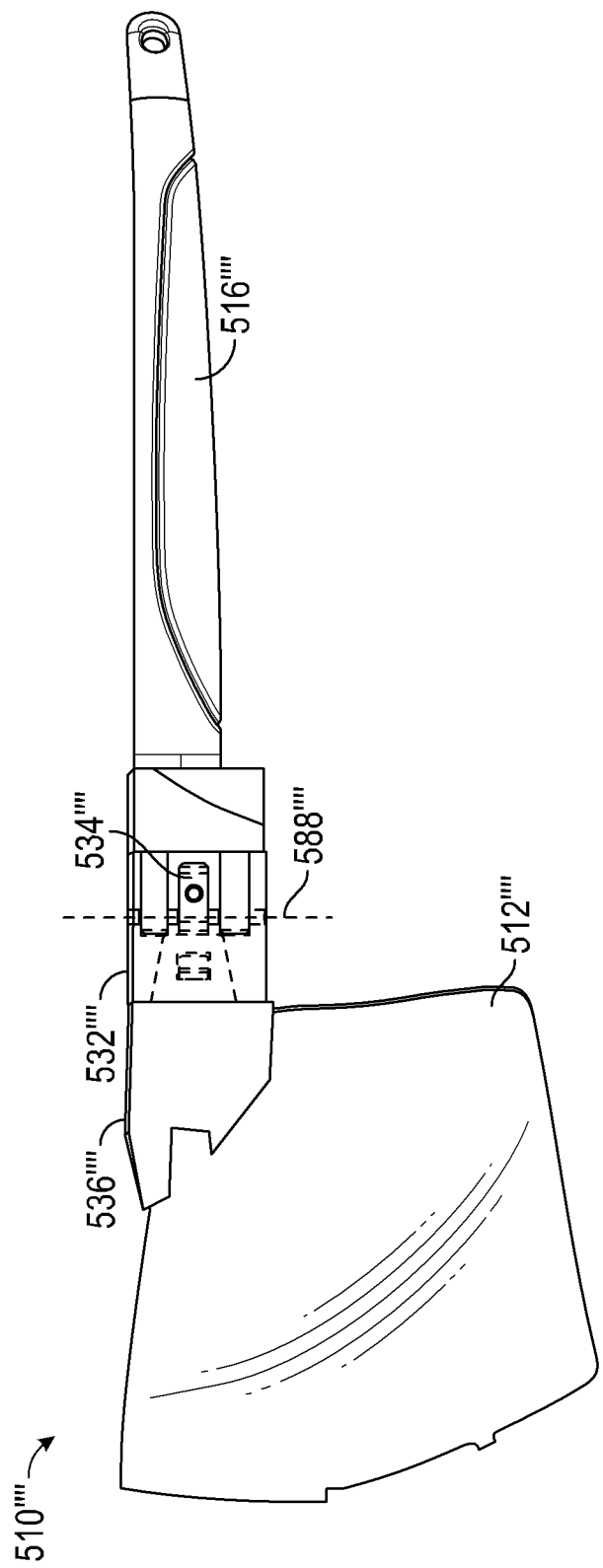
FIGS. 37A-37C are side and top views of an eyeglass in accordance with an embodiment.
Figure 37B:
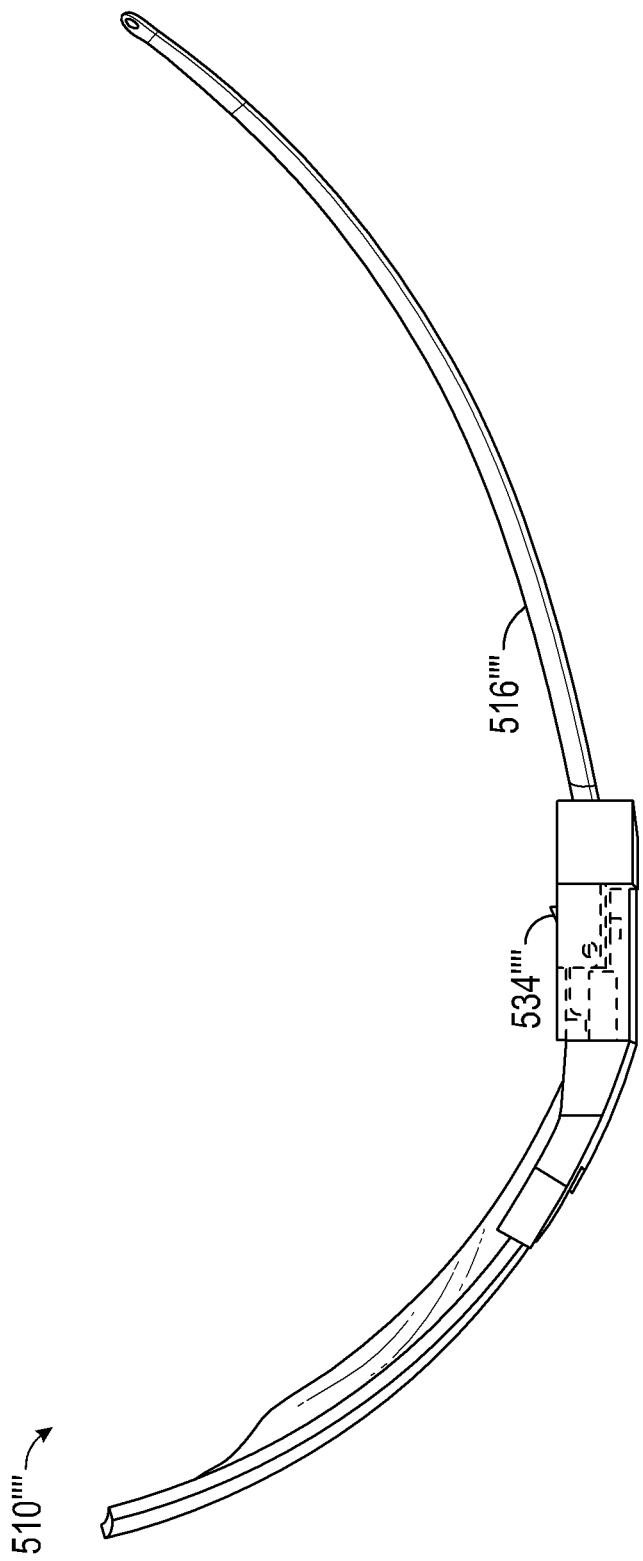
Figure 37C:
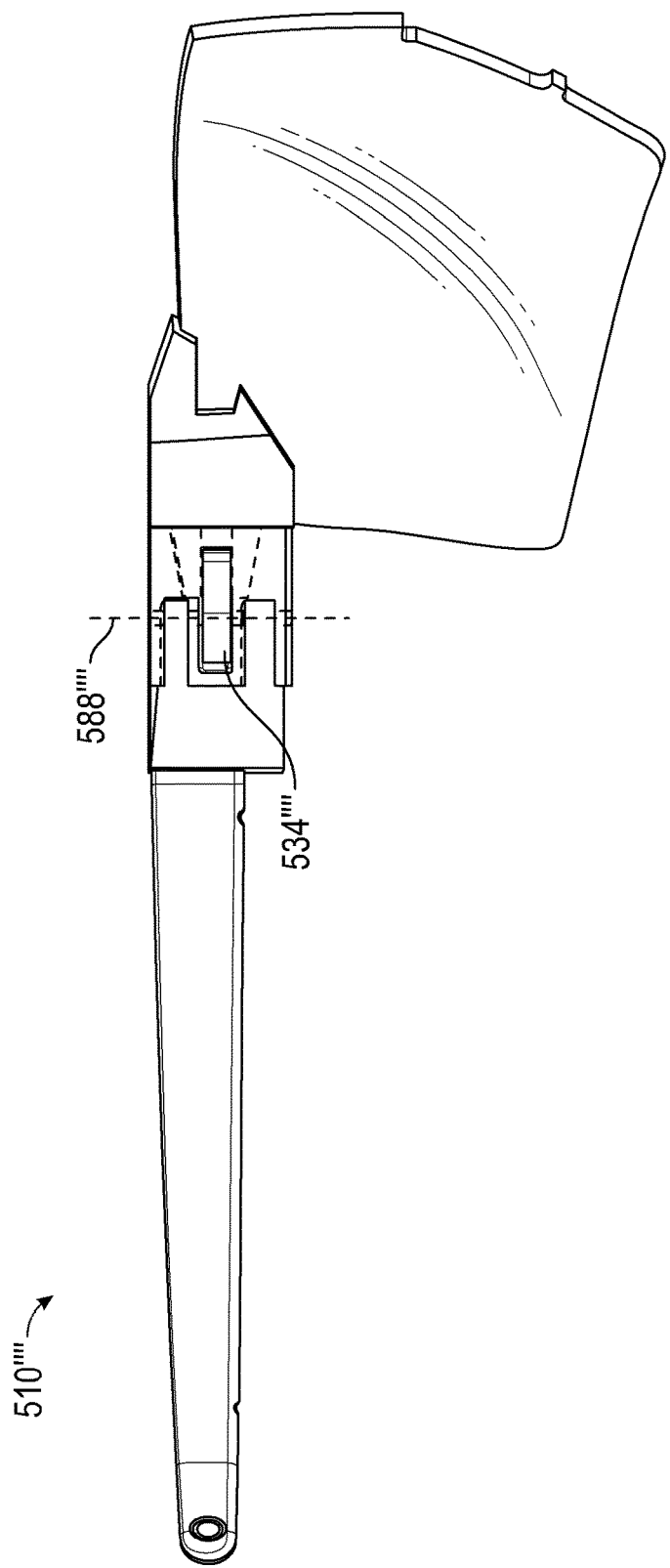

As illustrated in FIGS. 37A-37C, in some embodiments, the earstem 516"" and the lever mechanism 534"" of eyeglass 510"" are configured to rotate (e.g., pivot) about the same axis as the generally vertical axis of rotation 588"" of the hinge and/or about an axis that is generally coaxial with the generally vertical axis of rotation 588"" or hinge (e.g., pin, protrusions). The lever mechanism 534"" and earstem 516"" can include one or more apertures configured to be generally aligned along a longitudinal or anterior-posterior axis to receive a hinge, pin or protrusions that the lever mechanism 534"" and earstem 516"" can rotate (e.g., pivot) about. In some embodiments, the lever mechanism 534"" is configured to rotate (e.g., pivot) about a generally vertical axis between open and closed positions. While the earstem 516"" and the lever mechanism 534"" are illustrated as rotating (e.g., pivoting) about the same vertical axis of rotation 588"" in FIGS. 37A-37C, in other embodiments, the earstem 516"" and the lever mechanism 534"" can be rotated (e.g., pivoted) about generally vertical axes of rotation that are non-coaxial (e.g., spaced or positioned apart from one another) along the longitudinal axis of the earstem 516"". Eyeglasses having generally coaxial axes of rotation for the lever mechanism and earstem can generally have smaller form factors (e.g., take up less space) by having decreased width and length (e.g., of the housing) relative to eyeglasses having non-coaxial axes of rotation.

Figure 38:
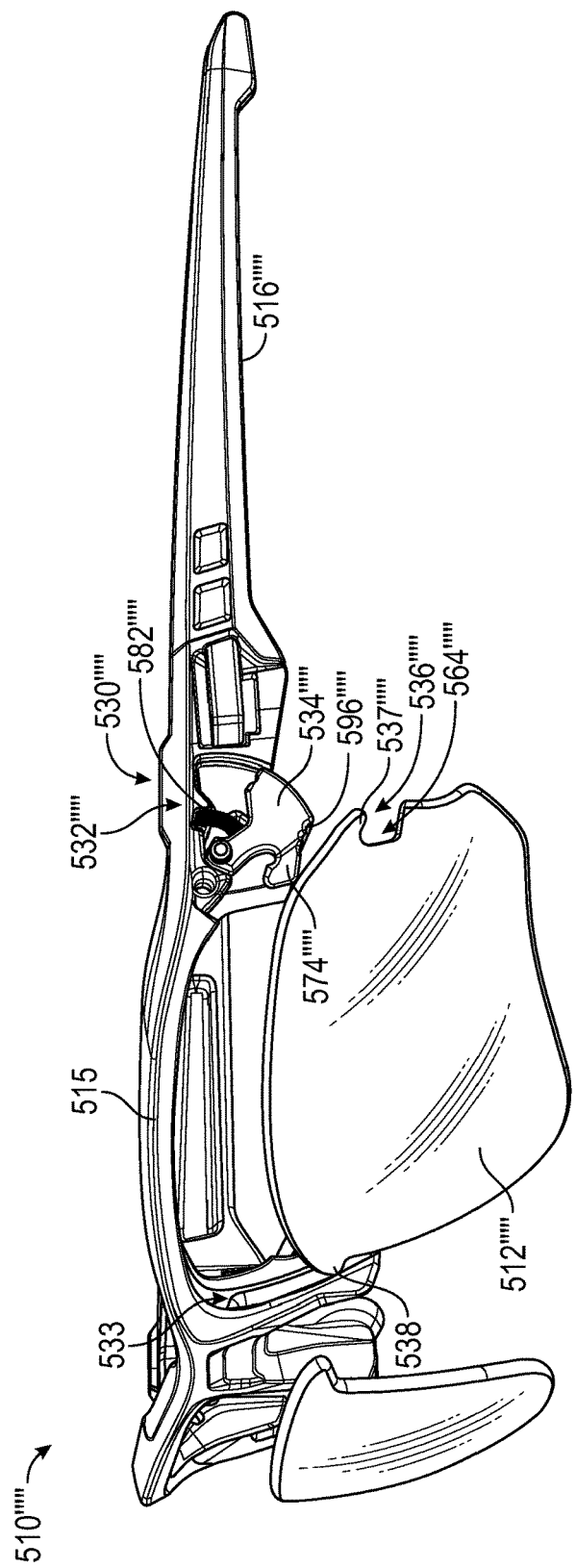
FIG. 38 is a front perspective view of an embodiment of an eyewear with lenses detached.
Figure 39:
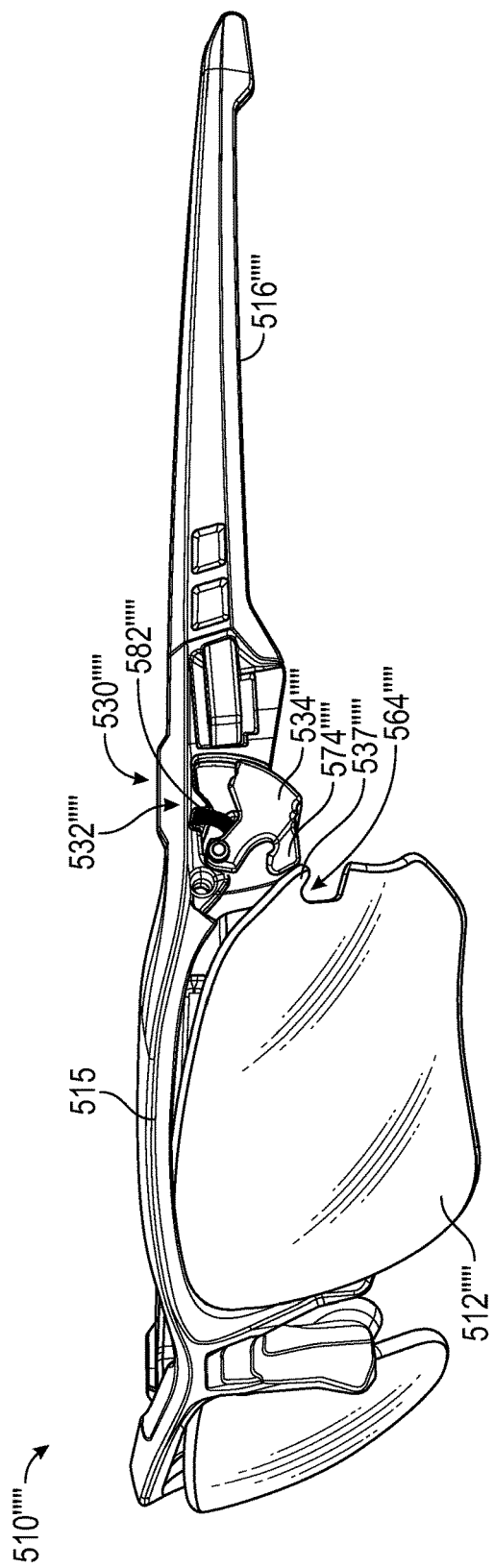
FIG. 39 is a front perspective view of the eyewear of FIG. 38 with lenses partially attached.
Figure 40:
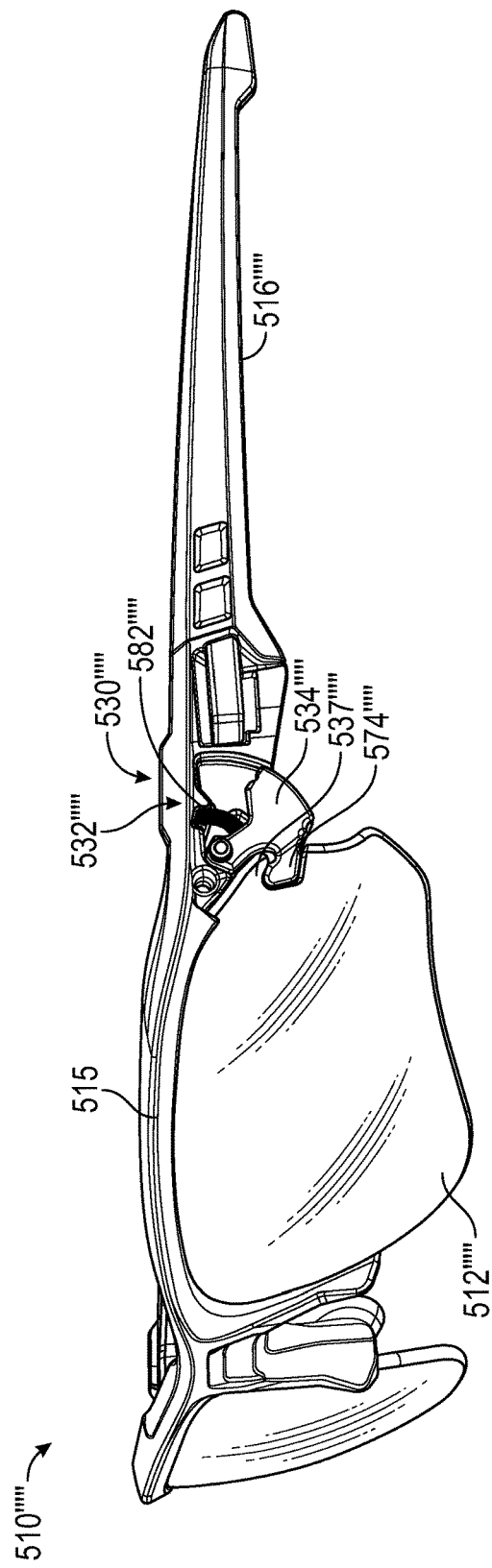
FIG. 40 is a front perspective view of the eyewear of FIG. 38 with lenses attached.

As illustrated in FIGS. 38-40, in some embodiments, the eyeglass 510"" can include a frame 515 configured to support one or more lenses 512"" in a wearer's field of view. As shown in the illustrated embodiment, the eyeglass 510"" can be a dual-lens eyeglass 510"" having two lenses. However, some or all features described herein can also be applied to an eyewear having a unitary lens. The ear stem 516"" can be rotated (e.g., pivoted) relative to the frame 515. As shown in the illustrated embodiment, the coupling mechanism 530"" of the eyewear 510"" is formed in the frame 515. The coupling mechanism 530"" can include a housing 532"" and an actuator, such as lever mechanism 534"". For illustrative purposes, a cover (not shown) has been removed to illustrate underlying components of the coupling mechanism 530"". The cover can be removably attached to the frame 515 or can be integrally formed with the frame 515. In some embodiments, the coupling mechanism 530"" can include a biasing mechanism 582"" such as a spring, including but not limited to a coil spring and a leaf spring, a compressible or resilient member, and/or a deflectable member, or any other biasing mechanism. As shown in the illustrated embodiment, the housing 532"" is formed in lateral regions on both sides of the frame 515. It is contemplated that the housing 532"" can be formed in other portions of the frame 510"", such as a medial portion, and may be positioned proximate a nosepiece region of the frame 510"".

The lever mechanism 534"" can be rotatably (e.g., pivotally) mounted relative to the housing 532"". As shown in the illustrated embodiment, the biasing mechanism 582"" can bias the lever mechanism 534"" into a first, closed position shown in FIGS. 38 and 40 such that the closed position is the initial, at-rest position of the lever mechanism 534"". The biasing mechanism 582"" can be held in place on the lever mechanism 534"" via a mechanical coupling, such as a protrusion or detent (not shown), which can be inserted into the biasing mechanism 582"", a recess into which the biasing mechanism 582"" can be inserted, mechanical fasteners such as screws, chemical fasteners such as adhesives, other types of fastening mechanisms, and/or a combination of such mechanisms. The biasing mechanism 582"" can be retained in the housing 532"" via similar mechanisms.

The lens 512'''' can include an engagement structure 536''''', such as the protrusion as shown. The engagement structure 536''''' can be a portion of the lens 512'''''. For example, the engagement structure 536''''' can be integral, unitarily formed, and monolithic with the lens 512''''' and formed as a single unit with the lens 512'''''. As another example, the engagement structure 536''''' can be separate from the lens 512''''' and permanently attached to the lens 512''''' via fasteners including, but not limited to, chemical adhesives and/or techniques such as welding. The engagement structure 536''''' can have a thickness similar to that of the lens 512''''' and/or can have a curvature similar to that of the lens 512'''''. The engagement structure 536''''' can be formed of the same, or similar, material to the lens 512'''''. In some embodiments, the engagement structure 536''''' can be formed from a transparent material.

As shown in the illustrated embodiment, the engagement structure 536''''' of the lens 512''''' can form a posterior or lateral portion 537''''' of the lens 512'''''. The posterior or lateral portion 537''''' can be configured to be engaged to, secured to, and/or received within the housing 532''''' of the coupling mechanism 530'''''. In the illustrated embodiment, the lateral portion 537''''' is a protrusion; however, it is contemplated that the lateral portion 537''''' can be a recess, a tab, or a combination of such features. In some embodiments, the lens 512''''' can also include a an interlocking portion 564'''''. In some embodiments, the interlocking portion 564''''' can comprise a removal-inhibiting structure, such as a recess, a cut-out, a slot, or an overhanging edge that can receive or be engaged, secured, or interconnected with a corresponding or complementary-shaped removal-inhibiting locking member 574''''' such as a protrusion, hook, tab, or engagement portion of the lever mechanism 534''''', in accordance with some embodiments discussed further herein. However, some embodiments of the engagement structure 536''''' can be configured such that the shape and configuration of the engagement structure 536''''' need not incorporate undercut portions.

The lever mechanism 534''''' can be rotatably (e.g., pivotally) mounted relative to the housing 532''''' in order to allow the lever mechanism 534''''' to be moved between a first, closed (e.g., engaged, secured) position and a second, open (e.g., disengaged, unsecured) position as illustrated in FIGS. 38-40. In some embodiments, the lever mechanism 534''''' can be slidably mounted relative to the housing 532'''''. Thus, rotational and sliding movements can be performed by a single mechanism. However, in some embodiments, the lever mechanism 534''''' is rotatably (e.g., pivotally) mounted relative to the housing 532''''' about a fixed axis of rotation. In some embodiments, the lever mechanism 534''''' includes an actuatable portion, grip, and/or handle 596''''' configured to be pushed or pressed by the wearer to move the lever mechanism 534''''' from the closed to the open position. As shown in the illustrated embodiment, the handle 596''''' is formed at or proximate a posterior portion of a bottom surface of the lever mechanism 534'''''.

The locking tab 574''''' of the lever mechanism 534''''' can be generally hook-shaped and can be rotatably (e.g., pivotally) mounted to enable engagement (e.g., in the closed position) or disengagement (e.g., in the open position) of the coupling mechanism 530''''' with the engagement structure 536''''' of the lens 512'''''. The movement of the locking tab 574''''' can allow the engagement structure 536''''' to be securely engaged to the coupling mechanism 530''''' in order to securely mount or attach the lens 512''''' relative to the frame 515.

In some embodiments, in the closed position, the locking tab 574''''' of the lever mechanism 534''''' can be engaged with the interlocking portion 564''''' of the engagement structure 536''''' to secure the coupling mechanism 530''''' to the engagement structure 536''''' and/or mount the lens 512''''' relative to the frame 515. In the closed position, the locking tab 574''''' of the lever mechanism 534''''' can be engaged with the interlocking portion 564''''' of the engagement structure 536''''' to resist disengagement and/or relative horizontal anterior or posterior movement between the frame 515 and the lens 512''''' of the eyewear 510'''''. In some embodiments, in the open position, the locking tab 574''''' can be pivotally disengaged from the interlocking portion 564''''' by rotating (e.g., pivoting) the locking tab 574''''' around a generally horizontal axis. In the open position, the engagement structure 536''''' can be removed from the coupling mechanism 530''''' thereby allowing the lens 512''''' to be removed from the frame 515.

In the closed position, the potential for accidental or unintentional removal or detachment of the engagement structure 536''''' from the coupling mechanism 530''''' may be resisted, substantially lowered, decreased, minimized or eliminated. For example, when the locking tab 574''''' is in engagement with the interlocking portion 564''''', the first engagement structure 536''''' can be securely engaged to the coupling mechanism 530''''' such that movement between the engagement structure 536''''' and the coupling mechanism is substantially constrained, prevented, or minimized in at least one degree of freedom in a superior-inferior direction. In some embodiments, the engagement between the locking tab 574''''' and the interlocking portion 564''''' in combination with the engagement structure 536''''' being completely or substantially received within the housing 532''''' can generally or substantially constrain or prevent movement of the engagement structure 536''''' relative to the coupling mechanism 530''''' in all directions.

As shown in the illustrated embodiment, the lens 512''''' can include a securing structure 538, such as a protrusion as shown, formed on the lens 512'''''. The securing structure 538 can be a portion of the lens 512'''''. For example, the securing structure 538 can be integral, unitarily formed, or monolithic with the lens 512''''' and formed as a single unit with the lens 512'''''. As another example, the securing structure 538 can be separate from the lens 512''''' and permanently attached to the lens 512''''' via fasteners including, but not limited to, chemical adhesives and/or techniques such as welding. The securing structure 538 can have a thickness similar to that of the lens 512''''' and/or can have a curvature similar to that of the lens 512'''''. The securing structure 538 can be formed of the same, or similar, material to the lens 512'''''. In some embodiments, the engagement structure 536''''' can be formed from a transparent material.

As shown in the illustrated embodiment, the securing structure 538 can form an anterior or medial portion 541 of the lens 512'''''. The securing structure 538 can be configured to be engaged to, secured to, and/or received within a complementary structure, such as a recess 533, of the frame 515. While the securing structure 538 is illustrated as a protrusion, it is also contemplated that the securing structure 538 can be a recess and/or a tab. Moreover, the complementary engagement structure of the frame 515 can be a tabs and/or protrusion.

In some embodiments, the lens 512''''' can be attached to the frame 515 by engaging the securing structure 538 of the lens 512''''' with the recess 533 of the frame 515 as shown in FIG. 39. The lens 512''''' can then be pivoted upwards such that the engagement structure 536''''' of the lens 512''''' contacts the locking tab 574""' of the lever mechanism 534""'. The contact surfaces of the engagement structure 536""' and the locking tab 574""' can be complementarily shaped such that further pivoting of the lens 512""' upwardly in an insertion direction causes the lever mechanism 534""' to move towards the open position thereby allowing the lens 512""' to be further pivoted into the housing 532""'. As the lens 512""' is further pivoted upwards in an insertion direction, the biasing mechanism 582""' can urge the lever mechanism 534""' to rotate back towards the locked position such that locking tab 574""' engages the interlocking portion 564""' as shown in FIG. 40. This can beneficially allow a wearer to attach the lens 512""' to the frame 515 without having to contact the lever mechanism 534""' to manually pivot or actuate the lever mechanism 534""' from the closed position to the open position. As shown in the illustrated embodiment, the surface can be cammed and/or have a curved shape. In order to remove the lens 512""' from the frame 515, the wearer can move the lever mechanism 534""' into the open position, such as by pressing the actuatable portion, grip and/or handle 596""' to manually pivot or actuate the lever mechanism 534""' from the closed position to the open position. While the embodiment described herein allows for coupling of one or more lenses 512""' to a frame 515, one or more features can be used to couple other eyeglass components together. For example, one or more features can be applied to a coupling between two portions of an earstem, a coupling between two orbitals of a frame, a coupling between a frame and an earstem, and/or a coupling between other components.

Figure 41:
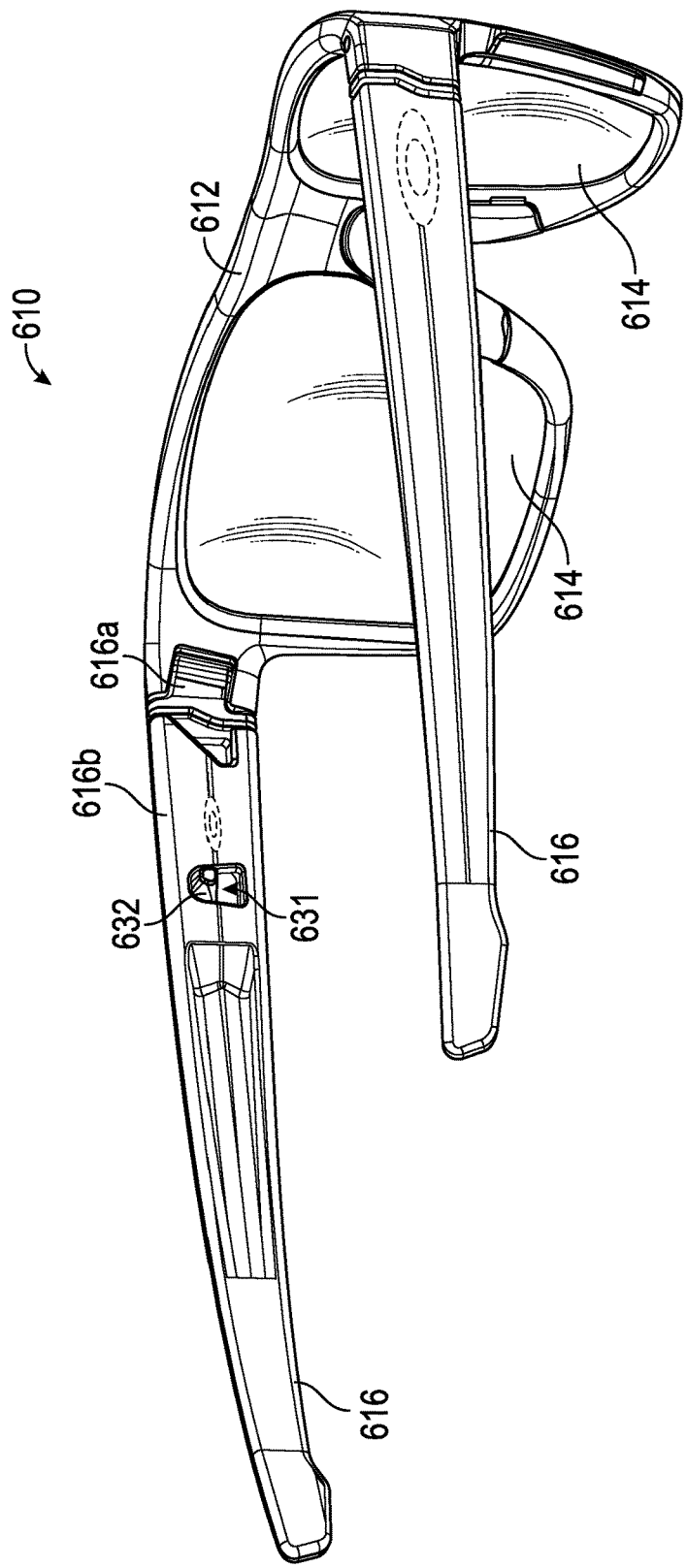
FIG. 41 is a rear perspective view of an embodiment of an eyewear with components in a coupled configuration.
Figure 42:
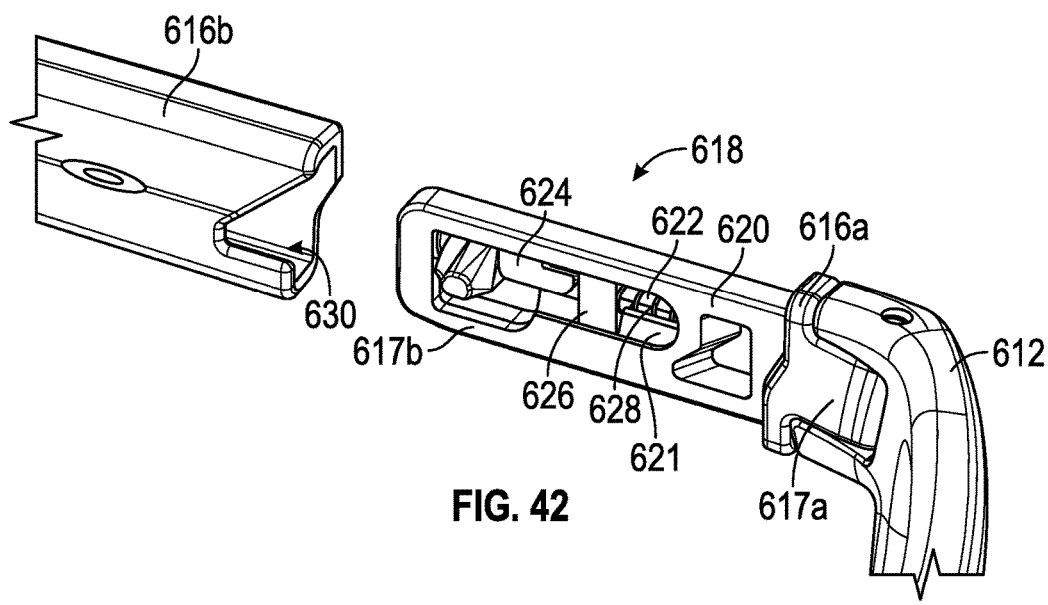
FIG. 42 is a perspective view of the eyewear of FIG. 41 with components in a decoupled configuration.

FIGS. 41-44 illustrate an embodiment of an eyeglass 610 which includes removably detachable components. With reference first to FIGS. 41 and 42, the eyeglass 610 can include a frame 612 configured to support one or more lenses 614 in a wearer's field of view and earstems 616 which can support the eyeglass 610 on the wearer's head. As shown in the illustrated embodiment, the eyeglass 610 can be a dual-lens eyeglass having two lenses. However, one or more features described herein can also be applied to an eyewear having a unitary lens. The earstems 616 can be rotated (e.g., pivoted) relative to the frame 612. For purposes of brevity, only one earstem 616 will be described in further detail; however, it should be understood that such features can also apply to the second earstem 616.

The earstem 616 can include a first component 616a, such as an anterior portion of the earstem 616, and a second component 616b, such as a posterior portion of the earstem 616. The first and second components 616a, 616b can be removably coupled using a coupling assembly 618 which can be positioned on one or both components 616a, 616b or can be wholly separate from both components 616a, 616b. In some embodiments, the coupling assembly 618 can allow a wearer to removably couple components without the use of tools. This can advantageously allow a wearer to more easily swap different components on a single eyeglass 610, such as portions of earstems 616, based on the wearer's preferences. For example, a wearer may have multiple second components 616b of earstem 616 with different colors, traction members, shapes, and/or other features.

With continued reference to FIGS. 41 and 42, the coupling assembly 618 can include a support or tab 620, a pin 622, a lever 624, a slide 626, and/or a biasing mechanism 628. In some embodiments, the support or tab 620 can be formed in the first component 616a of the earstem 616. As shown in the illustrated embodiment, a first portion 617a, such as an anterior portion of the first component 616a, can be rotatably coupled to the frame 612. The first component 616a can include a second portion 617b, such as a posterior portion of the first component 616a. The second portion 617b can include the support or tab 620 which can support one or more components of the coupling assembly 618 such as the pin 622, the lever 624, the slide 626, and/or the biasing mechanism 628. In some embodiments, some or all components of the coupling assembly 618 can be on the second component 616b of the earstem 616.

The coupling assembly 618 can be received within a cavity 630 of the second component 616b of the earstem 616. As shown in the illustrated embodiment, the two components 616a, 616b can be coupled by translating the two components 616a, 616b towards each other and positioning a component of the coupling assembly 618, such as the lever 624, within an aperture 631 of the second component 616b to secure the first and second components 616a, 616b relative to each other. As shown, the two components 616a, 616b are translated together in an anterior-posterior direction. In some embodiments, the components 616a, 616b can be rotated and/or translated in other directions, such as a superior-inferior direction and/or a medial-lateral direction.

As shown in the illustrated embodiment, the support or tab 620 can have smaller dimensions than the first portion 617a. This can beneficially allow the support or tab 620 to be inserted into the second component 616b of the earstem 616 without increasing the dimensions of the second component 616b. This can advantageously allow second components 616b to have a form factor similar to that of a similar, unitary earstem. Moreover, this can advantageously allow the coupling assembly 618 to be relatively hidden or camouflaged.

Figure 43:
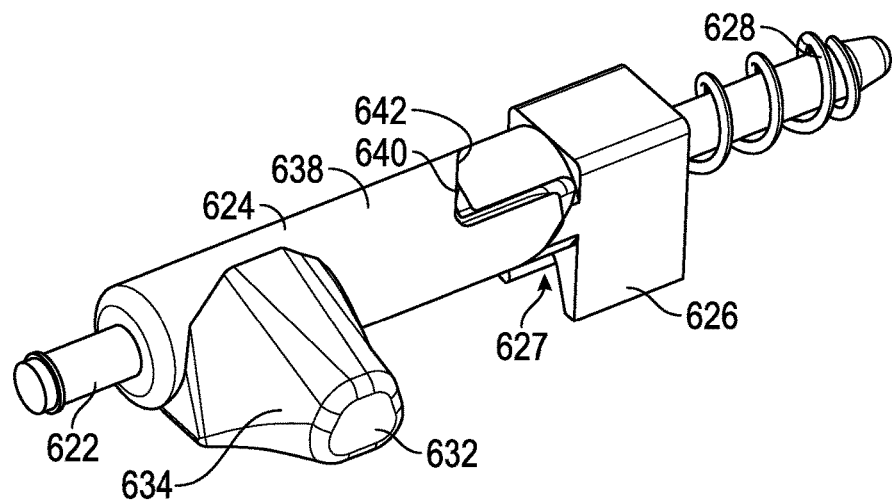
FIG. 43 is a perspective view of components of a coupling assembly of the eyewear of FIG. 41.
Figure 44:
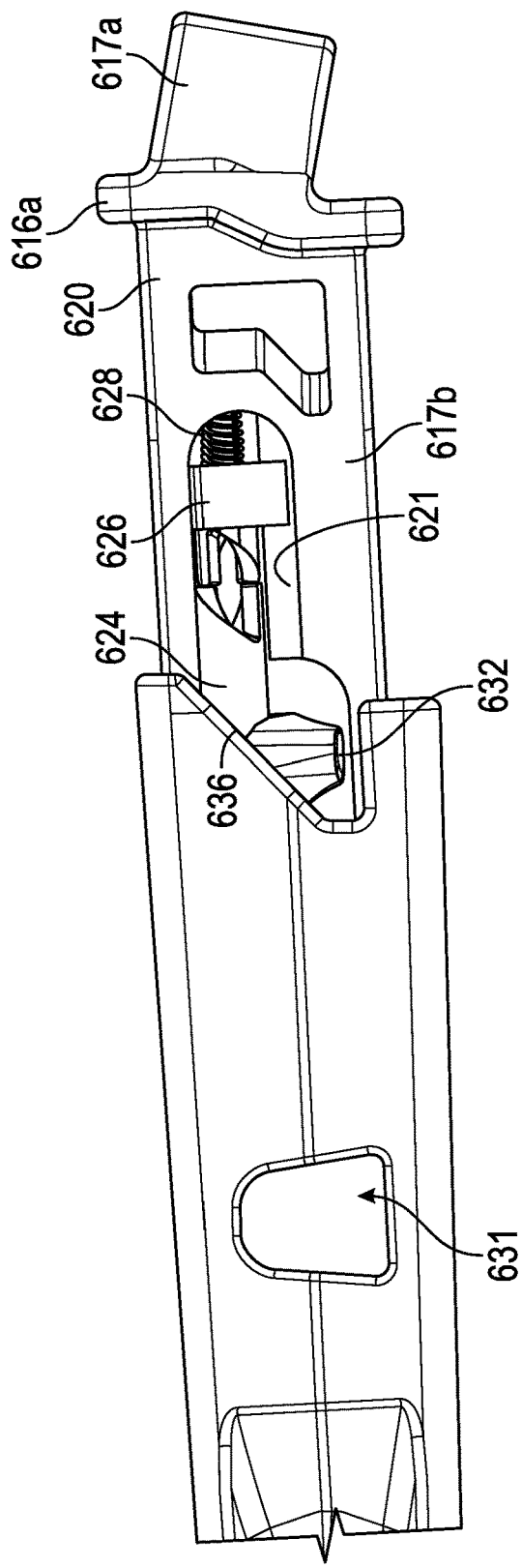
FIG. 44 is a side view of components of the eyewear of FIG. 41 in transition between a coupled and decoupled configuration.

With reference next to FIG. 43, the lever 624 can include a projection 632 which extends radially outward from a longitudinal axis or rotational axis of the lever 624. As shown in the illustrated embodiment, the longitudinal axis or rotational axis of the lever 624 can be the longitudinal axis of the earstem 616. The coupling assembly 618 can be rotatably (e.g., pivotally) mounted relative to the support or tab 620 in order to allow the lever 624 to be moved between a first, closed (e.g., engaged, secured) position, as shown in FIGS. 41 and 42, to a second, open (e.g., disengaged, unsecured) position as shown in FIG. 44. In some embodiments, in the closed position, the projection 632 can be engaged with or positioned within the aperture 631 to secure the first and second components 616a, 616b relative to each other and/or mount the first and second components 616a, 616b relative to each other. In the closed position, the projection 632 can be engaged with or positioned within the aperture 631 to resist disengagement and/or relative horizontal anterior or posterior movement between the first and second components 616a, 616b. In some embodiments, in the open position, the lever 624 can be pivotally disengaged from the aperture 631 by rotating (e.g., pivoting) the lever 624 around a generally horizontal axis.

In some embodiments, the projection 632 can include a surface 634 which can complementarily contact a surface or edge 636 of the second component 616b. In some embodiments, the surfaces 634, 636 can be complementarily shaped such that, as the second component 616b is translated towards the first component 616a, or vice-versa, contact between the surfaces 634, 636 would apply a force which rotates the lever 624 from athe closed position to the open position. In this manner, when a wearer desires to couple the two components 616a, 616b together, a wearer can do so by simply translating the two components 616a, 616b towards each other without having to contact the lever 624 to manually pivot or actuate the lever 624 from the closed position to the open position. In some embodiments, one or both of the surfaces 634, 636 can be cammed, curved, ramped, or shaped such that, when the two components are translated towards each other, the surfaces 634, 636 apply a force on lever 624 which rotates the lever 624 from the closed position to the open position.

With continued reference to FIG. 43, the lever 624 can include body portion 638. The body portion 638 can include an edge 640. The edge 640 of the body portion 638 can engage an edge 642 of the slide 626. In some embodiments, the edges 640, 642 can be complementarily shaped 640, 642 such that rotation of the lever 624 and body portion 638 would apply a force which translates the slide 626 relative to the body portion 638. For example, in some embodiments, the edges 640, 642 can be helical-shaped and/or include a curvature. In some embodiments, the curvature can distribute load between the lever 624 and the slide 626 over more than one contact point. For example, the curvature can distribute the load between a first point and a second point approximately 180 degrees from the first point. This can beneficially lower the likelihood of misalignment between the lever 624 and slide 626. In some embodiments, the edges 640, 642 can be straight, angled edges. In some embodiments, the slide 626 can include a groove 627. The groove 627 can which can fit over a rail 621, such as a v-shaped rail, on the support or tab 620 which can inhibit rotation of the slide 626 about the pin 622. Other structures which can inhibit rotation, such as a separate pin, can be used.

As shown in the illustrated embodiment, rotation of the lever 624 into the open position, such that the projection 632 is oriented downwards, can also cause the slide 626 to translate away from the lever 624 and towards the biasing member 628. In some embodiments, one or both of the edges 640, 642 can be cammed, curved, ramped, or shaped such that rotation of the lever 624 applies a force on the slide 626 to such that the slide 626 and the lever 624 are translated relative to each other. The biasing member 628 can apply a force on the slide 626 towards the lever 624 such that the lever 624 would be urged back towards the closed position. In some embodiments, the closed position can be the initial, at-rest position for the lever 624. In some embodiments, when the projection 632 is positioned at the aperture 631, the lever 624 is urged back into the closed position such that the projection 632 extends outwards of the aperture 631 thereby securing the first and second components 616a, 616b together.

In some embodiments, a wearer can decouple the two components 616a, 616b by pressing the lever 624 to manually pivot or actuate the lever 624 from the closed position to the open position. To beneficially facilitate a wearer's contacting and rotating the lever 624, the projection 632 may extend slightly outwards of the inner surface of the second component 616b to allow a wearer to contact the projection 632 and rotate the lever 624.

In some embodiments, the slide 626 can be omitted. To bias the lever 624 into the closed position, other types of biasing mechanisms 628, such as a torsion spring can be used. In some embodiments, the frame 612 can be omitted and the eyeglass 610 can be frameless or rimless with the earstems 616 being coupled directly to one or more lenses 614 or indirectly to components mounted on the lenses 614. While the embodiment described herein allows for coupling of first and second components 616a, 616b of an earstem 616, one or more features can be used to couple other eyeglass components together. For example, one or more features can be applied to a coupling between the lens and a frame, a coupling between two orbitals of a frame, a coupling between a frame and an earstem, and/or a coupling between other components.

FIGS. 45 and 46 illustrate an embodiment of an eyeglass 610' which includes removably detachable components. The eyeglass 610' includes some similarities with eyeglass 610, accordingly it should be understood that certain features described in connection with eyeglass 610 can be applied to eyeglass 610' and vice-versa. With reference first to FIG. 45, the eyeglass 610' can include a frame 612' configured to support one or more lenses 614' in a wearer's field of view and earstems 616' which can support the eyeglass 610' on the wearer's head. In some embodiments, the eyeglass 610' can be a dual-lens eyeglass having two lenses. In some embodiments, one or more features described herein can also be applied to an eyewear having a unitary lens. The earstems 616' can be rotated (e.g., pivoted) relative to the frame 612'. For purposes of brevity, only one earstem 616' will be described in further detail; however, it should be understood that such features can also apply to the second earstem 616'.

The earstem 616' can include a first component 616a', such as an anterior portion of the earstem 616', and a second component 616b', such as a posterior portion of the earstem 616'. The first and second components 616a', 616b' can be removably coupled using a coupling assembly 618' which can be positioned on one or both components 616a', 616b' or can be wholly separate from both components 616a', 616b'. In some embodiments, the coupling assembly 618' can allow a wearer to removably couple components without the use of tools.

With reference next to FIG. 46, the coupling assembly 618' can include a support or tab 620', a lever 624', and/or a biasing mechanism 628'. In some embodiments, the support or tab 620' can be formed in the first component 616a' of the earstem 616'. As shown in the illustrated embodiment, a first portion 617a', such as an anterior portion of the first component 616a', can be rotatably coupled to the frame 612'. The first component 616a' can include a second portion 617b', such as a posterior portion of the first component 616a'. The second portion 617b' can include the support or tab 620' which can support one or more components of the coupling assembly 618' such as the lever 624' and/or the biasing mechanism 628'. As shown in the illustrated embodiment, the lever 624' can be rotatably coupled to the support or tab 624' along a pivot axis extending through aperture 625. The biasing mechanism 628' can be positioned between the support or tab 620' and portion of the lever 624', such as the anterior portion, to bias the lever 624' into an a first, closed position. In some embodiments, some or all components of the coupling assembly 618' can be on the second component 616b' of the earstem 616'.

The coupling assembly 618' can be received within a cavity 630' of the second component 616b' of the earstem 616'. As shown in the illustrated embodiment, the two components 616a', 616b' can be coupled by translating the two components 616a', 616b' towards each other and positioning a component of the coupling assembly 618', such as the lever 624', within an aperture, through hole, or recess 631' of the second component 616b' to secure the first and second components 616a', 616b' relative to each other. As shown, the two components 616a', 616b' are translated together in an anterior-posterior direction. In some embodiments, the components 616a', 616b' can be rotated and/or translated in other directions, such as a superior-inferior direction and/or a medial-lateral direction. As shown in the illustrated embodiment, the support or tab 620' can have smaller dimensions than the first portion 617a'.

With continued reference to FIG. 46, the lever 624' can include a projection 632'. The coupling assembly 618' can be rotatably (e.g., pivotally) mounted relative to the support or tab 620' in order to allow the lever 624' to be moved between a first, closed (e.g., engaged, secured) position, as shown in FIG. 45, to a second, open (e.g., disengaged, unsecured) position as shown in FIG. 46. In some embodiments, in the closed position, the projection 632' can be engaged with or positioned within the aperture or recess 631' to secure the first and second components 616a', 616b' relative to each other and/or mount the first and second components 616a', 616b' relative to each other. In the closed position, the projection 632' can be engaged with or positioned within the aperture or recess 631' to resist disengagement and/or relative horizontal anterior or posterior movement between the first and second components 616a', 616b'. In some embodiments, in the open position, the lever 624' can be pivotally disengaged from the aperture or recess 631' by rotating (e.g., pivoting) the lever 624' around a generally vertical axis.

In some embodiments, the projection 632' can include a surface 634' which can complementarily contact a surface or edge 636' of the second component 616b'. In some embodiments, the surfaces 634', 636' can be complementarily shaped such that, as the second component 616b' is translated towards the first component 616a', or vice-versa, contact between the surfaces 634', 636' would apply a force which rotates the lever 624' from the closed position to the open position. In some embodiments, one or both of the surfaces 634', 636' can be cammed, curved, ramped, or shaped such that, when the two components are translated towards each other, the surfaces 634', 636' apply a force on lever 624' which rotates the lever 624' from the closed position to the open position.

The biasing member 628' can apply a force on the lever 624' such that the lever 624' would be urged back towards the closed position. In some embodiments, the closed position can be the initial, at-rest position for the lever 624'. In some embodiments, when the projection 632' is positioned at the aperture or recess 631', the lever 624' is urged back into the closed position such that the projection 632' extends within of the aperture or recess 631' thereby securing the first and second components 616a', 616b' together.

In some embodiments, a wearer can decouple the two components 616a', 616b' by pressing the lever 624' to manually pivot or actuate the lever 624' from the closed position to the open position. To beneficially facilitate a wearer's contacting and rotating the lever 624', a portion of the lever 624' can extend slightly outwards of the inner surface of the first component 616b' to allow a wearer to contact and rotate the lever 624'. As shown in the illustrated embodiment, a wearer can press the anterior portion of the lever 624' to rotate the lever 624' into the second or open configuration.

To bias the lever 624' into the closed position, other types of biasing mechanisms 628', such as a torsion spring can be used. In some embodiments, the frame 612' can be omitted and the eyeglass 610' can be frameless or rimless with the earstems 616' being coupled directly to one or more lenses 614' or indirectly to components mounted on the lenses 614'. While the embodiment described herein allows for coupling of first and second components 616a', 616b' of an earstem 616', one or more features can be used to couple other eyeglass components together. For example, one or more features can be applied to a coupling between the lens and a frame, a coupling between two orbitals of a frame, a coupling between a frame and an earstem, and/or a coupling between other components.

Various embodiments can be provided in which the lever mechanism rotates (e.g., pivots) in an anterior or posterior direction in order to reach the closed position. Further, the retention assembly can comprise one or more sliding or locking mechanisms that can be incorporated into the engagement protrusion, the lever mechanism, and/or the housing of the coupling mechanism. In addition, the engagement between a locking tab of the coupling mechanism and an interlocking portion of an engagement protrusion can be achieved through rotational and/or sliding movement of the locking tab relative to the interlocking portion. In some embodiments, the locking tab can be formed on the lever mechanism and/or on the sliding and locking mechanism.

In some embodiments, the lens retention assembly can provide excellent ballistic resistance for the lens and/or the earstems of the eyeglass. For example, the lens retention assembly can retain the lens during a ballistic impact. The retention assembly can be integrated into, carried, or supported by the lens(es) and/or earstems of the eyeglass. One or more components of the retention assembly can also be formed as a separate part that can be retrofitted onto existing eyewear.

Embodiments of the eyeglass disclosed herein can tend to ensure that the lens does not become transitorily and/or permanently substantially separated from the earstems in response to a ballistic event. Further, embodiments of the eyeglass can be configured such that a force transmitted to the lens is also generally transmitted to the earstems of the eyeglass while substantially maintaining engagement between the lens and the earstems. For example, although the lens of such an eyeglass may be damaged (cracked or chipped), the lens avoids separating relative to the earstems. This ballistic resistance can provide excellent protection to the wearer.

Additionally, the lens retention assembly can comprise a resilient material, such as a compressible or flexible material disposed at least along a portion of the lens retention assembly. For example, a protrusion, connector, body, or other structure or component of the lens retention assembly can be formed from or otherwise include one or more resilient materials. As a result, a ballistic event will not tend to result in damage at the interconnection between the lens retention assembly and the lens(es) and/or earstems. In some embodiments, a protrusion of the lens retention assembly can be formed from a resilient or flexible material or comprise a coating, layer, or one or more surface features formed from the resilient or flexible material. The lens retention assembly, such as the projection and/or the resilient or flexible material, can have a modulus of elasticity that is less than that of the lens. Further, lens retention assembly, such as the projection and/or the resilient or flexible material, can have a modulus of elasticity that is less than that of the earstems. Accordingly, at least a portion of the lens retention assembly can dampen or absorb force or vibration from a ballistic event.

In some embodiments that comprise a unitary lens, the lens can be engaged and/or supported at both lateral sides. For example, a unitary lens may be secured to and/or supported by a frame using a first retention assembly on the left side of midline and a second retention assembly on the right side of midline. The retention assemblies can include any of the passive or active retention mechanisms disclosed herein. The first retention assembly may be positioned on a point that is within the left lateral one third of the length of the lens, measured hinge to hinge. The second retention assembly may be positioned on a point that is within the right lateral one third of the lens. Typically, the retention assemblies can be symmetrically spaced apart along the length of the lens, or as a mirror image across the plane of symmetry (anatomical midline).

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, any one or more features from a combination can, in some cases, be removed from the combination, and the combination may be claimed as any subcombination or variation of any subcombination. No feature disclosed and/or illustrated in this specification is essential or indispensable.

Terms of orientation used herein, such as "top," "bottom," "horizontal," "vertical," "longitudinal," "lateral," "side," "upper," "lower," "anterior," "posterior," "medial," "lateral," and "end" are used in the context of the illustrated embodiment. However, the present disclosure should not be limited to the illustrated orientation. Indeed, other orientations are possible and are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally perpendicular" can refer to something that departs from exactly parallel by less than or equal to 20 degrees.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Although embodiments of these inventions have been disclosed in the context of certain examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Any embodiment can contain one or more features of any of the disclosed embodiments.

The following is claimed:

1. An eyewear comprising:
    at least one lens, wherein at least a portion of the at least one lens comprises an engagement structure;
    a frame configured to receive the at least one lens, the frame comprising a coupling mechanism formed within the frame, the coupling mechanism comprising:
        a housing configured to receive the engagement structure; and
        a lever mechanism being rotatably mounted relative to the housing to move between open and closed positions for disengaging or engaging with the engagement structure, wherein the lever mechanism is configured to rotate about a generally horizontal axis of rotation,
    wherein the engagement structure has a contact surface and the lever mechanism has a contact surface, and
    wherein movement of the contact surface of the engagement structure in an insertion direction applies a force on the contact surface of the lever mechanism to transition the lever mechanism from the closed position into the open position.

2. The eyewear of claim 1, wherein the engagement structure is positioned at a lateral portion of the at least one lens.

3. The eyewear of claim 1, wherein the engagement structure comprises a hook.

4. The eyewear of claim 1, wherein the at least one lens further comprises an interlocking portion.

5. The eyewear of claim 4, wherein the interlocking portion comprises a recess configured to receive at least a portion of the lever mechanism.

6. The eyewear of claim 1, wherein the at least one lens further comprises a securing structure configured to engage a complementary structure of the frame.

7. The eyewear of claim 6, wherein the securing structure comprises a protrusion and the complementary structure comprises a recess.

8. The eyewear of claim 6, wherein the securing structure forms a medial portion of the at least one lens.

9. The eyewear of claim 1, wherein the eyewear comprises a second lens.

10. The eyewear of claim 1, further comprising a biasing mechanism configured to urge the lever mechanism into the closed position.

11. An eyewear comprising:
at least one lens, wherein at least a portion of the at least one lens comprises an engagement structure;
a frame configured to receive the at least one lens, the frame comprising a coupling mechanism formed within the frame, the coupling mechanism comprising:
a housing configured to receive the engagement structure; and
a lever mechanism being rotatably mounted relative to the housing to move between open and closed positions for disengaging or engaging with the engagement structure, wherein the lever mechanism is configured to rotate about a generally horizontal axis of rotation,
wherein the engagement structure has a contact surface and the lever mechanism has a contact surface, wherein the contact surfaces are complementarily shaped such that movement in an insertion direction applies a force on the lever mechanism to transition the lever mechanism from the closed position into the open position.

12. The eyewear of claim 11, wherein the contact surfaces are cammed.

13. The eyewear of claim 11, wherein the engagement structure is positioned at a lateral portion of the at least one lens.

14. The eye wear of claim 11, wherein the engagement structure comprises a hook.

15. The eyewear of claim 11, wherein the at least one lens further comprises an interlocking portion.

16. The eyewear of claim 15, wherein the interlocking portion comprises a recess configured to receive at least a portion of the lever mechanism.

17. The eyewear of claim 11, wherein the at least one lens further comprises a securing structure configured to engage a complementary structure of the frame, wherein the securing structure comprises a protrusion, and wherein the complementary structure comprises a recess.

18. The eyewear of claim 17, wherein the securing structure forms a medial portion of the at least one lens.

19. A method of attaching a lens to a frame of an eyewear, the method comprising:
engaging a securing structure of the lens with a complementary structure of the frame; and
pivoting the lens relative to the frame to engage an engagement structure of the lens with a coupling mechanism of the frame,
wherein the coupling mechanism has a contact surface and the engagement structure has a contact surface, and
wherein movement of the contact surface of the engagement structure in an insertion direction applies a force on the contact surface of the coupling mechanism to transition the coupling mechanism from a closed position to an open position.

20. The method of claim 19, wherein the securing structure of the lens is a protrusion extending along a medial portion of the lens.

21. The method of claim 19, wherein the engagement structure of the lens is a protrusion extending along a lateral portion of the lens.

22. The method of claim 19, wherein the coupling mechanism comprises a housing and a lever mechanism.

* * * * *

UNITED STATES PATENT AND TRADEMARK OFFICE
CERTIFICATE OF CORRECTION

PATENT NO. : 10,359,642 B2
APPLICATION NO. : 15/481850
DATED : July 23, 2019
INVENTOR(S) : Calilung et al.

Page 1 of 1

It is certified that error appears in the above-identified patent and that said Letters Patent is hereby corrected as shown below:

In the Claims

In Column 33, Line 26, delete "eye wear" and insert --eyewear--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*